US010637294B2

(12) United States Patent
Sarwat et al.

(10) Patent No.: US 10,637,294 B2
(45) Date of Patent: Apr. 28, 2020

(54) WIRELESS POWER ELECTRONICS AND CONTROLS

(71) Applicants: Arif Sarwat, Davie, FL (US); Masood Moghaddami, Miami, FL (US)

(72) Inventors: Arif Sarwat, Davie, FL (US); Masood Moghaddami, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/847,290

(22) Filed: Dec. 19, 2017

(65) Prior Publication Data

US 2018/0194237 A1 Jul. 12, 2018

Related U.S. Application Data

(63) Continuation of application No. 15/404,474, filed on Jan. 12, 2017, now Pat. No. 9,919,610.

(51) Int. Cl.
| | |
|---|---|
| *H02J 50/12* | (2016.01) |
| *H02M 5/275* | (2006.01) |
| *H02J 50/90* | (2016.01) |
| *B60L 53/22* | (2019.01) |

(Continued)

(52) U.S. Cl.
CPC ............ *H02J 50/12* (2016.02); *H02M 5/275* (2013.01); *B60L 53/12* (2019.02); *B60L 53/22* (2019.02); *B60L 2210/30* (2013.01); *B60L 2210/40* (2013.01); *H02J 50/90* (2016.02); *H02M 1/083* (2013.01); *Y02T 10/7005* (2013.01); *Y02T 10/7072* (2013.01); *Y02T 10/7241* (2013.01);

(Continued)

(58) Field of Classification Search
CPC .......... H02M 5/02; H02M 5/22; H02M 5/293; H02M 2005/2932; H02M 2005/2935; H02M 2005/2937; H02M 5/297; H02M 5/271; H02M 5/04; H02M 5/275; B60L 11/182; H02J 50/12; H02J 50/90; H02J 50/30
USPC ........................ 363/157, 159, 160, 163, 164
See application file for complete search history.

(56) References Cited

U.S. PATENT DOCUMENTS

| | | |
|---|---|---|
| 5,301,096 A | 4/1994 | Klontz et al. |
| 5,619,078 A | 4/1997 | Boys et al. |
| 5,889,667 A | 3/1999 | Bernet |

(Continued)

OTHER PUBLICATIONS

Keeling et al., "A unity-power-factor IPT pickup for high-power applications," IEEE Transactions on Industrial Electronics, Feb. 2010, pp. 744-751, vol. 57, No. 2.

(Continued)

*Primary Examiner* — Alex Torres-Rivera
(74) *Attorney, Agent, or Firm* — Saliwanchik, Lloyd & Eisenchenk

(57) ABSTRACT

Magnetic-coupling-based wireless power transfer systems and schemes are provided that ensure fast wireless power transfer to charge batteries of electric vehicles (EVs) with high power transfer efficiencies and safety to humans and other animals in or near the EVs. A wireless power transfer system can include a direct 3-phase AC/AC converter with a circuit topology that enables bidirectional power flow. The direct 3-phase AC/AC converter can convert a power input at a low frequency, such as 3-phase 50/60 Hz, into a power output at a high frequency, such as a frequency in a range of 10-85 kHz for wireless power transfer applications.

3 Claims, 22 Drawing Sheets

(51) Int. Cl.
  *B60L 53/12* (2019.01)
  *H02M 1/08* (2006.01)
(52) U.S. Cl.
  CPC ............ *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 9,653,207 B2* | 5/2017 | Madawala | H02J 7/025 |
| 9,678,519 B1 | 6/2017 | Alexander | |
| 2006/0072352 A1* | 4/2006 | Ghosh | H02M 7/219 363/53 |
| 2009/0206781 A1* | 8/2009 | Itoh | H02M 7/217 318/400.3 |
| 2010/0296321 A1* | 11/2010 | Sakakibara | H02M 7/125 363/61 |
| 2012/0113700 A1 | 5/2012 | Kajouke et al. | |
| 2013/0207482 A1* | 8/2013 | Madawala | H02J 7/025 307/104 |
| 2014/0254223 A1* | 9/2014 | Limpaecher | H02M 7/4826 363/126 |
| 2015/0280455 A1* | 10/2015 | Bosshard | H02J 5/005 307/104 |
| 2016/0084894 A1 | 3/2016 | Govindaraj et al. | |

OTHER PUBLICATIONS

Keeling et al., "Variable tuning in LCL compensated contactless power transfer pickups," Proceedings of IEEE Energy Conversion Congress and Exposition, Sep. 2009, pp. 1826-1832.
Huang et al., "LCL pickup circulating current controller for inductive power transfer systems," IEEE Transactions on Power Electronics, Apr. 2013, pp. 2081-2093, vol. 28, No. 4.
Li et al., "A new primary power regulation method for contactless power transfer," Proceedings of IEEE International Conference on Industrial Technology, Feb. 2009, pp. 1-5.
Low et al., "Design and test of a high-power high-efficiency loosely coupled planar wireless power transfer system," IEEE Transactions on Industrial Electronics, May 2009, pp. 1801-1812, vol. 56, No. 5.
Miller et al., "Grid side regulation of wireless power charging of plug-in electric vehicles," Proceedings of IEEE Energy Conversion Congress and Exposition, Sep. 2012, pp. 261-268.
Wei et al., "A new type of IPT system with large lateral tolerance and its circuit analysis," Proceedings of International Conference on Connected Vehicles and Exposition, Dec. 2012, pp. 311-315.
Krishnan et al., "Frequency agile resonance-based wireless charging system for electric vehicles," Proceedings of IEEE International Electric Vehicle Conference, Mar. 2012, pp. 1-4.
Wu et al., "An AC processing pickup for IPT systems," IEEE Transactions on Power Electronics, May 2010, pp. 1275-1284, vol. 25, No. 5.
Wu et al., "A series-tuned inductive-power-transfer pickup with a controllable AC-voltage output," IEEE Transactions on Power Electronics, Jan. 2011, pp. 98-109, vol. 26, No. 1.
Madawala et al., "Current sourced bi-directional inductive power transfer system," IET Power Electronics, 2011, pp. 471-480, vol. 4, No. 4.
Thrimawithana et al., "A three-phase bi-directional IPT system for contactless charging of electric vehicles," Proceedings of IEEE International Symposium on Industrial Electronics, Jun. 2011, pp. 1957-1962.
Swain et al., "A dynamic multivariable state-space model for bidirectional inductive power transfer systems," IEEE Transactions on Power Electronics, Nov. 2012, pp. 4772-4780, vol. 27, No. 11.
Tang et al., "A bidirectional contactless power transfer system with dual-side power flow control," Proceedings of IEEE International Conference on Power System Technology, Nov. 2012, pp. 1-6.
Thrimawithana et al., "A generalized steady-state model for bidirectional IPT systems," IEEE Transactions on Power Electronics, Oct. 2013, pp. 4681-4689, vol. 28, No. 10.
Thrimawithana et al., "A synchronization technique for bidirectional IPT systems," IEEE Transactions on Industrial Electronics, Jan. 2013, pp. 301-309, vol. 60, No. 1.
Xueliang et al., "The interaction research of smart grid and EV based wireless charging," Proceedings of IEEE Vehicle Power and Propulsion Conference, Oct. 2013, pp. 354-358.
Lukic et al., "Use of inductive power transfer for electric vehicles," Proceedings of IEEE Power and Energy Society General Meeting, Jul. 2010, pp. 1-6.
Boeij et al., "Optimization of contactless planar actuator with manipulator," IEEE Transactions on Magnetics, Jun. 2008, pp. 1118-1121, vol. 44, No. 6.
Wang et al., "Design and analysis of an adaptive transcutaneous power telemetry for biomedical implants," IEEE Transactions on Circuits and Systems—I: Regular Papers, Oct. 2005, pp. 2109-2117, vol. 52, No. 10.
Li et al., "A wireless power interface for rechargeable battery operated medical implants," IEEE Transactions on Circuits and Systems—II: Express Briefs, Oct. 2007, pp. 912-916, vol. 54, No. 10.
Gu et al., "A dc-link capacitor minimization method through direct capacitor current control," IEEE Transactions on Industry Applications, Mar./Apr. 2006, pp. 573-581, vol. 42, No. 2.
Wheeler et al., "Matrix converters: a technology review," IEEE Transactions on Industrial Electronics, Apr. 2002, pp. 276-288, vol. 49, No. 2.
Keyhani et al., "A soft-switched three-phase ac-ac converter with a high-frequency ac link," IEEE Transactions on Industry Applications, Jul./Aug. 2014, pp. 2637-2647, vol. 50, No. 4.
Wang et al., "Investigating an lcl load resonant inverter for inductive power transfer applications," IEEE Transactions on Power Electronics, Jul. 2004, pp. 995-1002, vol. 19, No. 4.
Van Der Pijl et al., "Adaptive sliding-mode control for a multiple-user inductive power transfer system without need for communication," IEEE Transactions on Industrial Electronics, Jan. 2013, pp. 271-279, vol. 60, No. 1.
Moghaddami et al., "Finite element based design optimization of magnetic structures for roadway inductive power transfer systems," Proceedings of IEEE Transportation Electrification Conference and Exposition, Jun. 2016, pp. 1-6.
Madawala et al., "A power-frequency controller for bidirectional inductive power transfer systems," IEEE Transactions on Industrial Electronics, Jan. 2013, pp. 310-317, vol. 60, No. 1.
Zahid et al., "Modeling and control of series-series compensated inductive power transfer system," IEEE Journal of Emerging and Selected Topics in Power Electronics, Mar. 2015, pp. 111-123, vol. 3, No. 1.
Matysik, "The current and voltage phase shift regulation in resonant converters with integration control," IEEE Transactions on Industrial Electronics, Apr. 2007, pp. 1240-1242, vol. 54, No. 2.
Wang et al., "Load detection model of voltage-fed inductive power transfer system," IEEE Transactions on Power Electronics, Nov. 2013, pp. 5233-5243, vol. 28, No. 11.
Miller et al., "Elements of wireless power transfer essential to high power charging of heavy duty vehicles," IEEE Transactions on Transportation Electrification, Jun. 2015, pp. 26-39, vol. 1, No. 1.
Vicuna et al., "Sliding-mode control for a single-phase ac/ac quantum resonant converter," IEEE Transactions on Industrial Electronics, Sep. 2009, pp. 3496-3504, vol. 56, No. 9.
Chen et al., "Adaptive quasi-sliding-mode tracking control for discrete uncertain input-output systems," IEEE Transactions on Industrial Electronics, Feb. 2001, pp. 216-224, vol. 48, No. 1.
Moghaddami et al., "Single-stage three-phase ac-ac matrix converter for inductive power transfer systems," IEEE Transactions on Industrial Electronics, Oct. 2016, pp. 6613-6622, vol. 63, No. 10.
Wageningen et al., "The Qi wireless power standard," 14th International Power Electronics and Motion Control Conference, EPE-PEMC, 2010, pp. S1525-S1532.

(56) References Cited

OTHER PUBLICATIONS

Li et al., "A direct ac-ac converter for inductive power-transfer systems," IEEE Transactions on Power Electronics, Feb. 2012, pp. 661-668, vol. 27, No. 2.
Aldhaher et al., "Wireless power transfer using class e inverter with saturable dc-feed inductor," IEEE Transactions on Industry Applications, Jul. 2014, pp. 2710-2718, vol. 50, No. 4.
Rodriguez et al., "A multilevel inverter topology for inductively coupled power transfer," IEEE Transactions on Power Electronics, Nov. 2006, pp. 1607-1617, vol. 21, No. 6.
Egan et al., "Power-factor-corrected single-stage inductive charger for electric vehicle batteries," IEEE Transactions on Industrial Electronics, Apr. 2007, pp. 1217-1226, vol. 54, No. 2.
Van Der Pijl et al., "Quantum control for an experimental contactless energy transfer system for multiple users," PESC Record IEEE Annual Power Electronics Specialists Conference, Jun. 2007, pp. 343-349.
Wang et al., "Design considerations for a contactless electric vehicle battery charger," IEEE Transactions on Industrial Electronics, Oct. 2005, pp. 1308-1314, vol. 52, No. 5.
Berger et al., "A wireless charging system applying phase-shift and amplitude control to maximize efficiency and extractable power," IEEE Transactions on Power Electronics, Nov. 2015, pp. 6338-6348, vol. 30, No. 11.
Castilla et al., "Sliding-mode control of quantum series-parallel resonant converters via input-output linearization," IEEE Transactions on Industrial Electronics, Apr. 2005, pp. 566-575, vol. 52, No. 2.
Namadmalan, "Self-oscillating tuning loops for series resonant inductive power transfer systems," IEEE Transactions on Power Electronics, Oct. 2016, pp. 7320-7327, vol. 31, No. 10.
Namadmalan et al., "Tunable self-oscillating switching technique for current source induction heating systems," IEEE Transactions on Industrial Electronics, May 2014, pp. 2556-2563, vol. 61, No. 5.
Zhang et al., "Energy encryption for wireless power transfer," IEEE Transactions on Power Electronics, Sep. 2015, pp. 5237-5246, vol. 30, No. 9.
Schneider, "SAE j2954 overview and path forward," SAE International, 2013, pp. 1-22.
Monsees, Discrete-time sliding mode control, Delft University of Technology, 2002.
Namadmalan, "Bidirectional current-fed resonant inverter for contactless energy transfer systems," IEEE Transactions on Industrial Electronics, Jan. 2015, pp. 238-245, vol. 62, No. 1.
Li et al., "Primary current generation for a contactless power transfer system using free oscillation and Energy Injection Control," Journal of Power Electronics, May 2011, pp. 256-263, vol. 11, No. 3.
Lee et al., "Effects of magnetic coupling of nonadjacent resonators on wireless power domino-resonator systems," IEEE Transactions on Power Electronics, Apr. 2012, pp. 1905-1916, vol. 27, No. 4.
Cheon et al., "Circuit-model-based analysis of a wireless energy-transfer system via coupled magnetic resonances," IEEE Transactions on Industrial Electronics, Jul. 2011, pp. 2906-2914, vol. 58, No. 7.
Chen et al., "Analysis of the double-layer printed spiral coil for wireless power transfer," IEEE Journal of Emerging and Selected Topics in Power Electronics, Jun. 2013, pp. 114-121, vol. 1, No. 2.
Zhang et al., "Frequency decrease analysis of resonant wireless power transfer," IEEE Transactions on Power Electronics, Mar. 2014, pp. 1058-1063, vol. 29, No. 3.
Eghtesadi, "Inductive power transfer to an electric vehicle-analytical model," Proceedings of IEEE 40th Vehicular Technology Conference, May 1990, pp. 100-104.
Barnard et al., "Sliding transformers for linear contactless power delivery," IEEE Transactions on Industrial Electronics, Dec. 1997, pp. 774-779, vol. 44, No. 6.
Kutkut et al., "Design considerations for power converters supplying the SAE J-1773 electric vehicle inductive coupler," Proceedings of 12th Annual APEC and Expo.,Feb. 1997, pp. 841-847, vol. 2.

Abe et al., "A noncontact charger using a resonant converter with parallel capacitor of the secondary coil," IEEE Transactions on Industry Applications, Mar./Apr. 2000, pp. 444-451, vol. 36, No. 2.
Boys et al., "Stability and control of inductively coupled power transfer systems," IEEE Proceedings on Electric Power Applications, Jan. 2000, pp. 37-43, vol. 147, No. 1.
Wang et al., "Power transfer capability and bifurcation phenomena of loosely coupled inductive power transfer systems," IEEE Transactions on Industrial Electronics, Feb. 2004, pp. 148-157, vol. 51, No. 1.
Boys et al., "DC analysis technique for inductive power transfer pick-ups," IEEE Power Electronics Letters, Jun. 2003, pp. 51-53, vol. 1, No. 2.
Hirai et al., "Study on intelligent battery charging using inductive transmission of power and information," IEEE Transactions on Power Electronics, Mar. 2000, pp. 335-354, vol. 15, No. 2.
Song et al., "Contactless inductive power pickup system for maglev applications," Proceedings of Conference Record IAS 37th Annual Meeting on Industry Applications, Oct. 2002, pp. 1586-1591, vol. 3.
Stielau et al., "Design of loosely coupled inductive power transfer systems," Proceedings of International Conference on Power Systems Technology, 2000, pp. 85-90, vol. 1.
Hu et al., "Improved power flow control for contactless moving sensor applications," IEEE Power Electronics Letters, Dec. 2004, pp. 135-138, vol. 2, No. 4.
Elliott et al., "A design methodology for flat pick-up ICPT systems," Proceedings of the 1st IEEE Conference on Industrial Electronics and Applications, May 2006, pp. 1-7.
Woo et al., "Contactless energy transmission system for linear servo motor," IEEE Transactions on Magnetics, May 2005, pp. 1596-1599, vol. 41, No. 5.
Esser et al., "A new approach to power supplies for robots," IEEE Transactions on Industry Applications, Sep./Oct. 1991, pp. 872-875, vol. 27, No. 5.
Elliott et al., "A new concept: asymmetrical pick-ups for inductively coupled power transfer monorail systems," IEEE Transactions on Magnetics, Oct. 2006, pp. 3389-3391, vol. 42, No. 10.
Kawamura et al., "Wireless transmission of power and information through one high-frequency resonant AC link inverter for robot manipulator applications," IEEE Transactions on Industry Applications, May/Jun. 1996, pp. 503-508, vol. 32, No. 3.
Huang et al., "Practical considerations for designing IPT system for EV battery charging," Proceedings of IEEE Vehicle Power and Propulsion Conference, Sep. 2009, pp. 402-407.
Li et al., "Development of a discrete energy injection inverter for contactless power transfer," Proceedings of the 3rd IEEE Conference on Industrial Electronics and Applications, Jun. 2008, pp. 1757-1761.
Tang et al., "Determining multiple steady-state ZCS operating points of a switch-mode contactless power transfer system," IEEE Transactions on Power Electronics, Feb. 2009, pp. 416-425, vol. 24, No. 2.
Hsu et al., "A wireless power pickup based on directional tuning control of magnetic amplifier," IEEE Transactions on Industrial Electronics, Jul. 2009, pp. 2771-2781, vol. 56, No. 7.
Budhia et al., "Design and optimization of circular magnetic structures for lumped inductive power transfer systems," IEEE Transactions on Power Electronics, Nov. 2011, pp. 3096-3108, vol. 26, No. 11.
Covic et al., "A bipolar primary pad topology for EV stationary charging and highway power by inductive coupling," Proceedings of IEEE Energy Conversion Congress and Exposition, Sep. 2011, pp. 1832-1838.
Zaheer et al., "A bipolar receiver pad in a lumped IPT system for electric vehicle charging applications," Proceedings of IEEE Energy Conversion Congress and Exposition, Sep. 2012, pp. 283-290.
Shinohara, "Wireless power transmission progress for electric vehicle in japan," Proceedings of IEEE Radio and Wireless Symposium, Jan. 2013, pp. 109-111.
Ning et al., "A compact wireless charging system development," Proceedings of IEEE Energy Conversion Congress and Exposition, Sep. 2013, pp. 3045-3050.

(56) References Cited

OTHER PUBLICATIONS

Lee et al., "On-line electric vehicle using inductive power transfer system," Proceedings of IEEE Energy Conversion Congress and Exposition, Sep. 2010, pp. 1598-1601.

Musavi et al., "Wireless power transfer: a survey of EV battery charging technologies," Proceedings of IEEE Energy Conversion Congress and Exposition, Sep. 2012, pp. 1804-1810.

Lukic et al., "Cutting the cord: static and dynamic inductive wireless charging of electric vehicles," IEEE Electrification Magazine, Sep. 2013, pp. 57-64, vol. 1, No. 1.

Schuylenbergh et al., Inductive Powering: Basic Theory and Application to Biomedical Systems, 2009, Springer, New York, NY, USA.

Mecke et al., "High frequency resonant inverter for contactless energy transmission over large air gap," Proceedings of 35th Annual IEEE Power Electronics Specialists Conference, Jun. 2004, pp. 1737-1743, vol. 3.

Boys et al., "An appropriate magnetic coupling co-efficient for the design and comparison of ICPT pickups," IEEE Transactions on Power Electronics, Jan. 2007, pp. 333-335, vol. 22, No. 1.

Budhia et al., "A new IPT magnetic coupler for electric vehicle charging systems," Proceedings of 36th Annual Conference of the IEEE Industrial Electronics Society, Nov. 2010, pp. 2487-2492.

Budhia et al., "Development and evaluation of single sided flux couplers for contactless electric vehicle charging," Proceedings of IEEE Energy Conversion Congress and Exposition, Sep. 2011, pp. 614-621.

Huh et al., "High performance inductive power transfer system with narrow rail width for on-line electric vehicles," Proceedings of IEEE Energy Conversion Congress and Exposition, Sep. 2010, pp. 647-651.

Huh et al., "Narrow-width inductive power transfer system for online electrical vehicles," IEEE Transactions on Power Electronics, Dec. 2011, pp. 3666-3679, vol. 26, No. 12.

Jang et al., "System architecture and mathematical model of public transportation system utilizing wireless charging electric vehicles," Proceedings of 15th International IEEE Conference on Intelligent Transportation Systems, Sep. 16-19, 2012, pp. 1055-1060.

Jang et al., "Optimal design of the wireless charging electric vehicle," Proceedings of IEEE International Electric Vehicle Conference, Mar. 2012, pp. 1-5.

Suh et al., "Electric vehicle on-road dynamic charging system with wireless power transfer technology," Proceedings of IEEE International Electric Machines and Drives Conference, May 2013, pp. 234-240.

Nagendra et al., "Design of a double coupled IPT EV highway," Proceedings of 39th Annual Conference of the IEEE Industrial Electronics Society, Nov. 2013, pp. 4606-4611.

Lee et al., "Reflexive field containment in dynamic inductive power transfer systems," IEEE Transactions on Power Electronics, Sep. 2014, pp. 4592-4602, vol. 29, No. 9.

Zhang et al., "Analysis and comparison of secondary series-and-parallel-compensated inductive power transfer systems operating for optimal efficiency and load-independent voltage-transfer ratio," IEEE Transactions on Power Electronics, Jun. 2014, pp. 2979-2990, vol. 29, No. 6.

Pantic et al., "ZCS LCC-compensated resonant inverter for inductive-power-transfer application," IEEE Transactions on Industrial Electronics, Aug. 2011, pp. 3500-3510, vol. 58, No. 8.

Villa et al., "High-misalignment tolerant compensation topology for ICPT systems," IEEE Transactions on Industrial Electronics, Feb. 2012, pp. 945-951, vol. 59, No. 2.

Fischer et al., "An inverter system for inductive tube welding utilizing resonance transformation," Proceedings of Conference Record of IEEE Industry Applications Society Annual Meeting, Oct. 1994, pp. 833-840. vol. 2.

Kissin et al., "Detection of the tuned point of a fixed-frequency LCL resonant power supply," IEEE Transactions on Power Electronics, Apr. 2009, pp. 1140-1143, vol. 24, No. 4.

Sharp et al., "Asymmetrical voltage-cancellation control for LCL resonant converters in inductive power transfer systems," Proceedings of 27th Annual IEEE Applied Power Electronics Conference and Exposition, Feb. 2012, pp. 661-666.

Zhang et al., "An optimized track length in roadway inductive power transfer systems," IEEE Journal of Emerging and Selected Topics in Power Electronics, Sep. 2014, pp. 598-608, vol. 2, No. 3.

Gerssen-Gondelach et al., "Performance of batteries for electric vehicles on short and longer term." Journal of Power Sources, Aug. 2012, pp. 111-129, vol. 212.

Etacheri et al., "Challenges in the development of advanced Li-ion batteries: a review," Energy and Environmental Science, 2011, pp. 3243-3262, vol. 4, No. 9.

Kurs et al., "Wireless power transfer via strongly coupled magnetic resonances," Science, Jul. 6, 2007, pp. 83-86, vol. 317.

Sample et al., "Analysis, experimental results, and range adaptation of magnetically coupled resonators for wireless power transfer," IEEE Transactions on Industrial Electronics, Feb. 2011, pp. 544-554, vol. 58, No. 2.

Cannon et al., "Magnetic resonant coupling as a potential means for wireless power transfer to multiple small receivers," IEEE Transactions on Power Electronics, Jul. 2009, pp. 1819-1825, vol. 24, No. 7.

Kurs et al., "Simultaneous mid-range power transfer to multiple devices," Applied Physics Letters, 2010, pp. 044102-1-044102-3, vol. 96, No. 4.

Zhong et al., "Wireless power domino-resonator systems with noncoaxial axes and circular structures," IEEE Transactions on Power Electronics, Nov. 2012, pp. 4750-4762, vol. 27, No. 11.

Nagatsuka et al., "Compact contactless power transfer system for electric vehicles," The 2010 International Power Electronics Conference, Jun. 2010, pp. 807-813.

Bolger et al., "Inductive power coupling for an electric highway system," 28th IEEE Vehicular Technology Conference, Mar. 22-24, 1978, pp. 1-8.

Green et al., "10kHz inductively coupled power transfer—concept and control," Proceedings of the 5th International Conference on Power Electronics and Variable-Speed Drives, Oct. 26-28, 1994, pp. 694-699.

Klontz et al., "Contactless power delivery system for mining applications," IEEE Transactions on Industry Applications, Jan./Feb. 1995, pp. 27-35, vol. 31, No. 1.

Pedder et al., "A contactless electrical energy transmission system," IEEE Transactions on Industrial Electronics, Feb. 1999, pp. 23-30, vol. 46, No. 1.

Hu et al., "ZVS frequency analysis of a current-fed resonant converter," Proceedings of the 7th IEEE International Power Electronics Congress, Oct. 15-19, 2000, pp. 217-221.

Chwei-Sen et al., "Design considerations for a contactless electric vehicle battery charger," IEEE Transactions on Industrial Electronics, Oct. 2005, pp. 1308-1314, vol. 52, No. 5.

Boys et al., "Controlling inrush currents in inductively coupled power systems," Proceedings of the 7th International Power Electronics Congress, Dec. 2005, pp. 1-6, vol. 2.

Bradley et al., "Power systems for autonomous underwater vehicles," IEEE Journal of Oceanic Engineering, Oct. 2001, pp. 526-538, vol. 26, No. 4.

Singh et al., "Docking for an autonomous ocean sampling network," IEEE Journal of Oceanic Engineering, Oct. 2001, pp. 498-514, vol. 26, No. 4.

Adachi et al., "Consideration of contactless power station with selective excitation to moving robot," IEEE Transactions on Magnetics, Sep. 1999, pp. 3583-3585, vol. 35, No. 5.

Sallan et al., "Optimal design of ICPT systems applied to electric vehicle battery charge," IEEE Transactions on Industrial Electronics, Jun. 2009, pp. 2140-2149, vol. 56, No. 6.

Villa et al., "Design of a high frequency inductively coupled power transfer system for electric vehicle battery charge," Applied Energy, 2009, pp. 355-363, vol. 86, No. 3.

Moradewicz et al., "Contactless energy transfer system with FPGA-controlled resonant converter," IEEE Transactions on Industrial Electronics, Sep. 2010, pp. 3181-3190, vol. 57, No. 9.

Stamati et al., "On-road charging of electric vehicles," Proceedings of IEEE Transportation Electrification Conference and Exposition, Jun. 2013, pp. 1-8.

(56) References Cited

OTHER PUBLICATIONS

Systems Control Technology, Inc., "Roadway powered electric vehicle project track construction and testing program phase 3D," Jan. 1, 1994, California Path Program, Institute of Transportation Studies, University of California, Berkeley.

Wu et al., "A high efficiency 5kW inductive charger for EVs using dual side control," IEEE Transactions on Industrial Informatics, Aug. 2012, pp. 585-595, vol. 8, No. 3.

Huh et al., "Characterization of novel inductive power transfer systems for on-line electric vehicles," Proceedings of the 26th Annual IEEE Applied Power Electronics Conference and Exposition, Mar. 2011, pp. 1975-1979.

Covic et al., "Modern trends in inductive power transfer for transportation applications," IEEE Journal of Emerging and Selected Topics in Power Electronics, Mar. 2013, pp. 28-41, vol. 1, No. 1.

Nguyen et al., "Feasibility study on bipolar pads for efficient wireless power chargers," Proceedings of IEEE Applied Power Electronics Conference and Exposition, 2014, Fort Worth, TX, USA.

Valtchev et al., "Resonant contactless energy transfer with improved efficiency," IEEE Transactions on Power Electronics, Mar. 2009, pp. 685-699, vol. 24, No. 3.

Jaegue et al., "Design and implementation of shaped magnetic-resonance-based wireless power transfer system for roadway-powered moving electric vehicles," IEEE Transactions on Industrial Electronics, Mar. 2014, pp. 1179-1192, vol. 61, No. 3.

Chigira et al., "Small-size light-weight transformer with new core structure for contactless electric vehicle power transfer system," Proceedings of IEEE Energy Conversion Congress and Exposition, Sep. 2011, pp. 260-266.

Kiani et al., "A figure-of-merit for designing high-performance inductive power transmission links," IEEE Transactions on Industrial Electronics, Nov. 16, 2012, pp. 5292-5305, vol. 60, No. 11.

Khaligh et al., "Comprehensive topological analysis of conductive and inductive charging solutions for plug-in electric vehicles," IEEE Transactions on Vehicular Technology, Oct. 2012, pp. 3475-3489, vol. 61, No. 8.

Duan et al., "Design of a zero-voltage-switching large-air-gap wireless charger with low electric stress for electric vehicles," IET Power Electronics, Feb. 2013, pp. 1-9, vol. 6, No. 9.

Dieckerhoff et al., "Design of an IGBT-based LCL-resonant inverter for high-frequency induction heating," Conference Record—34th IAS Annual Meeting IEEE Industry Applications Society, Oct. 1999, pp. 2039-2045, vol. 3.

Leo et al., "A direct AC-AC converter for inductive power-transfer systems," IEEE Transactions on Power Electronics, Feb. 2012, pp. 661-668, vol. 27, No. 2.

Bac et al., "A matrix converter based inductive power transfer system," Proceedings of the IEEE 2012 Conference on Power and Energy, Dec. 2012, pp. 509-514.

Borage et al., "Analysis and design of an LCL-T resonant converter as a constant-current power supply," IEEE Transactions on Industrial Electronics, Dec. 2005, pp. 1547-1554, vol. 52, No. 6.

Orfanidis, Electromagnetic Waves and Antennas, 2013, www.ece.rutgers.edu/~orfanidi/ewa/ewa-1up.pdf.

Grajski et al., "Loosely-coupled wireless power transfer: physics, circuits, standards," Proceedings of IEEE MTT-S International Microwave Workshop Series on Innovative Wireless Power Transmission: Technologies, Systems and Applications, May 2012, pp. 1-7.

Madawala et al., "A bidirectional inductive power interface for electric vehicles in V2G systems," IEEE Transactions on Industrial Electronics, Oct. 2011, pp. 4789-4796, vol. 58, No. 10.

Joy et al., "Bidirectional contactless charging system using Li-ion battery model," Proceedings of the 7th IEEE International Conference on Industrial and Information Systems, Aug. 2012, pp. 1-6.

Neath et al., "Controller synthesis of a bidirectional inductive power interface for electric vehicles," Proceedings of IEEE Third International Conference on Sustainable Energy Technologies, Sep. 2012, pp. 60-65.

Kenney, "Dedicated short-range communications (DSRC) standards in the united states," Proceedings of the IEEE, Jul. 2011, pp. 1162-1182, vol. 99, No. 7.

Hui et al., "A new generation of universal contactless battery charging platform for portable consumer electronic equipment," IEEE Transactions on Power Electronics, May 2005, pp. 620-627, vol. 20, No. 3.

Sergeant et al., "Inductive coupler for contactless power transmission," IET Electric Power Applications, Jan. 2008, pp. 1-16, vol. 2, No. 1.

Lai et al., "A systematic topology evaluation methodology for high-density three-phase pwm ac-ac converters," IEEE Transactions on Power Electronics, Nov. 2008, pp. 2665-2680, vol. 23, No. 6.

Li et al., "Cascade three-level ac/ac direct converter," IEEE Transactions on Industrial Electronics, Jan. 2012, pp. 27-34, vol. 59, No. 1.

Malesani et al., "AC/DC/AC pwm converter with reduced energy storage in the dc link," IEEE Transactions on Industry Applications, Mar. 1995, pp. 287-292, vol. 31, No. 2.

Kolar et al., "Review of three-phase pwm ac-ac converter topologies," IEEE Transactions on Industrial Electronics, Nov. 2011, pp. 4988-5006, vol. 58, No. 11.

Rodriguez et al., "A review of control and modulation methods for matrix converters," IEEE Transactions on Industrial Electronics, Jan. 2012, pp. 58-70, vol. 59, No. 1.

\* cited by examiner (a)

(b)

WIRELESS POWER ELECTRONICS AND CONTROLS

CROSS-REFERENCE TO RELATED APPLICATION

The present application is a continuation application of U.S. application Ser. No. 15/404,474, filed Jan. 12, 2017, the disclosure of which is hereby incorporated by reference in its entirety, including all figures, tables, and drawings.

BACKGROUND

Wireless power transfer (WPT) by way of induction, or inductive power transfer (IPT), is an emerging technology for transferring electric power in applications ranging from small consumer gadgets to electrically powered vehicles. One of the biggest advantages of WPT is its ability to transfer power across relatively large distances without the need for physical contact. In addition, WPT is capable of operating in hazardous environments as it is resistant to chemicals, particulate debris, and some of the drawbacks of powering or charging via direct electrical connections, such as contact fouling and corrosion. One example of how WPT could be applied is in static and dynamic charging of electric vehicles (EVs). For instance, in static vehicle charging, drivers need simply position their vehicle over a charging element and walk away, without further action. Further examples of WPT applications include systems for material handling and biomedical implants. Of particular importance in these commercial and industrial applications is that WPT can transfer energy without risks such as electrical sparking and electric shock.

BRIEF SUMMARY

Although WPT has already proven to be a promising technology, there is still a need for ways to increase WPT efficiency, increase WPT system longevity, and expand WPT's suitability for various applications. Embodiments of the present invention seek to improve upon these deficiencies of the prior art.

Embodiments of the present invention include direct three-phase ac-ac matrix converters for inductive power transfer (IPT) systems with soft-switching operation. Embodiments of the present invention also include methods of operation for three-phase ac-ac matrix converters. Embodiments of the present invention can have increased reliability and extended lifetime due to the soft-switching operation and elimination of short life electrolytic capacitors. Converters according to an embodiment of the present invention can also reduce switching stress, switching loss and electromagnetic interference (EMI). Embodiments of the present invention can operate using a variable frequency control strategy based on an energy injection and free oscillation technique that is used to regulate the resonant current, the resonant voltage, and the output power. Converters according to an embodiment of the present invention can include reverse blocking switches, allowing for a reduced number of switches, which consequently increases reliability, increases efficiency and reduces costs. Embodiments of the present invention can include converter control strategies with three different control modes: resonant current regulation control, power regulation control and resonant voltage regulation control. Each of the three different control modes can include eight operation modes.

Embodiments of the present invention include a self-tuning sliding-mode controller for inductive power transfer (IPT) systems based on an analog design. A controller according to the present invention can automatically match the switching operations of power electronic converters to the resonance frequency of an IPT system. This feature can eliminate or reduce the need for manual frequency tuning. Also, it can enable soft-switching operations (zero-current switching) in power electronic converters. According to an embodiment of the present invention, a user-defined output resonant current can be maintained, based on an energy-injection, free-oscillation technique. A controller according to the present invention can be implemented on a conventional full-bridge or half-bridge AC/DC/AC converter without a dc-link capacitor. Therefore, using a controller according to the present invention, converters can be expected to have greater reliability and extended lifetime due to the soft-switching operation and elimination of short-life electrolytic capacitors. The soft-switching operation can further reduce switching stress, switching loss and electromagnetic interference (EMI) of the converter. Also, a controller according to the present invention can have a simple analog design, which enables higher frequency operation, making it suitable for IPT applications.

Embodiments of the present invention include a simplified self-tuning sliding mode control (SMC) for inductive power transfer (IPT) systems. Embodiments can be designed based on an amplitude modulation technique for resonant converters and can regulate resonant current around a user-defined reference current. Embodiments of the present invention can synchronize switching operations of power electronic converters to the resonance current of the IPT system, which in turn eliminates the need for manual frequency tuning and maximizes extractable power and efficiency. In addition, it enables soft-switching operations (zero-current switching) which increase the efficiency and reliability, and reduce switching stress and electromagnetic interference (EMI) of the power electronic converters. Furthermore, embodiments can be fabricated with an efficient (or simplified) design, and can be implemented for different types of converter topologies, including conventional full-bridge and half-bridge AC/DC/AC converters. Moreover, having an efficient design reduces cost by eliminating expensive digital controllers and enables higher frequency operation, making it suitable for IPT applications. Experimental studies of an SMC according to an embodiment of the present invention have shown effective regulation of resonant current around a desired value, synchronization of switching operations with resonant current, and enablement of soft-switching operations.

Embodiments of the present invention include a self-tuning controller for multi-level contactless electric vehicle (EV) charging systems based on inductive power transfer (IPT). In an embodiment, multi-level contactless charging (e.g., consisting of 11 user-defined charging levels) can be achieved by controlling the energy injection frequency of the transmitter coil of an inductive power transfer (IPT) system. A controller according to an embodiment of the present invention can self-tune the switching operations to the natural resonance frequency of the IPT system and benefit from soft-switching operations (zero-current switching), which enhances IPT system performance. Embodiments of the present invention can benefit from a simplistic (or efficient) design that can be implemented based on an analog control circuit.

DETAILED DESCRIPTION

Figure 1:
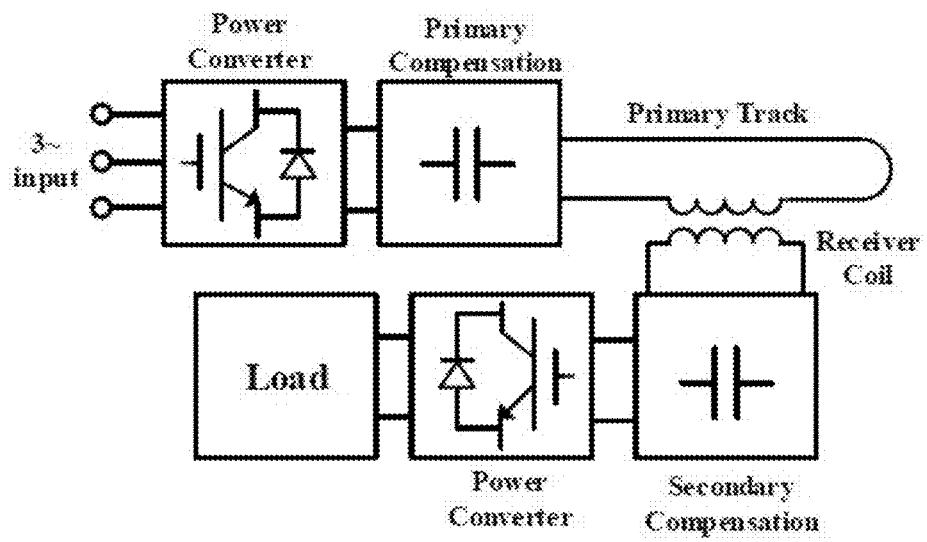
FIG. 1 shows a typical loosely coupled IPT system.

A typical configuration of an IPT system is shown in FIG. 1. In a loosely coupled IPT system, the inductive link requires a strong magnetic field to be created to deliver high power levels over large distances due to weak coupling of the coils. Achieving this requires the use of power converters that can generate large currents at high frequencies, often in the kilohertz range (10-58 kHz). In order to generate a high-frequency current on the primary side, specific types of power converters are employed in IPT systems. Power converters play a key role in the performance of IPT systems. Recent developments in IPT systems have heightened the need for high-power, reliable and efficient converters. Normally, these converters take 50/60 Hz current and convert to high-frequency using an ac-dc-ac two-stage power conversion. The power source of an IPT system is usually the electric utility (single-phase or three-phase) supplying power at 50/60 Hz.

Voltage-source inverters (VSI) based on pulse width modulation (PWM) with a front-end rectifier have become the preferred choice for most applications. This is mainly due to their simple topology and low cost. On the other hand, this two-stage topology has low-frequency harmonics on the dc link and the ac input line, which requires the use of very bulky short-life electrolytic capacitors for the dc link and a large low-pass filter at the output. Several topologies have been proposed to solve the problems of the traditional ac-dc-ac power converters. Matrix converters are the main alternatives for two-stage converters. Matrix converters can convert energy directly from an ac-source to a load with different frequencies and amplitudes, without the need for energy storage elements. These converters have the advantages of simple and compact topology, bidirectional power flow capability, high-quality input-current waveforms, and adjustable input power factors independent of the load.

Various converter topologies have been proposed for different IPT applications. However, many of the related art topologies suffer from drawbacks, such as current sags around input ac voltage zero-crossings, low efficiency, and high cost. Novel three-phase ac-ac matrix converters for IPT systems are presented herein. A matrix topology according to an embodiment of the present invention can be built using seven switches, six of which are reverse blocking switches and one is a regular switch. This application also present novel variable frequency control methods and strategies. The variable frequency control strategies, which can be based on energy injection and free oscillation techniques, can be applied to the converter structures that are taught in this application. Benefits of the converter topologies and variable frequency control strategies can include soft-switching operation, high efficiency, a reduced number of switches and low electromagnetic interference (EMI).

Figure 2:
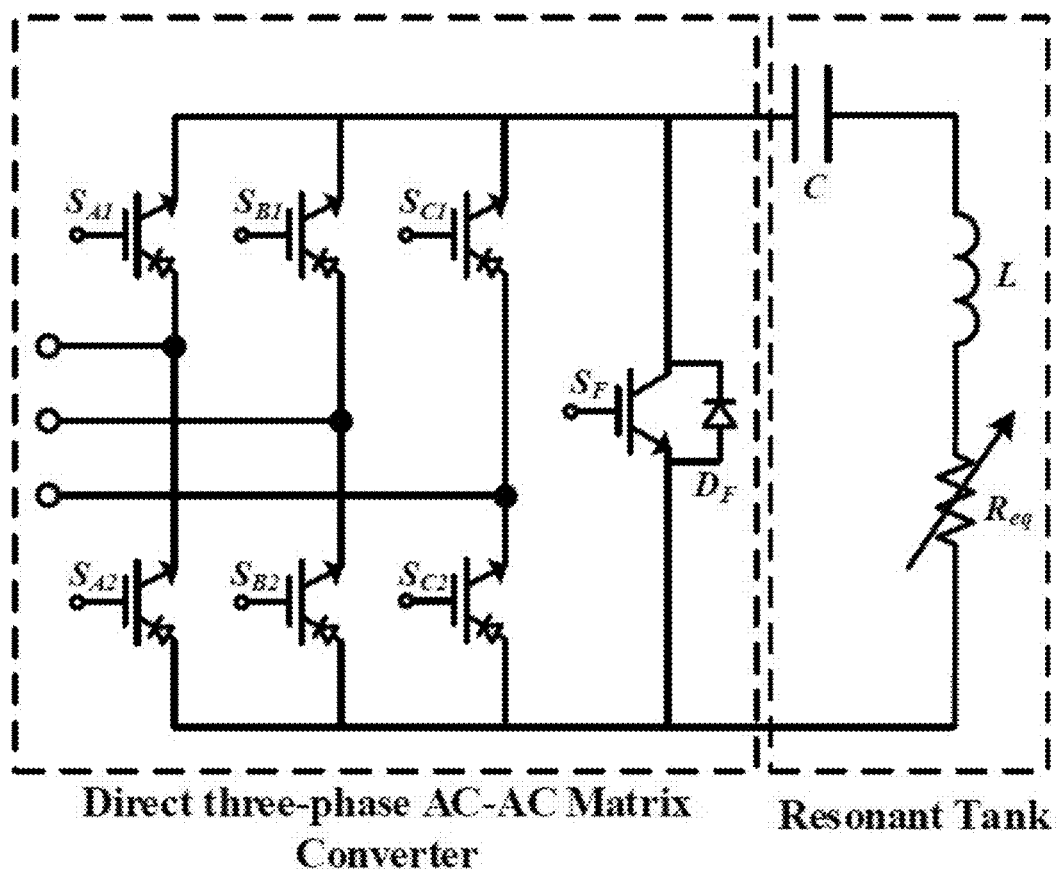
FIG. 2 shows a three-phase ac-ac matrix converter according to an embodiment of the present invention.

A three-phase ac-ac converter according to an embodiment of the present invention is shown in FIG. 2. In FIG. 2, C represents the primary compensation capacitor, L is the primary self-inductance and $R_{eq}$ is the reflected resistance of the load at the secondary to the primary circuit. A converter according to an embodiment of the present invention can consist of six reverse blocking switches and one regular switch (IGBT or MOSFET), which are in parallel with a resonant tank. A reverse-blocking switch can include a series combination of an insulated-gate bipolar transistor (IGBT) or a metal-oxide-semiconductor field-effect transistor (MOSFET) with a diode. However, individual switches with intrinsic reverse-blocking, having the advantage of total lower forward voltage, may also be used to enable the converter to operate with higher efficiency.

Embodiments of the present invention can include control strategies with three different control modes: resonant current regulation control, power regulation control and resonant voltage regulation control. The control modes can be based on zero current switching (ZCS) operation. Since embodiments of the present invention include converters based on the resonant current zero crossing points, the operating frequency of the converter is equal to the resonant current frequency (natural damped frequency). Therefore, the operating frequency of a converter can be determined by the circuit parameters. In a dynamic IPT system, the primary and secondary self-inductances are fixed by the track/coil parameters, such as size and number of turns in the coil. In practice, although the primary's position relative to secondary affects the mutual inductance, it generally has a small effect on self-inductances, due to the inherently large gaps that are present in charging systems such as electric vehicle (EV) dynamic charging. Therefore, self-inductances of the primary (L in FIG. 2) and secondary can be assumed to be constant. This ensures the performance of the converter in dynamic IPT systems.

According to an embodiment of the present invention, each of the three control modes (i.e., the resonant current regulation control, power regulation control and resonant voltage regulation control) can include eight operation modes, which are presented in Tables I, II and III. The operation modes 1 to 6 are energy injection modes in which energy is injected to the LC tank, and the operation modes 7 and 8 are free oscillation modes in which the LC tank continues its resonant oscillation. The transition of different modes of operation occurs at current zero-crossing points. Each mode starts at a resonant current zero-crossing, and continues for a half cycle until the next resonant current zero-crossing. The operation mode transitions are determined based on the state of the circuit, as well as the user-defined reference values for the resonant current, the resonant voltage, and the output power.

Resonant current regulation plays a key role in the power transfer performance of an IPT system. Since the resonant current amplitude is proportional to the amount of injected energy to the LC tank, the resonant current regulation control can be achieved by continuously changing the operation mode of the converter from energy injection modes (increasing the resonant current), and vice versa. Using this strategy, the resonant current can be regulated around a user-defined reference current. This is carried out by comparing the peak output resonant current ($i_p$) to the reference current ($i_{ref}$) at each current zero-crossing point. The $i_p$ is measured in each half cycle of the resonant current. If $i_p$ is negative and its absolute value is less than $i_{ref}$ ($i_p$<0 and $|i_p|$<$i_{ref}$), an energy injection to the LC tank is required for the next half cycle to increase the resonant current.

Figure 3:
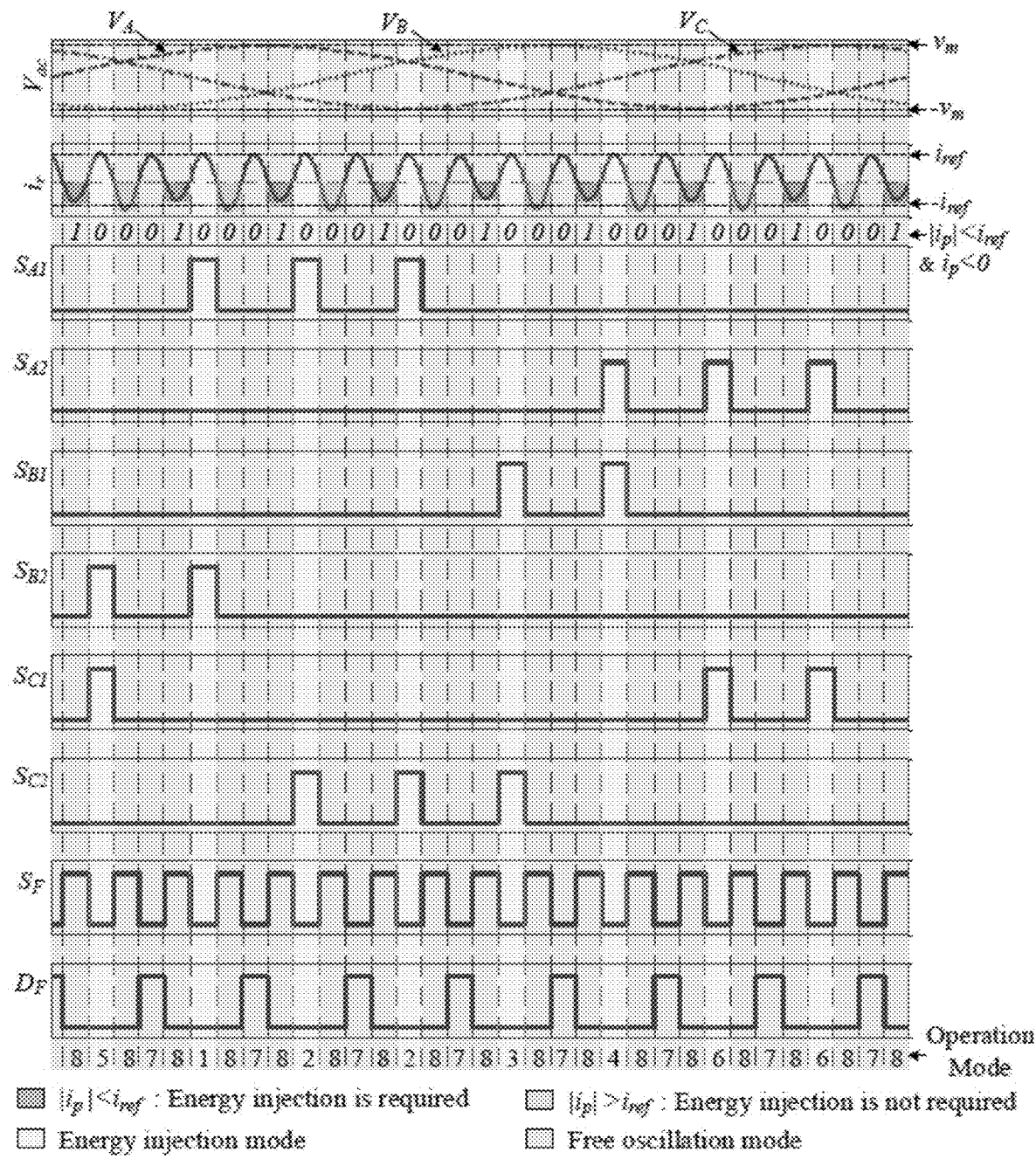
FIG. 3 shows a conceptual plot of three phase input voltages, resonant current and corresponding switching signals of a converter in different operation modes, according to an embodiment of the present invention.
Figure 4:
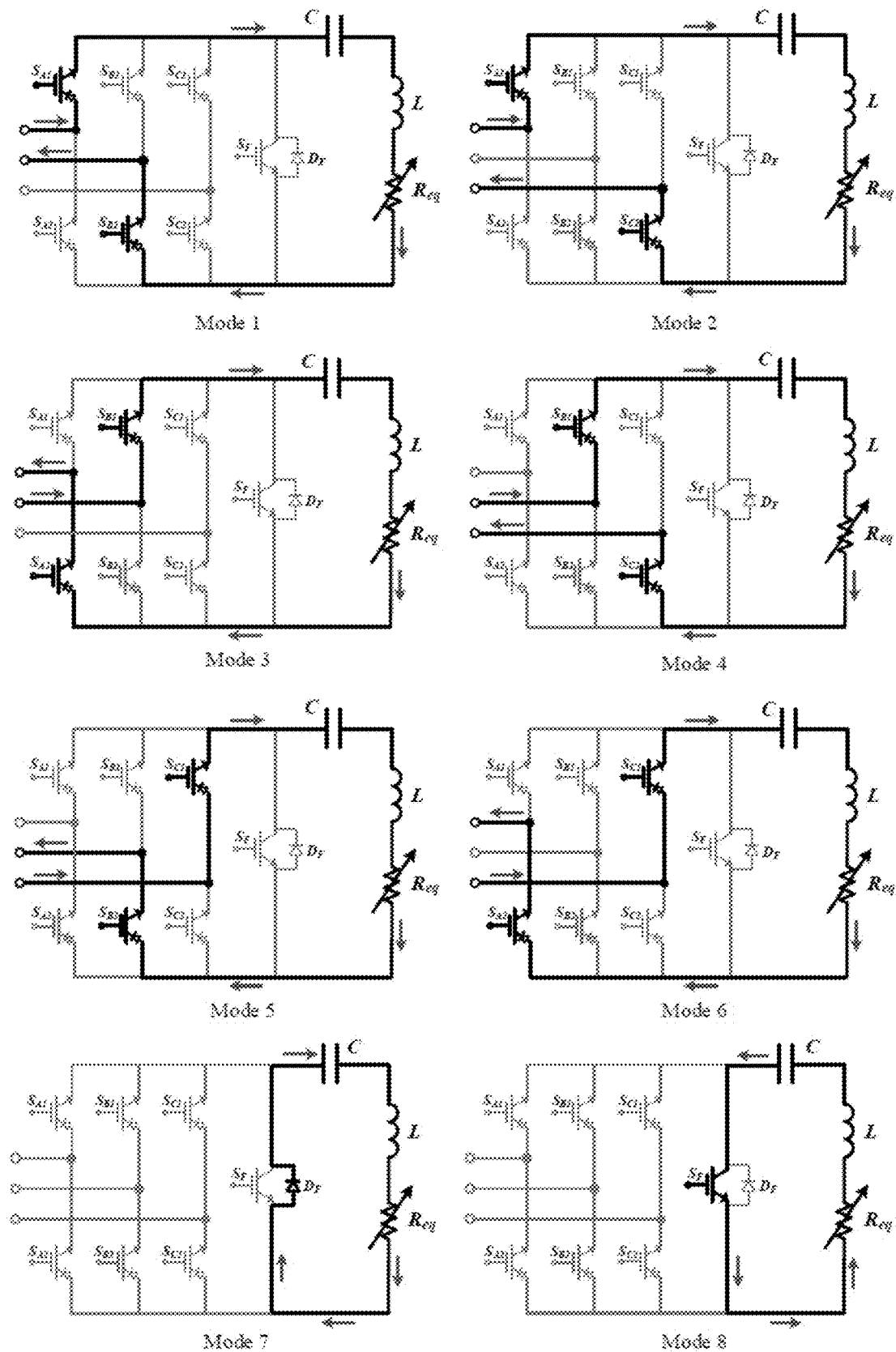
FIG. 4 shows current paths of eight modes of operation in a converter, according to an embodiment of the present invention.

According to Table I, the converter should enter one of the energy injection modes 1 to 6, depending on the three-phase input voltages. Moreover, if $i_p$ is positive or its absolute value is more than $i_{ref}$ ($i_p$>0 or $|i_p|$>$i_{ref}$), the converter should enter one of the free oscillation modes 7 and 8. A conceptual plot of three-phase input voltages, resonant current and corresponding switching signals of the converter in different modes of operation is presented in FIG. 3. FIG. 4 illustrates the resonant current path in a converter in 8 modes of operation, according to an embodiment of the present invention. In each energy-injection mode, the LC tank terminals are switched between the most positive and the most negative input lines. According to Table I, the switching is performed using six reverse-blocking switches, $S_{A1}$, $S_{A2}$, $S_{B1}$, $S_{B2}$, $S_{C1}$ and $S_{C2}$, which are used to switch the three-phase input lines to the output during modes 1 to 6, based on the measured input voltages. It should be noted that the energy injection according to this embodiment occurs in positive half-cycles of the resonant current. In free-oscillation modes, the negative half-cycles of the resonant current are conducted through the parallel switch $S_F$ (mode 8) and the positive half-cycles of the resonant current are conducted through the intrinsic body diode $D_F$ (mode 7). It should be noted that negative half-cycles are always free-oscillation modes; therefore, $S_F$ is switched at the rate of the resonance frequency. Since the resonant current becomes negative after any mode from 1 to 7, mode 8 always occurs after any other mode of operation.

The voltage limit in the LC tank and particularly in the compensation capacitor is of great importance. This voltage limit is governed by the insulation level of the primary coils/tracks and the voltage rating of the compensation capacitor. The voltage regulation control can be achieved using an approach similar to the current regulation control mode. In the following paragraphs it will be shown that the peak resonant voltage occurs in each resonant current zero-crossing. Therefore, the resonant voltage can be measured in each current zero-crossing and peak voltage detection is not required.

In voltage regulation control mode, if the peak resonant voltage is negative and its absolute value is lower than the reference voltage ($v_p$<0 and $|v_p|$<$v_{ref}$), then according to Table III, the circuit will enter one of the energy injection modes 1 to 6, depending on the three-phase input voltages. Therefore, energy will be injected to the LC tank for a half cycle to increase the resonant voltage, and the LC tank terminals are switched between the most positive and the most negative input lines. The switching can be performed using six switches, $S_{A1}$, $S_{A2}$, $S_{B1}$, $S_{B2}$, $S_{C1}$ and $S_{C2}$, which are used to switch the three-phase input lines to the output during modes 1 to 6, according to Table II and based on the measured input voltages. Mode 7 occurs when the peak voltage is negative and its absolute value is higher than the reference voltage ($v_p<0$ and $|v_p|>v_{ref}$) and therefore energy injection to LC tank should be avoided for a half cycle to decrease the resonant voltage. In this mode, the LC tank enters a free oscillation state and the resonant current is positive, which is conducted through the intrinsic body diode ($D_F$) of the parallel switch ($S_F$) for mode 7 as shown in FIG. 4. In mode 8, the resonant current is negative and the switch $S_F$ is on. Since the resonant current becomes negative after any mode from 1 to 7, mode 8 always occurs after any other mode of operation.

TABLE I

SWITCHING STATES IN DIFFERENT MODES OF OPERATION IN CURRENT REGULATION CONTROL MODE.

| Mode | Resonant Current | Input Voltages | Conducting Switches |
|---|---|---|---|
| 1 | ip < 0, \|ip\| < $i_{ref}$ | $V_b < V_c < V_a$ | $S_{A1}$, $S_{B2}$ |
| 2 | ip < 0, \|ip\| < $i_{ref}$ | $V_c < V_b < V_a$ | $S_{A1}$, $S_{C2}$ |
| 3 | ip < 0, \|ip\| < $i_{ref}$ | $V_a < V_c < V_b$ | $S_{B1}$, $S_{A2}$ |
| 4 | ip < 0, \|ip\| < $i_{ref}$ | $V_c < V_a < V_b$ | $S_{B1}$, $S_{C2}$ |
| 5 | ip < 0, \|ip\| < $i_{ref}$ | $V_b < V_a < V_c$ | $S_{C1}$, $S_{B2}$ |
| 6 | ip < 0, \|ip\| < $i_{ref}$ | $V_a < V_b < V_c$ | $S_{C1}$, $S_{A2}$ |
| 7 | ip < 0, \|ip\| > $i_{ref}$ | — | $D_F$ |
| 8 | ip > 0 | — | $S_F$ |

TABLE II

SWITCHING STATES IN DIFFERENT MODES OF OPERATION IN VOLTAGE REGULATION CONTROL MODE.

| Mode | Resonant Voltage & Current | Input Voltages | Conducting Switches |
|---|---|---|---|
| 1 | vp < 0, \|vp\| < $v_{ref}$ | $V_b < V_c < V_a$ | $S_{A1}$, $S_{B2}$ |
| 2 | vp < 0, \|vp\| < $v_{ref}$ | $V_c < V_b < V_a$ | $S_{A1}$, $S_{C2}$ |
| 3 | vp < 0, \|vp\| < $v_{ref}$ | $V_a < V_c < V_b$ | $S_{B1}$, $S_{A2}$ |
| 4 | vp < 0, \|vp\| < $v_{ref}$ | $V_c < V_a < V_b$ | $S_{B1}$, $S_{C2}$ |
| 5 | vp < 0, \|vp\| < $v_{ref}$ | $V_b < V_a < V_c$ | $S_{C1}$, $S_{B2}$ |
| 6 | vp < 0, \|vp\| < $v_{ref}$ | $V_a < V_b < V_c$ | $S_{C1}$, $S_{A2}$ |
| 7 | vp < 0, \|vp\| > $v_{ref}$ | — | $D_F$ |
| 8 | ip > 0 | — | $S_F$ |

TABLE III

SWITCHING STATES IN DIFFERENT MODES OF OPERATION IN POWER REGULATION CONTROL MODE.

| Mode | Output Power & Resonant Current | Input Voltages | Conducting Switches |
|---|---|---|---|
| 1 | $P_{out} < P_{ref}$, ip < 0 | $V_b < V_c < V_a$ | $S_{A1}$, $S_{B2}$ |
| 2 | $P_{out} < P_{ref}$, ip < 0 | $V_c < V_b < V_a$ | $S_{A1}$, $S_{C2}$ |
| 3 | $P_{out} < P_{ref}$, ip < 0 | $V_a < V_c < V_b$ | $S_{B1}$, $S_{A2}$ |
| 4 | $P_{out} < P_{ref}$, ip < 0 | $V_c < V_a < V_b$ | $S_{B1}$, $S_{C2}$ |
| 5 | $P_{out} < P_{ref}$, ip < 0 | $V_b < V_a < V_c$ | $S_{C1}$, $S_{B2}$ |
| 6 | $P_{out} < P_{ref}$, ip < 0 | $V_a < V_b < V_c$ | $S_{C1}$, $S_{A2}$ |
| 7 | $P_{out} > P_{ref}$, ip < 0 | — | $D_F$ |
| 8 | ip > 0 | — | $S_F$ |

In dynamic IPT systems, due to inherent variations in the load, power transfer control is important. The power input regulation control can be achieved using an approach similar to current regulation control method. The peak current ($i_p$) and the input voltage ($V_{in}$) are measured. Considering that all negative half-cycles are free oscillation modes, and in free oscillation modes the input voltage is zero ($V_{in}=0$), the average output power ($P_{in}$) for a full-cycle (T) can be calculated as below:

$$P_{out} = \int_T i_p V_{in} = \frac{1}{\pi} i_p V_{in} \quad (1)$$

In this control mode, in each current zero crossing $P_{out}$ is compared to a reference power ($P_{ref}$) and if the average output power ($P_{out}$) in one half cycle is lower than the reference power ($P_{ref}$), the circuit will enter one of the energy injection modes 1 to 6, depending on the three-phase input voltages based on Table III. Therefore, energy will be injected to the LC tank in the next half cycle to increase the resonant current, and the LC tank terminals are switched between the most positive and the most negative input lines. According to Table III, the switching is performed using six switches, $S_{A1}$, $S_{A2}$, $S_{B1}$, $S_{B2}$, $S_{C1}$ and $S_{C2}$, which are used to switch the three-phase input lines to the output during modes 1 to 6, based on the measured input voltages. Mode 7 occurs when the average output power ($P_{out}$) is higher than the reference power ($P_{ref}$); therefore, energy injection to LC tank should be avoided for a half cycle to decrease the resonant current. In this mode, the LC tank enters a free oscillation state and the resonant current is positive, which is conducted through the intrinsic body diode ($D_F$) of the parallel switch ($S_F$) for mode 7, as shown in FIG. 4. In mode 8, the resonant current is negative and the switch $S_F$ is on. Since the resonant current becomes negative after any mode between 1 to 7, mode 8 always occurs after any other mode of operation.

A theoretical analysis of converter topologies and modes of operation will now be discussed. The differential equation of a LC tank with a primary self-inductance of L, and a compensation capacitor C with an equivalent resistance of R can be expressed as:

$$L\frac{di}{dt} + R_{eq}i + \frac{1}{C}\int_0^t i\,dt + v_a(0) = V_t \quad (2)$$

where i is the resonant current, $v_c$ is the voltage of the compensation capacitor and $V_t$ is the input voltage. Equation (2) can be rewritten as the following second order differential equation:

$$\frac{d^2i}{dt^2} + \frac{R_{eq}}{L}\frac{di}{dt} + \frac{1}{LC}i = 0 \quad (3)$$

where the initial conditions of the circuit are:

$$i(0) = 0 \quad (4)$$

$$L\frac{di}{dt}(0) = V_t - v_c(0)$$

The solution of (3) based on initial conditions in (4) is derived as:

$$i = Ke^{-t/\tau}\sin(\omega t) \quad (5)$$

where the natural damped frequency $\omega=\sqrt{\omega_0^2-\alpha^2}$, resonant frequency $\omega_0=1/\sqrt{LC}$, damping coefficient $\alpha=R_{eq}/2L$, damping time constant $\tau=2L/R$, and the coefficient K is expressed as:

$$K = \frac{V_t - v_c(0)}{\omega L} \quad (6)$$

Equation (5) shows that the peak current decreases exponentially with a time constant of $\tau$ and (6) shows that the value of K changes in each half cycle depending on the input voltage and initial voltage of the compensation capacitor. It should be noted that in the free oscillation modes the input voltage is zero ($V_t=0$). Also, the compensation capacitor voltage can be expressed as:

$$v_c(t) = v_c(0) + \frac{K\tau}{C(1+\tau^2\omega^2)}(\tau\omega - e^{-t/\tau}[\sin(\omega t) + \tau\omega\cos(\omega t)]) \quad (7)$$

The resonant current and voltage equations (5) and (7) can be used for finding the peak values of current and voltage in each half cycle. In order to find the peak value of the resonant current $i_n$, which occurs at the time $t_n$ corresponding to the nth current peak, the following equation can be solved to find the extremum points of the resonant current:

$$\frac{di}{dt} = Ke^{-t/\tau}\left[\omega\cos(\omega t) - \frac{1}{\tau}\sin(\omega t)\right] = 0 \quad (8)$$

By simplifying (8) the following equations are derived:

$$\tan(\omega t_n) = \tau\omega \quad (9)$$

$$t_n = \frac{\text{atan}(\tau\omega) + n\pi}{\omega} \quad (10)$$

Therefore, the $n^{th}$ peak value of the resonant current can be calculated using (5) and (10) as the following equation:

$$i_n = Ke^{-\frac{\text{atan}(\tau\omega)+n\pi}{\tau\omega}}(-1)^n \frac{\tau\omega}{\sqrt{1+(\tau\omega)^2}} \quad (11)$$

Similarly the peak values of the resonant voltage can be found using (7) as follows:

$$\frac{dv_c}{dt} = -\frac{K\tau e^{-t/\tau}}{C(1+\tau^2\omega^2)} \quad (12)$$

$$\left([\omega\cos(\omega t) - \tau\omega^2\sin(\omega t)] - \frac{1}{\tau}[\sin(\omega t) + \tau\omega\cos(\omega t)]\right) = 0$$

Equation (12) can be simplified by the following set of equations:

$$\frac{dv_c}{dt} = \frac{K}{C}e^{-t/\tau}\sin(\omega t) = 0 \quad (13)$$

$$\sin(\omega t_n) = 0 \quad (14)$$

$$t_n = \frac{n\pi}{\omega} \quad (15)$$

Based on (5), (13), (14) and (15) it can be seen that in each resonant current zero-crossing, resonant voltage is exactly at its peak. Since the control modes presented above are all based on resonance current zero-crossing points, the voltage regulation control mode can be established on peak values of resonant voltage in each current zero-crossing.

Using (5), the resonant current in a time period composed of both energy injection and free oscillation modes can be expressed as follows:

$$i(t) = \begin{cases} K_i e^{-t/\tau}\sin(\omega t) & 0 < t < \frac{\pi}{\omega} \\ K_f e^{-t/\tau}\sin(\omega t) & \frac{\pi}{\omega} < t < \frac{2m\pi}{\omega} \end{cases} \quad (16)$$

where m denotes the number of cycles, which is composed of one energy injection half cycle and 2m−1 free oscillation half cycles, $K_i$ and $K_f$ are coefficients of (5) in the first energy injection and free oscillation half cycles, respectively, and can be calculated using (6) and (7) as follows:

$$K_i = \frac{1}{\omega L}[V_i - v_c(0)] \quad (17)$$

$$K_f = \frac{1}{\omega L}\left[v_c\left(\frac{\pi}{\omega}\right)\right] = \frac{1}{\omega L}\left[v_c(0) + \frac{K_i\tau^2\omega}{C(1+\tau^2\omega^2)}(1+e^{-\pi/\tau\omega})\right] \quad (18)$$

By assuming $i_{ref}$ as the reference current, using (11) and (12) the number of cycles that the next energy injection should occur (m) can be calculated as follows:

$$m = \frac{1}{\pi}\left[\tau\omega\ln\left(\frac{K_f\tau\omega}{i_{ref}\sqrt{1+(\tau\omega)^2}}\right) + \arctan(\tau\omega)\right] \quad (19)$$

Equation (19) predicts the number of cycles in which the LC tank will continue its free oscillation mode, after an energy-injection mode, as a function of initial condition ($K_f$), circuit parameters ($\tau\omega$) and the reference current $i_{ref}$. A duty-cycle can be defined as the ratio of the number of energy injection modes to the number of free-oscillation modes in the time interval between two successive energy injection modes, and can be written as follows:

$$D_i = \frac{1}{m+1} = \frac{f_{inj}}{f_r} \quad (20)$$

where $f_{inj}$ is the switching frequency of the energy-injection modes and $f_r$ is the resonance frequency of the LC tank. The duty-cycle $D_i$, is a measure that represents the energy demand for the LC tank. For example, in FIG. 3, this measure is $D_i=0.5$, which shows that only half of the cycles energy needs to be injected to the LC tank.

A. Converter Loss Analysis

The power loss of a converter according to an embodiment of the present invention can be calculated by evaluating the conduction and switching losses of the power switches in different modes of operation. The loss of each power switch is composed of switching and conduction losses and can be written as follows:

$$P_{Sx} = P_{Scon} + P_{Ssw} = [V_F I_{avg} + R_F I_{rms}^2]T_{con}f_{sw} + [(E_{on} + E_{off}) + \frac{1}{2}C_{oss}V_{in}^2]f_{sw} \quad (21)$$

where $P_{Scon}$ and $P_{Ssw}$ are the conduction and switching losses of the switch $S_x$, respectively, $V_F$ is the forward voltage of the power switch (in power MOSFETs, $V_F$=0), $R_F$ is the equivalent resistance of the switch during the on state, $I_{avg}$ and $I_{rms}$ are the mean and RMS values of the conducted current, respectively, $T_{con}$ is the conduction time of the switch, $f_{sw}$ is the switching frequency, $E_{on}$ and $E_{off}$ are volt-ampere crossover energy losses during the switch turn-on and turn-off transitions, respectively, $C_{oss}$ is the output capacitance of the switch, and $V_{in}$ is the input voltage. Since ZCS switching can always be performed, the switching losses from volt-ampere crossover are minimized and thus are relatively low. Therefore, the conduction losses dominate, followed by the losses due to $C_{oss}$ (output losses). The losses associated with any diode in the converter are composed of conduction and reverse recovery losses and can be calculated as below:

$$P_{Dx}=P_{Dcond}+P_{Drr}=V_{FD}I_{avg}T_{con}f_{sw}+E_{rr}f_{sw} \quad (22)$$

where $P_{Dcond}$ and $P_{Drr}$ are the conduction and reverse recovery losses of the diode $D_x$, respectively, $V_{FD}$ is the forward voltage of the diode and $E_{rr}$ is the reverse recovery energy of the diode. The losses of the converter can be determined by calculating the losses associated with energy-injection and free-oscillation modes separately, considering the fact that the switching frequency of all the switches are $f_{inj}=D_{if_r}$, except $S_F$ which has switching frequency of $f_r$. In each energy injection mode (modes 1 to 6) two reverse blocking switches can be used; therefore, the losses associated with energy injection modes ($P_{in}$) can be described as below:

$$P_{inj}=2D_i(P_{Sx}+P_{Dx}) \quad (23)$$

It should be noted that if the switches $S_{A1}$, $S_{A2}$, $S_{B1}$, $S_{B2}$, $S_{C1}$ and $S_{C2}$ can be switches with built-in reverse blocking capability, $P_{Dx}$ loss is eliminated in (23), and as a result the efficiency of the converter will be increased. Since $S_F$ and its body diode $D_F$ are the only switches involved in free oscillation modes, the losses associated with free oscillation modes ($P_{osc}$) can be calculated as follows:

$$P_{osc}=P_{Sx}+D_iP_{Dx} \quad (24)$$

Finally the total dissipated power can be described as follows:

$$P_{loss}=P_{inj}+P_{osc} \quad (25)$$

TABLE IV

TYPICAL VALUES FOR PARAMETERS USED FOR THEORETICAL CONVERTER LOSS CALCULATION.

| Parameter | Description | Typical Value |
|---|---|---|
| $V_F$ | Switch forward voltage | 1.5 V |
| $R_F$ | Equivalent ON-state resistance | 0.08 Ω |
| $C_{oss}$ | Output capacitance | 250 pF |
| $E_{on} + E_{off}$ | Switching volt-ampere crossover energy losses | 2 mJ |
| $V_{FD}$ | Diode forward voltage | 1.8 V |
| $E_{rr}$ | Reverse recovery energy loss | 200 μJ |

Figure 6:
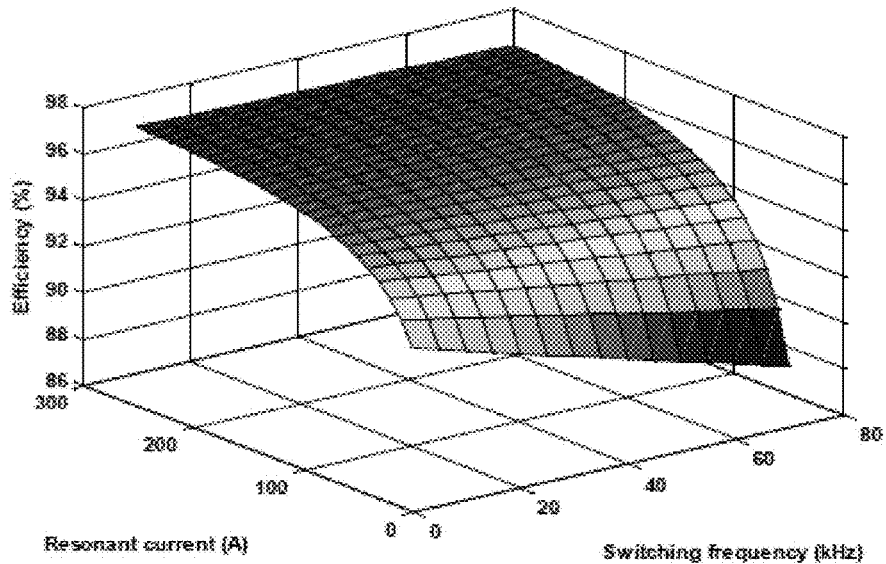
FIG. 6 shows the efficiency of a converter according to an embodiment of the present invention versus frequency ($f_{sw}$) and resonant current ($i_r$), calculated analytically.

Typical values for high power switches and diodes for a 50 A output current are presented in Table IV. However, for different values of current, these typical values should be modified accordingly. FIG. 6 presents the efficiency of a converter according to an embodiment of the present invention versus resonant current and switching frequency, which is calculated based on Table IV and equations (21)-(25). This figure shows that the efficiency of the converter increases as the resonant current increases, and any change in the switching frequency does not affect the efficiency significantly in high resonant currents. According to this analysis, the maximum efficiency of the converter can reach 96.6%.

Figure 14:
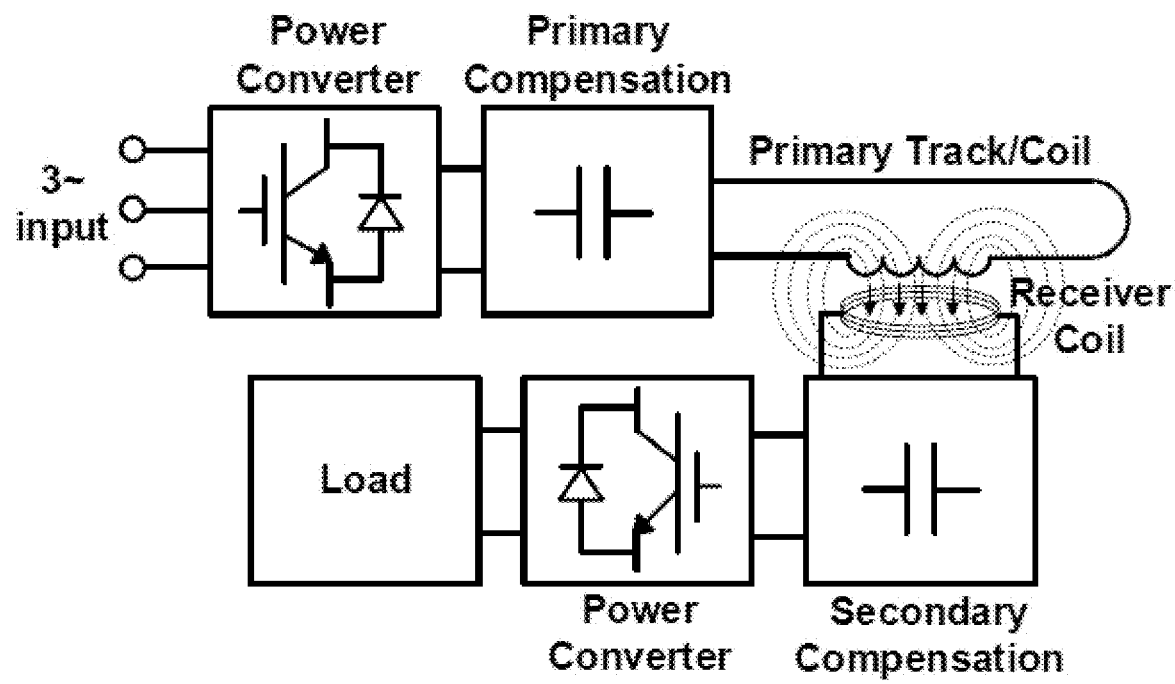
FIG. 14 is a diagram of a generic loosely coupled IPT system.

FIG. 14 shows a generic IPT system that is composed of power converters, loosely coupled magnetic structures and compensation components. Due to its loose magnetic structure, different control methods for IPT systems and resonant converters have been proposed. These methods include power-frequency control, phase-shift and frequency control, load detection, power flow control, and sliding mode control (SMC). Control methods can have self-tuning capability. This feature makes controllers suitable for dynamic IPT applications in which the resonance frequency of the system may have small variations due to load variations on the receiver side. Furthermore, control methods can have additional applications such as energy encryption, wherein the IPT system has a variable resonance frequency and is used with different compensation capacitors.

One effective method for controlling an IPT system is amplitude modulation of the resonant current based on an energy injection and free-oscillation technique. This control technique can be designed for wide range of converter topologies including two-stage AC/DC/AC and single-stage matrix converters. This technique has been successfully employed in single-phase and three-phase matrix converters to effectively regulate resonant current. However, the exiting controllers are typically digital and designed based on DSP/FPGA. Since digital controllers have a limited sampling rate and processing speed, they are not well suited for high-frequency control of IPT systems. On the other hand, SAE TIR J2954 standard establishes a common frequency band using 85 kHz (81.39-90 kHz) for electric vehicle inductive charging systems. Thus, due to high operating frequency requirements of IPT systems, the use of digital controllers for IPT applications is complex and requires high processing speeds, which increases costs.

Embodiments of the present invention include a sliding mode controller (SMC) for inductive power transfer (IPT) systems based on an energy injection, free-oscillation amplitude modulation technique. Embodiments of the present invention include a design methodology of an SMC for two-stage AC/DC/AC converter topologies. According to an embodiment of the present invention, an SMC has self-tuning capability that allows the controller to synchronize the switching operations of the power electronic converters to the resonant current and enables soft-switching operations. According to an embodiment, a simplified SMC is presented that eliminates the need for high-cost DSP/FPGA controllers and can operate at higher speeds than digital controllers, while still having significantly lower costs. Therefore, embodiments of the present invention can be suitable for IPT applications in which high operating frequencies are required.

Figure 15A:
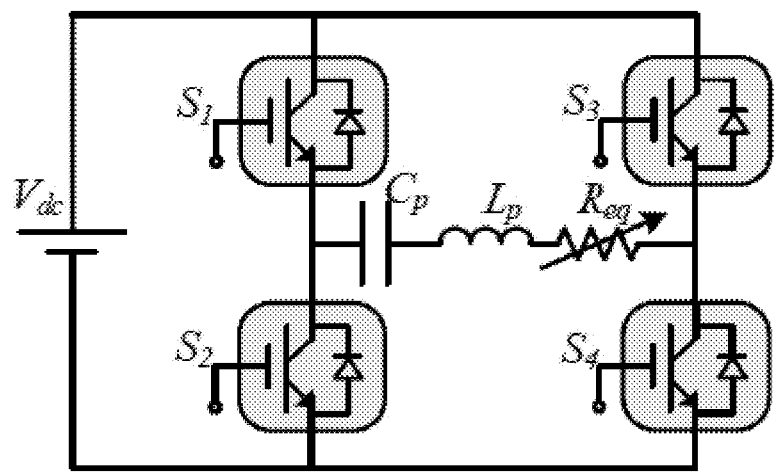
FIG. 15A shows full-bridge converter topology and the equivalent circuit of IPT systems.
Figure 15B:
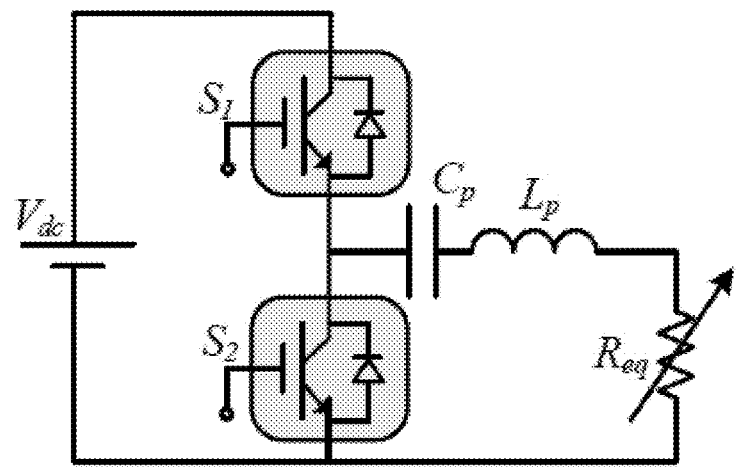
FIG. 15B shows half-bridge converter topology and the equivalent circuit of IPT systems.
Figure 16:
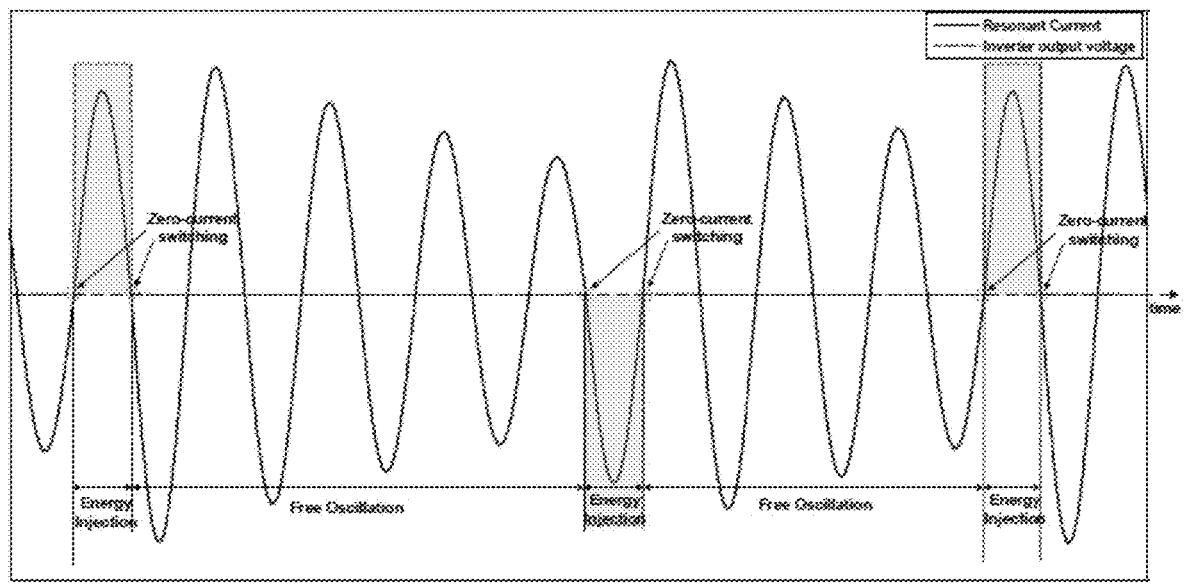
FIG. 16 shows a conceptual plot of resonant current and inverter output voltage based on energy injection and free oscillation technique.

FIGS. 15A and 15B show full-bridge and half-bridge converter topologies, respectively. These converters are connected to an equivalent circuit of an IPT system with a series capacitance C, a primary inductance L, and an equivalent resistance R which represents the reflected load from the secondary circuit to the primary. The sliding mode control (SMC) can be designed based on the energy injection and free-oscillation technique for resonant circuits with LC tanks. A plot of resonant current and inverter output voltage is shown in FIG. 16. As seen in FIG. 16, each half-cycle can be either an energy-injection mode or a free-oscillation mode. The transition to different modes only occurs at zero-crossing points, which ensures soft-switching operation of the converter. In energy-injection modes, energy is injected into the LC tank from the DC voltage source, thus increasing the resonant current. On the other hand, in free-oscillation modes the LC tank continues its oscillation without any energy injection from the DC source, thus decreasing the resonant current. Therefore, resonant current can be regulated around a predefined reference current by constantly switching between these two operation modes. The state-space equations of an IPT system connected to any of the converters of FIG. 15 can be written as follows:

$$x(t) = \begin{bmatrix} v_c(t) \\ i_l(t) \end{bmatrix} \tag{26}$$

$$\dot{x}(t) = Ax(t) + Bu(t) \tag{27}$$
$$y(t) = Cx(t) + Du(t)$$

where $v_c(t)$ is the voltage of the capacitor C and $i_l(t)$ is the resonant current of the LC tank and:

$$A = \begin{bmatrix} 0 & \frac{1}{C} \\ -\frac{1}{L} & -\frac{R}{L} \end{bmatrix}, B = \begin{bmatrix} 0 \\ \frac{1}{L} \end{bmatrix}, C = [0\ 1], D = 0 \tag{28}$$

Assuming that each half-cycle starts at a current zero-crossing, the initial condition and the input can be written as follows:

$$x(0) = \begin{bmatrix} v_0 \\ 0 \end{bmatrix}, u = v_{in} \tag{29}$$

where $v_0$ is the initial capacitor voltage and $v_{in}$ is the input voltage across the LC tank. The solution to (27) in Laplace domain can be written as:

$$X(s) = (sI - A)^{-1}\left[x(0) + B\frac{v_{in}}{s}\right] \tag{30}$$

Using (28) and (29), (30) can be rewritten as follows:

$$X(s) = \begin{bmatrix} \frac{v_{in}}{s(CLs^2 + CRs + 1)} + \frac{Cv_0(R + Ls)}{CLs^2 + CRs + 1} \\ \frac{Cv_{in}}{CLs^2 + CRs + 1} - \frac{Cv_0}{CLs^2 + CRs + 1} \end{bmatrix} \tag{31}$$

By applying inverse Laplace transform to (31), the time domain solution x(t) can be written as follows:

$$x(t) = \begin{bmatrix} v_{in} + (v_0 - v_{in})e^{-t/\tau}\left[\cos(\omega t) + \frac{1}{\tau\omega}\sin(\omega t)\right] \\ \frac{(v_{in} - v_0)}{\omega L}e^{-t/\tau}\sin(\omega t) \end{bmatrix} \text{where,} \tag{32}$$

$$\omega = \sqrt{\frac{1}{LC} - \frac{R^2}{4L^2}}, \tau = \frac{2L}{R} \tag{33}$$

Equation (32) gives the resonant current and voltage for each half-cycle based on the initial capacitor voltage $v_0$ and input voltage $v_{in}$. The half-cycles wherein $v_{in}=V_{dc}$ or $v_{in}=-V_{dc}$ are energy-injection half-cycles while the half-cycles wherein $v_{in}=0$ are free-oscillation half-cycles. Using (32), the peak resonant current in each half cycle $i_p$, which occurs at the time $t_p$ can be found by solving the following equation:

$$\frac{di_l}{dt} = \frac{(v_{in} - v_0)}{\omega L}e^{-t_p/\tau}\left[\omega\cos(\omega t_p) - \frac{1}{\tau}\sin(\omega t_p)\right] = 0 \tag{34}$$

By simplifying (34), $t_p$ can be calculated as follows:

$$t_p = \frac{\arctan(\tau\omega)}{\omega} \tag{35}$$

By substituting (35) in (32), the peak resonant current $i_p$ can be calculated:

$$i_p = -\frac{(v_{in} - v_0)}{\omega L}e^{-\frac{\arctan(\tau\omega)}{\tau\omega}}\frac{\tau\omega}{\sqrt{1 + (\tau\omega)^2}} \tag{36}$$

Based on the energy-injection and free-oscillation control technique, the transitions always occur at resonant current zero-crossing points. Therefore, the state-space model presented in (27) can be discretized in order to simplify the design procedure of the SMC. Thus, the sampling time $T_s$ is defined as:

$$T_s = \frac{\pi}{\omega} \tag{37}$$

The equivalent discretized state-space model given by (27) can be rewritten as follows:

$$x[k] = \begin{bmatrix} v_c[k] \\ i_l[k] \end{bmatrix} \tag{38}$$

$$x[k+1] = A_d x[k] + B_d u[k] \tag{39}$$
$$y[k+1] = C_d x[k] + D_d u[k]$$

where $A_d$ and $B_d$ can be calculated as follows:

$$A_d = \mathcal{L}^{-1}\{(sI-A)^{-1}\}_{t=T_s} \tag{40}$$

$$B_d = A^{-1}(A_d - I)B \tag{41}$$

Using (28), (40) and (41) can be simplified as follows:

$$A_d = \begin{bmatrix} -e^{-\pi/\tau\omega} & 0 \\ 0 & -e^{-\pi/\tau\omega} \end{bmatrix} \tag{42}$$

$$B_d = [1 + e^{-\pi/\tau\omega}\ 0] \tag{43}$$

Also, based on the discretized model given by (39), the discretized peak resonant current can be rewritten as follows:

$$i_p[k] = (u[k] - x_1[k])\frac{\tau e^{-arctan(\tau\omega)/\tau\omega}}{L\sqrt{1+(\tau\omega)^2}} \quad (44)$$

To design an SMC based on energy-injection and free-oscillation techniques to perform amplitude modulation on resonant current, a sliding surface is defined based on the peak resonant current given by (44) as follows:

$$\sigma[k] = |i_p[k]| - i_{ref} \quad (45)$$

wherein σ[k] is the discrete sliding surface and $i_{ref}$ is the reference current. The reaching law of the SMC can be formulated as follows:

$$(\sigma[k+1] - \sigma[k])\sigma[k] < 0 \quad (46)$$

TABLE V

SWITCHING STATES IN DIFFERENT MODES OF OPERATION IN FULL-BRIDGE CONTROLLER.

| Mode | Type | sign($i_r$) | sign(σ[k]) | $S_1$ | $S_2$ | $S_3$ | $S_4$ |
|---|---|---|---|---|---|---|---|
| 1 | energy injection | 1 | 1 | 1 | 0 | 0 | 1 |
| 2 | energy injection | 0 | 1 | 0 | 1 | 1 | 0 |
| 3 | free oscillation | 1 | 0 | 1 | 0 | 0 | 0 |
| 4 | free oscillation | 0 | 0 | 0 | 1 | 0 | 0 |

Using (45) and (46) the following can be derived:

$$(|i_p[k+1]| - |i_p[k]|)\sigma[k] < 0 \quad (47)$$

Based on (47) the feedback control law u[k] is picked so that the discrepancy between consecutive resonant current peaks and σ[k] have opposite signs. In other words, whenever σ[k]<0, energy injection to the LC tank should be performed to increase the peak resonant current and, whenever σ[k]>0, the LC tank should continue its free-oscillation. In a full-bridge converter as shown in FIG. 15A, the input voltage of the LC tank can be either $V_{dc}$, $-V_{dc}$ or 0. As a result, based on (47), the control law for a full-bridge converter can be derived:

$$u[k+1] = \begin{cases} V_{dc} & \sigma[k]<0, i_p[k]<0 \\ -V_{dc} & \sigma[k]<0, i_p[k]>0 \\ 0 & \sigma[k]>0 \end{cases} \quad (48)$$

Figure 17:
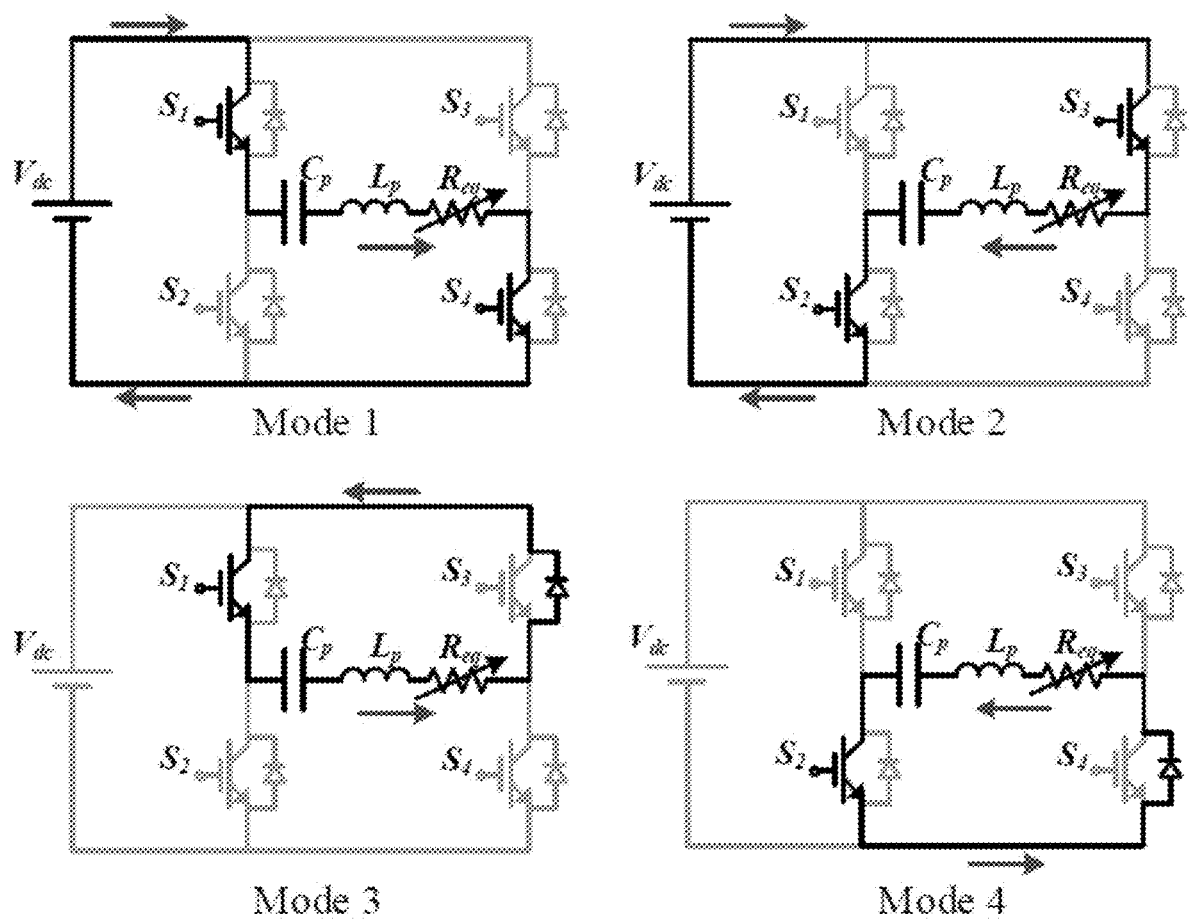
FIG. 17 shows diagrams of sliding control modes for full bridge resonant inverters according to an embodiment of the present invention.

Based on (48) a full-bridge converter according to an embodiment of the present invention can have four operation modes, which are presented in Table V. The presented operation modes can be determined according to the sign of σ and peak resonant current $i_p$ in each half-cycle. In FIG. 17, the resonant current path in four different operation modes is presented, according to an embodiment of the present invention. As demonstrated in Table V and FIG. 17, the switching signals of the full-bridge converter is as follows:

$$S_1 = \text{sign}(i_r) \quad S_2 = \overline{\text{sign}(i_r)}$$

$$S_3 = \overline{\text{sign}(i_r)} \cdot \text{sign}(\sigma[k]) \quad S_3 = \overline{\text{sign}(i_r)} \cdot \text{sign}(\sigma[k]) \quad (49)$$

Similarly, control switching states for a half-bridge converter shown in FIG. 15B, according to an embodiment of the present invention, can be:

$$u[k+1] = \begin{cases} V_{dc} & \sigma[k]<0, i_p[k]<0 \\ 0 & \sigma[k]>0 \end{cases} \quad (50)$$

TABLE VI

SWITCHING STATES IN DIFFERENT MODES OF OPERATION IN HALF-BRIDGE CONTROLLER.

| Mode | Type | sign($i_r$) | sign(σ[k]) | $S_1$ | $S_2$ |
|---|---|---|---|---|---|
| 1 | energy injection | 1 | 1 | 1 | 0 |
| 2 | free oscillation | 0 | X | 0 | 1 |
| 3 | free oscillation | 1 | 0 | 0 | 0 |

Based on (50), a half-bridge converter will have three operation modes, which are presented in Table VI. These operation modes are determined according to the sign of σ and peak resonant current $i_p$ in each half-cycle. The resonant current paths in four different operation modes, according to an embodiment of the present invention, are presented in FIG. 18. According to Table VI and FIG. 18, the switching signals of the full-bridge converter are:

$$S_1 = \text{sign}(i_r) \cdot \text{sign}(\sigma[k]) \quad S_2 = \overline{\text{sign}(i_r)} \quad (51)$$

Based on the control laws and corresponding switching signals derived for the full-bridge and half-bridge topologies, embodiments of the present invention can include SMCs designed for both topologies. A simplified design for both technologies will be presented next.

A. Full-Bridge Converter

Figure 18:
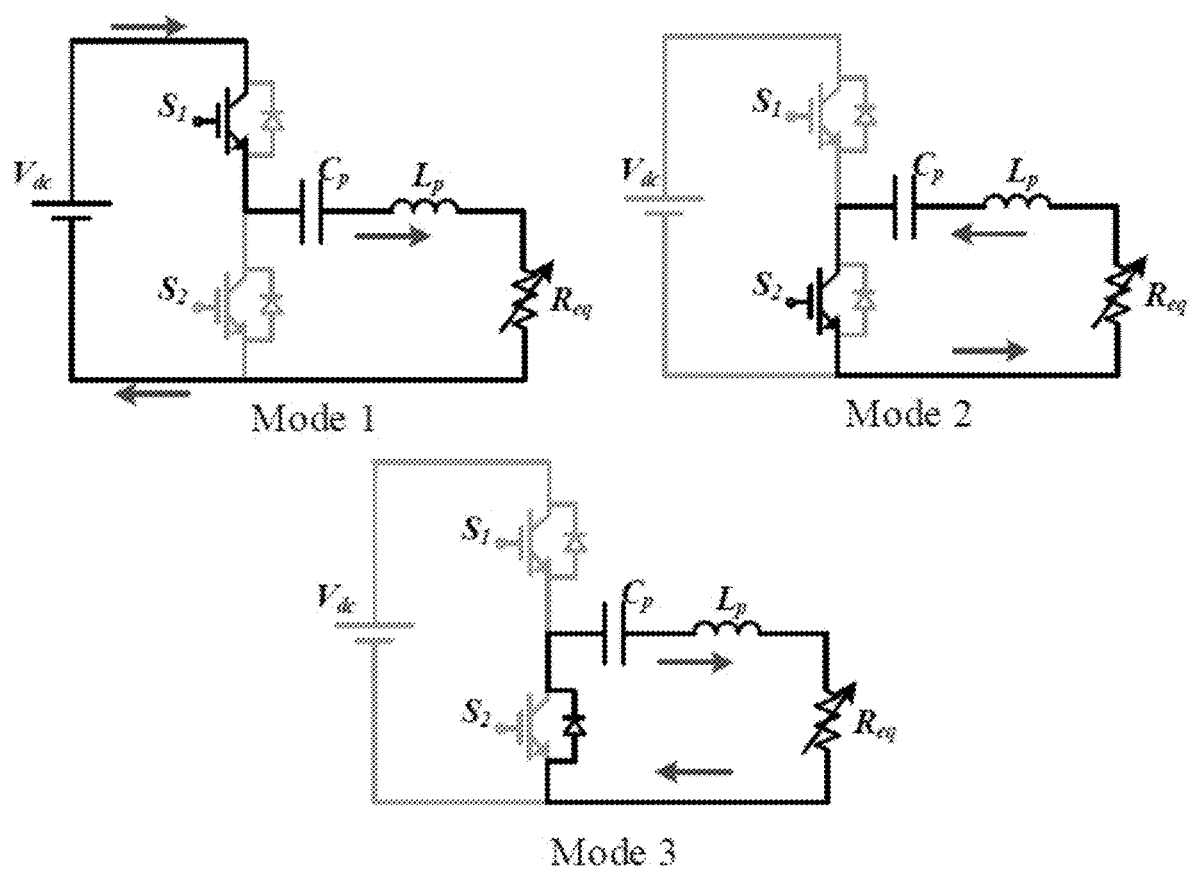
FIG. 18 shows the operation a half-bridge controller according to an embodiment of the present invention.

A self-tuning SMC for a full-bridge converter according to an embodiment of the present invention is shown in FIG. 18. The controller receives feedback from the resonant current of the LC tank as the input and generates the switching signals for the four switches of the full-bridge inverter. The operation of the converter can be described in four operation modes, which are presented in Table V and FIG. 17. The operation modes 1 and 2 are energy injection modes in which energy is injected to the LC tank, and the operation modes 3 and 4 are free oscillation modes in which the LC tank continues its resonant oscillation. The transition of different modes of operation occurs at each current zero-crossing point. Each mode starts at a resonant current zero-crossing, and continues for a half cycle until the next resonant current zero-crossing. This operation mode transition is determined based on the state of the circuit, as well as the user-defined reference values for the resonant current. The resonant current regulation can be achieved using a controller of the present invention by constantly switching between energy injection and free-oscillation modes.

The controller receives feedback from the resonant current of the LC tank as the input and generates the switching signals for the four switches of the full-bridge inverter. According to an embodiment of the present invention, the controller is composed of two differential voltage comparators, a peak detector, two D-type flip-flops, two AND gates, and a NOT gate. The first differential comparator can be used to detect resonant current zero-crossing points, as well as its direction. This can be done by comparing the resonant current signal (measured by a current sensor) to the ground (zero voltage level). The peak detector can detect the peak of the resonant current in each half-cycle. The D-type flip-flops save the state of the peak comparator for the next half-cycle (sign(σ[k])). These two flip-flops can be used to consider both positive and negative peaks of the resonant current. Similarly, the flip-flops are triggered using the output of the zero-cross comparator (sign($i_r$)). Since the direction of current changes at each current zero-crossing, the flip-flop will be triggered at each current zero-crossing point. Finally, AND and NOT gates can be used to generate the appropriate switching signals for $S_1$, $S_2$, $S_3$ and $S_4$ according to Table V.

Figure 19:
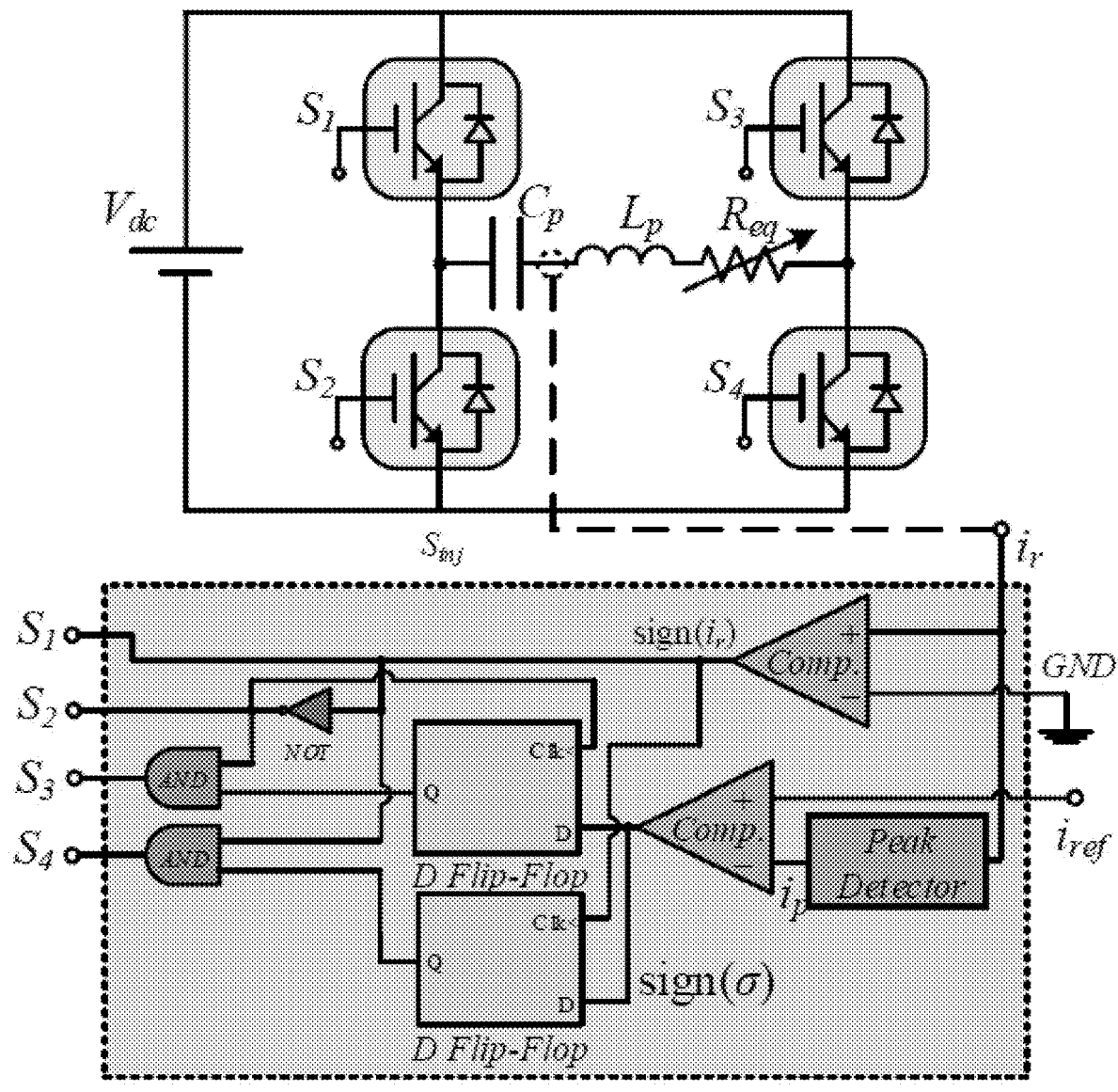
FIG. 19 shows a sliding mode controller for a full-bridge resonant inverter according to an embodiment of the present invention.

FIG. 19 shows a sliding mode controller for a full-bridge resonant inverter according to an embodiment of the present invention. The full-bridge sliding mode controller is designed based on the derived switching signals in equation (49). Based on (49), the controller takes the resonance current signal ($i_r$) and reference current ($i_{ref}$) and generates the switching signals $S_1$, $S_2$, $S_3$, and $S_4$. The full-bridge sliding mode controller can be designed by using two differential voltage comparators, a peak detector, two D-type flip-flops, two AND gates, and a NOT gate. The first differential comparator takes the resonant current measurement signal ($i_r$) as the input and generates sign($i_r$) signal which represents the direction of the resonant current, by comparing it to the zero level (ground). The NOT gate then takes the sign($i_r$) as an input used to output the $\overline{\text{sign}(i_r)}$ signal. The signal sign($\sigma[k]$) can be generated based on equation (45). In order to generate the sign($\sigma[k]$) signal based on equation (45), the peak current $i_p$ and the reference current $i_{ref}$ are compared. The peak detector takes the $i_r$ as input and outputs the peak current $i_p$. The second differential comparator is used compare to the peak current $i_p$ and the reference current $i_{ref}$ and generate sign($\sigma$). Two flip-flops are used to discretize sign($\sigma$) by using the sign($i_r$) and $\overline{\text{sign}(i_r)}$ as a clock source, in order to generate sign($\sigma[k]$). Based on (49), $S_1$ and $S_2$ should be connected to the sign($i_r$) and $\overline{\text{sign}(i_r)}$ signals, respectively. Two AND gates can also be used to generate the switching signals $S_3$ and $S_4$ by taking sign($i_r$), $\overline{\text{sign}(i_r)}$ and sign($\sigma[k]$) as inputs.

Figure 20:
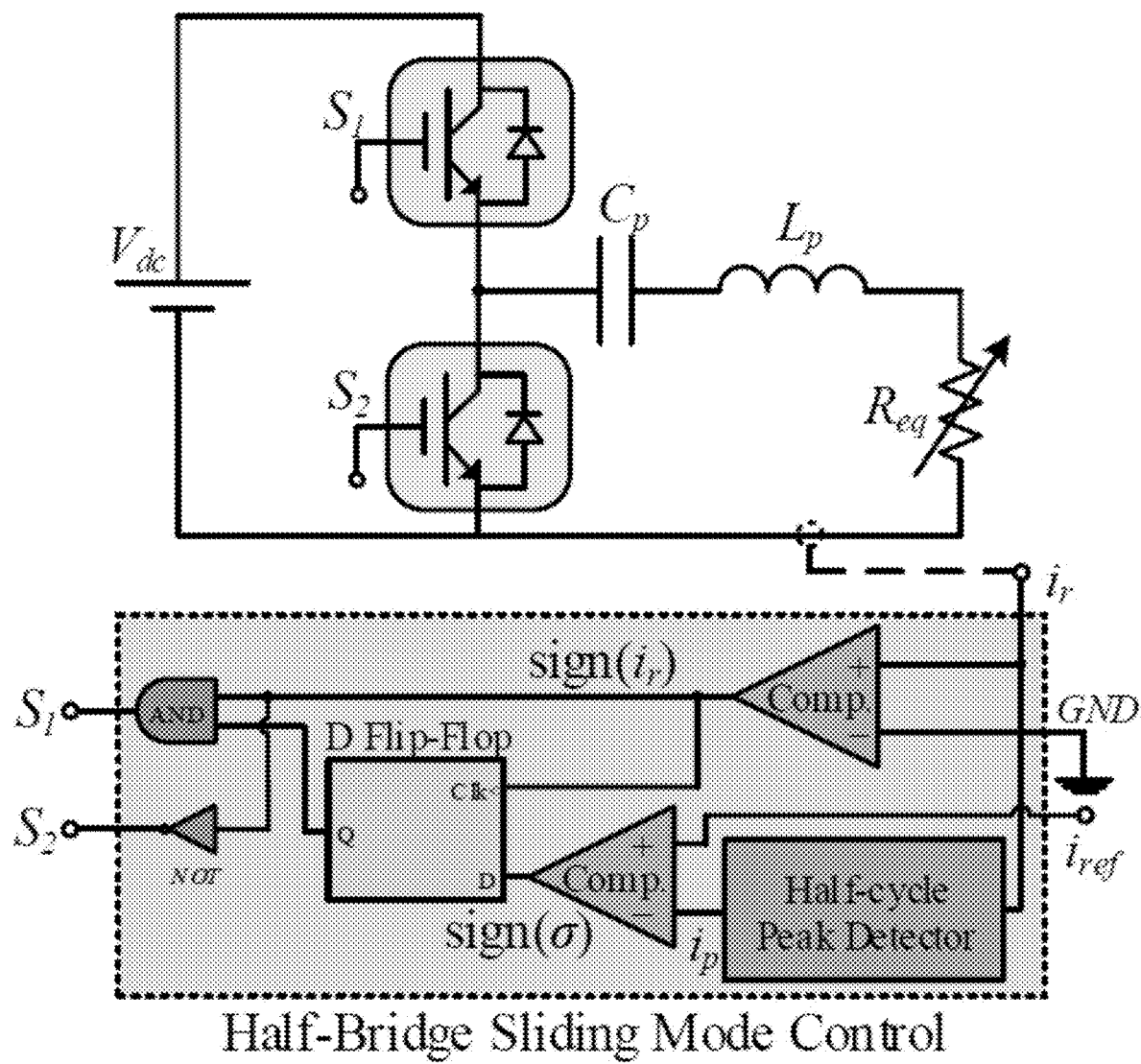
FIG. 20 shows a sliding mode controller for a full-bridge resonant inverter according to an embodiment of the present invention.

A self-tuning SMC for half-bridge converters, according to an embodiment of the present invention, is shown in FIG. 20. The half-bridge sliding mode controller is designed based on the derived switching signals in equation (51). Based on (51), the controller takes the resonance current signal ($i_r$) and reference current ($i_{ref}$) and generates the switching signals $S_1$ and $S_2$. The full-bridge sliding mode controller can be designed by using two differential voltage comparators, a peak detector, a D-type flip-flop, an AND gate, and a NOT gate. The first differential comparator takes the resonant current measurement signal ($i_r$) as the input and generates the sign($i_r$) signal, which represents the direction of the resonant current, by comparing it to the zero level (ground). The NOT gate then takes the sign($i_r$) as an input used to output the $\overline{\text{sign}(i_r)}$ signal. The signal sign($\sigma[k]$) can be generated based on equation (45). In order to generate the sign($\sigma[k]$) signal based on equation (45), the peak current $i_p$ and the reference current $i_{ref}$ are compared. The peak detector takes the $i_r$ as an input and outputs the peak current $i_p$. The second differential comparator is used to compare the peak current $i_p$ and the reference current $i_{ref}$ and generates sign($\sigma$). Two flip-flops are used to discretize sign($\sigma$) by using the sign($i_r$) and $\overline{\text{sign}(i_r)}$ as a clock source, in order to generate sign($\sigma[k]$). Based on (51), $S_2$ should be connected to the $\overline{\text{sign}(i_r)}$ signal and the AND gate is used to generate $S_2$ by taking sign($i_r$), $\overline{\text{sign}(i_r)}$ and sign($\sigma[k]$) as inputs.

The operation of the converter of FIG. 20 can be described in three modes, which are presented in Table VI and FIG. 18. Operation mode 1 is energy injection mode in which energy is injected to the LC tank. Operation modes 2 and 3 are free oscillation modes in which the LC tank continues its free oscillation. The transition of different modes of operation occurs at current zero-crossing points, which allows the circuit to operate with greater efficiency. Each mode starts at a resonant current zero-crossing, and continues for a half cycle until the next resonant current zero-crossing point. The operation mode transition is determined based on the state of the circuit, as well as the user-defined reference values for the resonant current. The resonant current regulation can be achieved using a controller of the present invention by constantly switching between energy injection and free-oscillation modes.

The controller takes a feed-back from the resonant current of the LC tank as the input and generates the switching signals for the two switches of the half-bridge inverter. It is composed of two differential voltage comparators, a half-cycle peak detector, a D-type flip-flop, an AND gate, and a NOT gate. The first differential comparator is used to detect resonant current zero-crossing points, as well as its direction. This is done by comparing the resonant current signal (measured by a current sensor) to the ground (zero voltage level). The peak detector is used to detect the peak of the resonant current of the LC tank in each half-cycle. The D-type flip-flop is used to save the state of the peak comparator for the next half-cycle (sign($\sigma[k]$)). This is achieved by triggering the flip-flop, using the output of the zero-cross comparator (sign($i_r$)). Since the direction of current changes at each current zero-crossing point, the flip-flop will be triggered at each current zero-crossing point. Finally, AND and NOT gates are used to generate the appropriate switching signals for $S_1$ and $S_2$ according to Table VI.

Embodiments of the present invention include a variable frequency controller based on energy-injection free-oscillation techniques. Embodiments can be used for multi-level electric vehicle (EV) battery charger applications based on IPT systems. Although variable control methods of the present invention can be applied to different converter topologies, this application will present a controller that is designed for three-phase full-bridge AC/DC/HFAC (high-frequency AC) converters. A controller according to an embodiment of the present invention can enable contactless charging of an EV based on a user-defined level and can provide, for example, 11 charging levels (including standard charging levels 1, 2 and 3). In addition, controllers of the present invention can self-tune switching operations to the resonance frequency of the IPT system, and can benefit from zero-current switching (ZCS), which ensures maximum power transfer efficiency. Furthermore, controllers according to the present invention can be implemented with either a digital or analog control circuit.

Figure 25:
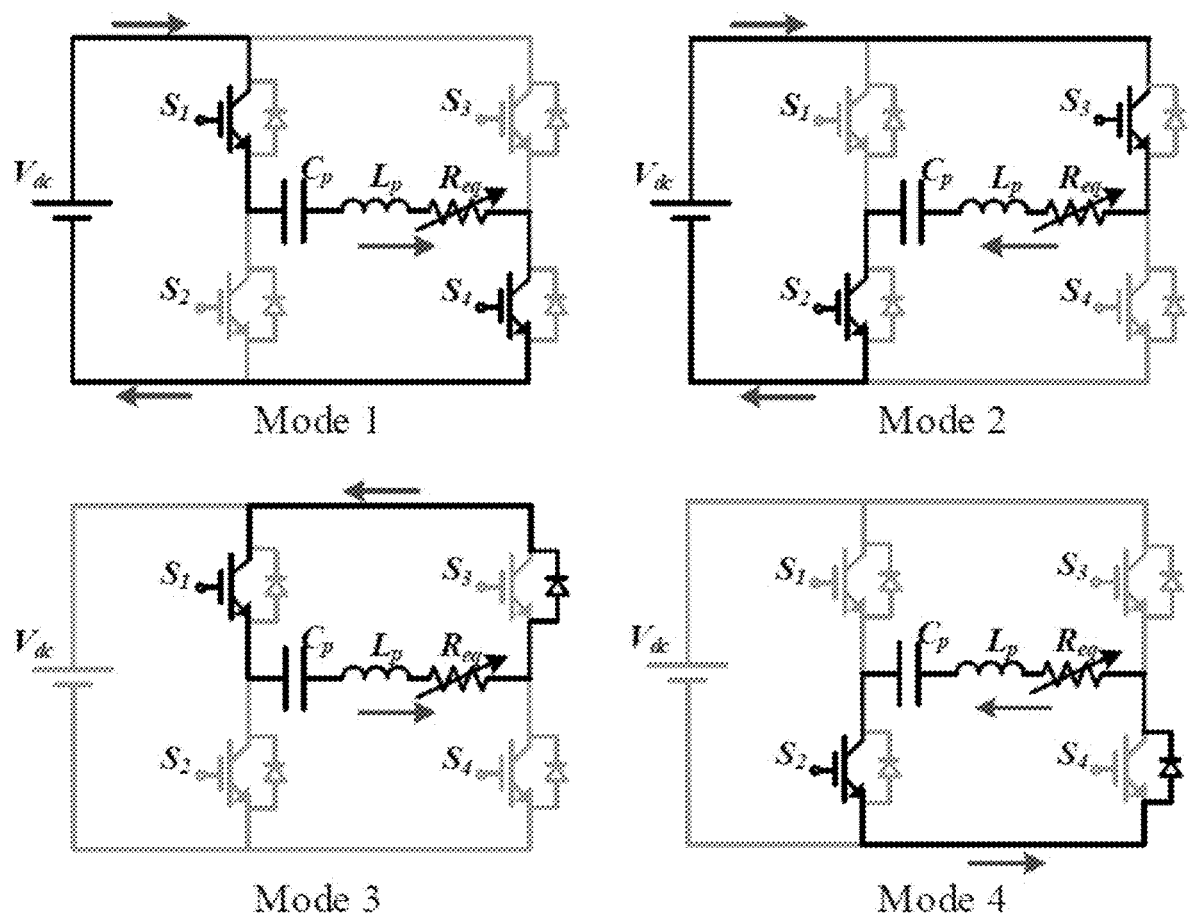
FIG. 25 shows resonant current paths in four modes of operation according to an embodiment of the present invention.

Embodiments of the present invention can effectively regulate resonant current and output power in an IPT system using an energy-injection and free-oscillation technique. Using energy injection and free-oscillation, resonant current can be controlled by regulating the energy transfer rate that is injected to the primary LC tank. This can be accomplished by constantly switching the operation mode of the converter between two free-oscillation and energy-injection modes. The operation of a converter according to an embodiment of the present invention can be described in four modes as presented in Table VII and FIG. 25.

Figure 24:
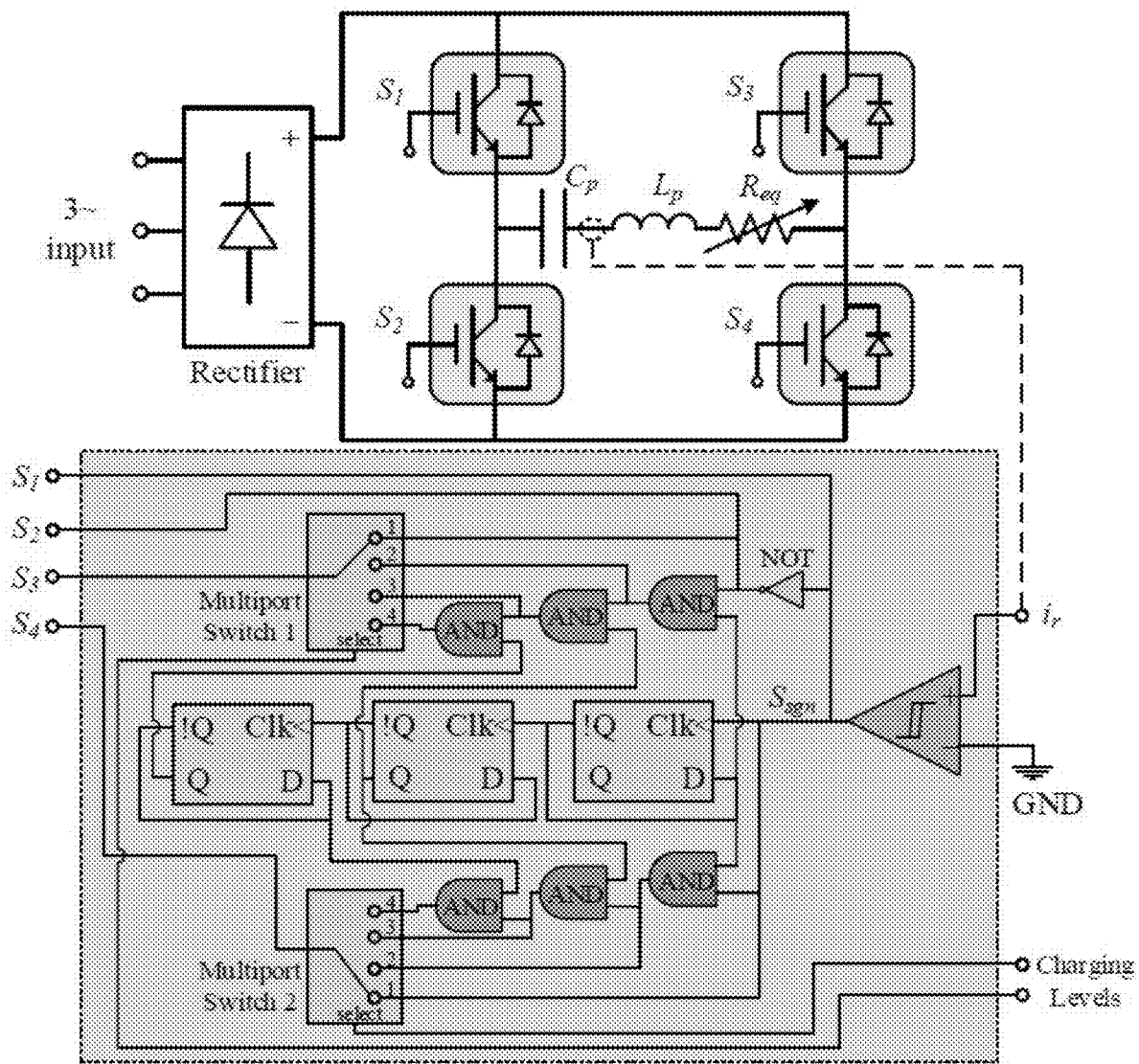
FIG. 24 shows a controller with an analog control circuit according to an embodiment of the present invention.

FIG. 24 is a diagram of a full-bridge AC/DC/HFAC converter with a controller according to an embodiment of the present invention. The controller can be designed based on an analog circuit, and can be composed of D-type flip-flops, logic gates, a voltage comparator, and multiport switches.

TABLE VII

Switching states in different modes of operation.

| Mode | Type | Current direction (i > 0) | Energy injection enabled | $S_1$ | $S_2$ | $S_3$ | $S_4$ |
|---|---|---|---|---|---|---|---|
| mode 1 | Energy injection | 1 | 1 | 1 | 0 | 0 | 1 |
| mode 2 | Energy injection | 0 | 1 | 0 | 1 | 1 | 0 |
| mode 3 | Free oscillation | 1 | 0 | 1 | 0 | 0 | 0 |
| mode 4 | Free oscillation | 0 | 0 | 0 | 1 | 0 | 0 |

Figure 26:
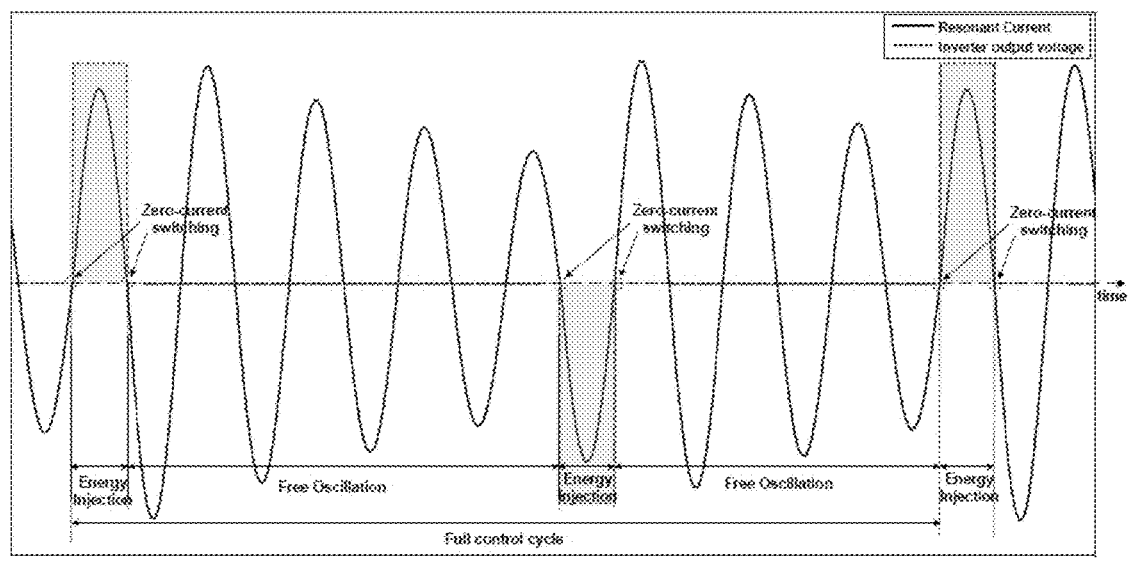
FIG. 26 shows experimentally produced waveforms of resonance current and converter output voltage applying a control method according to an embodiment of the present invention.

Flip-flops along with logic gates can be used to change the energy injection rate to the LC tank, based on a user-defined level (Levels 1, 2 and 3 charging power rates), thereby reducing the frequency of energy injection half-cycles and increasing the number of free-oscillation cycles. As a result, using methods according to the present invention, the transferred power to the LC tank can be regulated. FIG. 26 shows typical waveforms of resonant current and output voltage with an inverter and controller according to an embodiment of the present invention. As it can be seen, each mode starts and ends at zero-crossing points, which leads to a soft-switching operation of the inverter. Therefore, converters according to the present invention can have higher efficiency compared to conventional converters. Furthermore, controllers with analog design not only simplify implementation, but also enable higher operating frequencies that conventional digital controllers (DSP/FPGA) may not be able to achieve.

According to embodiments of the present invention, the frequency of energy injection in both positive and negative half-cycles of the resonant current can be controlled. The energy injection frequency in positive and negative half-cycles can be $f_r$ (resonance frequency), $f_r/2$, $f_r/4$, $f_r/8$ and 0 (no energy injection). This functionality can allow for energy injection to the IPT system at different levels. These different charging levels are presented in Table VIII. Different charging levels are achieved by using different energy injection frequencies in positive and negative half-cycles. The voltage and the resonant current, which are shown in FIG. 26, correspond to level 10 charging level. It should be noted that although there are 14 other combinations for energy injection frequencies for positive and negative half-cycles, they can all be represented by one of the energy injection levels which are given in Table VIII.

A theoretical evaluation of embodiments of the present invention will now be presented, including analytical solutions for the resonant voltage, resonant current and the output power.

The differential equation of a series compensated IPT system with primary self-inductance of L, compensation capacitor C and an equivalent resistance $R_{eq}$ can be expressed as:

$$L\frac{di}{dt} + R_{eq}i + \frac{1}{C}\int_0^t i dt + v_{c0} = V_t \quad (52)$$

where i is the resonant current, $v_c$ is the voltage of the compensation capacitor, and $V_t$ is the input voltage. Equation (52) can be rewritten as the following second order differential equation:

$$\frac{d^2 i}{dt^2} = \frac{R_{eq}}{L}\frac{di}{dt} + \frac{1}{LC}i = 0 \quad (53)$$

At each current zero-crossing point, the initial conditions of the circuit can be written as follows:

$$i_0 = 0, \quad L\frac{di}{dt}(0) = V_t - v_{c0} \quad (54)$$

The solution of (53) based on initial conditions in (54) is derived as:

$$i = Ke^{-t/\tau}\sin(\omega t) \quad (55)$$

wherein the natural damped frequency $\omega = \sqrt{\omega_0^2 - \alpha^2}$, resonant frequency $\omega_0 = 1/\sqrt{LC}$, damping coefficient $\alpha = R_{eq}/2L$, damping time constant $\tau = 2L/R$ and the coefficient K is expressed as:

$$K = \frac{V_t - v_{c0}}{\omega L} \quad (56)$$

TABLE VIII

Different charging levels of variable frequency energy injection control.

| | Frequency of energy injection | |
|---|---|---|
| Charging Level | Positive half-cycles | Negative half-cycles |
| 1 | $f_r$ | $f_r$ |
| 2 | $f_r$ | $f_r/2$ |
| 3 | $f_r$ | $f_r/4$ |
| 4 | $f_r$ | $f_r/8$ |
| 5 | $f_r/2$ | $f_r/2$ |
| 6 | $f_r/2$ | $f_r/4$ |
| 7 | $f_r/2$ | $f_r/8$ |
| 8 | $f_r/4$ | $f_r/4$ |
| 9 | $f_r/4$ | $f_r/8$ |
| 10 | $f_r/8$ | $f_r/8$ |
| 11 | $f_r/8$ | 0 |

Equation (55) shows that the peak current decreases exponentially with time constant $\tau$ and (56) shows that the value of K changes in each half cycle depending on the input voltage and initial voltage of the compensation capacitor. It should be noted that in the free oscillation modes, the input voltage is zero ($V_t$=0). Also the compensation capacitor voltage can be expressed as:

$$v_c(t) = v_{c0} + \frac{K\tau}{C(1+\tau^2\omega^2)}(\tau\omega - e^{-t/\tau}[\sin(\omega t) + \tau\omega\cos(\omega t)]) \quad (57)$$

Using (56), the resonant current in a time period composed of both energy injection and free oscillation modes can be expressed as follows:

$$i(t) = \begin{cases} K_i e^{-t/\tau}\sin(\omega t) & 0 < t < \dfrac{\pi}{\omega} \\ K_f e^{-t/\tau}\sin(\omega t) & \dfrac{\pi}{\omega} < t < \dfrac{2n\pi}{\omega} \end{cases} \quad (58)$$

where n denotes the total number of half-cycles, which is composed of one energy injection half-cycle and 2n−1 free oscillation half-cycles, and $K_i$ and $K_f$ are coefficients of (56) in the first energy injection and free oscillation half-cycles respectively, which can be calculated using (56) as follows:

$$K_i = \frac{1}{\omega L}[V_t - v_{c0}] \quad (59)$$

$$K_f = \frac{1}{\omega L}\left[v_c\left(\frac{\pi}{\omega}\right)\right] = \frac{1}{\omega L}\left[v_c(0) + \frac{K_i \tau^2 \omega}{C(1+\tau^2\omega^2)}(1+e^{-\pi/\tau\omega})\right]$$

In order to calculate the initial condition for the resonant voltage at each current zero-crossing in a steady-state condition, a full control cycle consisting of 2n half-cycles of the resonant current, which includes one energy injection half-cycle (FIG. 26), is considered. The resonant voltage at the end of the energy injection half-cycle ($t=\pi/\omega$) can be calculated using (57) as follows:

$$v_{c1} = V_t + \beta(V_t - v_{c0}) \quad (60)$$

where $\beta$ is defined as:

$$\beta = e^{\frac{-\pi}{\tau\omega}} \quad (61)$$

At the end of free-oscillation half-cycles (half-cycles from 2 to 2n), the resonant voltage can be calculated based on (57) as follows:

$$v_{ck} = v_{c1}\beta^{k-1}(-1)^{k-1} \quad (62)$$

Using (60), equation (62) can be rewritten as follows:

$$v_{ck} = V_t(1+\beta)\beta^{k-1}(-1)^{k-1} + v_{c0}\beta^k \quad (63)$$

By assuming that the system has reached a steady-state condition, it can be concluded that the resonant voltage at the beginning of each control cycle ($v_{c0}$ at k=0) should be equal to its value at the end of the control cycle ($v_{ck}$ at k=2n). Therefore, using (63) the following equations can be derived:

$$v_{c0} = -V_t(1+\beta)\beta^{2n-1} + v_{c0}\beta^{2n} \quad (64)$$

$$v_{c0} = -\frac{(1+\beta)}{1-\beta^{2n}}\beta^{2n-1}V_t \quad (65)$$

Equation (65) is the initial condition for the resonant voltage in the steady-state condition and can be used in (56), (57), and (59) to calculate the resonant current and the resonant voltage at any time.

The maximum output power of a converter according to the present invention can be achieved when the controller is set to level 1. In this case, all of the half-cycles of the resonant current are in an energy injection mode. Using the same method for calculation of the initial condition for the resonant voltage in steady-state conditions, the initial condition for the resonant voltage can be calculated as follows:

$$v_{c0} = -\frac{1+\beta}{1-\beta}V_t \quad (66)$$

Using (59), the resonant current i for any half-cycle can be written as follows:

$$i = \frac{2V_t}{\omega L(1-\beta)}e^{-t/\tau}\sin(\omega t) \quad (67)$$

The output power can be calculated using (67) as follows:

$$P = \frac{\int_0^{\pi/\omega} V_t \frac{2V_t}{\omega L(1-\beta)}e^{-t/\tau}\sin(\omega t)dt}{\pi/\omega} \quad (68)$$

$$P = \frac{2V_t^2\tau^2\omega(1+e^{-\pi/\tau\omega})}{\pi L(1-\beta)(1+\tau^2\omega^2)} \quad (69)$$

Using (69), the output power can be calculated based on the input voltage and the circuit parameters.

The subject invention includes, but is not limited to, the following exemplified embodiments.

Embodiment 1

A three-phase ac-ac matrix converter for inductive power transfer (IPT) systems comprising:
a first line, a second line, a third line, and a fourth line, all of which are connected in parallel;
a first phase input connected to the first line, a second phase input connected to the second line, and a third phase input connected to the third line;
a first switch and a second switch connected in series on the first line and on opposite sides of a first phase input connection;
a third switch and a fourth switch connected in series on the second line and on opposite sides of a second phase input connection;
a fifth switch and a sixth switch connected in series on the third line and on opposite sides of a third phase input connection;
a seventh switch on the fourth line.

Embodiment 2

The three-phase ac-ac matrix converter of Embodiment 1, wherein the first switch, the second switch, the third switch, the fourth switch, the fifth switch, and the sixth switch are all reverse blocking switches, each including an IGBT or a MOSFET in series with a diode.

Embodiment 3

The three-phase ac-ac matrix converter of Embodiment 1, wherein the first switch, the second switch, the third switch, the fourth switch, the fifth switch, and the sixth switch are switches with built-in reverse blocking functionality.

Embodiment 4

The direct three-phase ac-ac matrix converter of any of Embodiments 1 to 3, wherein a diode is connected in parallel with the seventh switch and on the fourth line.

Embodiment 101

A method for direct three-phase ac-ac matrix conversion for inductive power transfer (IPT) comprising:
providing a three-phase ac-ac matrix converter including:
a first line, a second line, a third line, and a fourth line, all of which are connected in parallel;
a first phase input connected to the first line and having a first phase input voltage $V_a$, a second phase input connected to the second line and having a second phase input voltage $V_b$, and a third phase input connected to the third line and having a third phase input voltage $V_c$;

a first switch $S_{A1}$ and a second switch $S_{A2}$ connected in series on the first line and on opposite sides of a first phase input connection;

a third switch $S_{B1}$ and a fourth switch $S_{B2}$ connected in series on the second line and on opposite sides of a second phase input connection;

a fifth switch $S_{C1}$ and a sixth switch $S_{C2}$ connected in series on the third line and on opposite sides of a third phase input connection; and a seventh switch $S_F$ on the fourth line;

changing how current flows through the three-phase ac-ac matrix converter based on one or more control modes.

Embodiment 102

The method of Embodiment 101, wherein the first switch, the second switch, the third switch, the fourth switch, the fifth switch, and the sixth switch are all reverse blocking switches, each including an IGBT or a MOSFET in series with a diode.

Embodiment 103

The method of Embodiment 101, wherein the first switch, the second switch, the third switch, the fourth switch, the fifth switch, and the sixth switch are switches with built-in reverse blocking functionality.

Embodiment 104

The method of any of Embodiments 101 to 103, wherein the control modes include a current regulation control mode, a voltage regulation control mode, and a power regulation control mode.

Embodiment 105

The method of any of Embodiments 101 to 103, further comprising providing a seventh diode $D_F$ that is in parallel with the seventh switch SF on the fourth line in the three-phase ac-ac matrix converter.

Embodiment 106

The method of any of Embodiments 101 to 105, further comprising:

providing a reference current $i_{ref}$;

providing a reference voltage $v_{ref}$;

providing a reference power $P_{ref}$;

measuring a peak output resonance current $i_p$; and measuring output power $P_{out}$.

Embodiment 107

The method of any of Embodiments 101 to 106, wherein the three-phase ac-ac matrix converter operates in a current regulation control mode according to rules in the following table:

| SWITCHING STATES IN DIFFERENT MODES OF OPERATION IN CURRENT REGULATION CONTROL MODE. | | | |
| --- | --- | --- | --- |
| Mode | Resonant Current | Input Voltages | Conducting Switches |
| 1 | $i_p < 0$, $|i_p| < i_{ref}$ | $V_b < V_c < V_a$ | $S_{A1}$, $S_{B2}$ |
| 2 | $i_p < 0$, $|i_p| < i_{ref}$ | $V_c < V_b < V_a$ | $S_{A1}$, $S_{C2}$ |
| 3 | $i_p < 0$, $|i_p| < i_{ref}$ | $V_a < V_c < V_b$ | $S_{B1}$, $S_{A2}$ |
| 4 | $i_p < 0$, $|i_p| < i_{ref}$ | $V_c < V_a < V_b$ | $S_{B1}$, $S_{C2}$ |
| 5 | $i_p < 0$, $|i_p| < i_{ref}$ | $V_b < V_a < V_c$ | $S_{C1}$, $S_{B2}$ |
| 6 | $i_p < 0$, $|i_p| < i_{ref}$ | $V_a < V_b < V_c$ | $S_{C1}$, $S_{A2}$ |
| 7 | $i_p < 0$, $|i_p| > i_{ref}$ | — | $D_F$ |
| 8 | $i_p > 0$ | — | $S_F$ |

Embodiment 108

The method of any of Embodiments 101 to 107, wherein the three-phase ac-ac matrix converter operates in a voltage regulation control mode according to the rules in following table:

| SWITCHING STATES IN DIFFERENT MODES OF OPERATION IN VOLTAGE REGULATION CONTROL MODE. | | | |
| --- | --- | --- | --- |
| Mode | Resonant Voltage & Current | Input Voltages | Conducting Switches |
| 1 | $v_p < 0$, $|v_p| < v_{ref}$ | $V_b < V_c < V_a$ | $S_{A1}$, $S_{B2}$ |
| 2 | $v_p < 0$, $|v_p| < v_{ref}$ | $V_c < V_b < V_a$ | $S_{A1}$, $S_{C2}$ |
| 3 | $v_p < 0$, $|v_p| < v_{ref}$ | $V_a < V_c < V_b$ | $S_{B1}$, $S_{A2}$ |
| 4 | $v_p < 0$, $|v_p| < v_{ref}$ | $V_c < V_a < V_b$ | $S_{B1}$, $S_{C2}$ |
| 5 | $v_p < 0$, $|v_p| < v_{ref}$ | $V_b < V_a < V_c$ | $S_{C1}$, $S_{B2}$ |
| 6 | $v_p < 0$, $|v_p| < v_{ref}$ | $V_a < V_b < V_c$ | $S_{C1}$, $S_{A2}$ |
| 7 | $v_p < 0$, $|v_p| > v_{ref}$ | — | $D_F$ |
| 8 | $i_p > 0$ | — | $S_F$ |

Embodiment 109

The method of any of Embodiments 101 to 108, wherein the three-phase ac-ac matrix converter operates in a power regulation control mode according to rules in the following table:

| SWITCHING STATES IN DIFFERENT MODES OF OPERATION IN POWER REGULATION CONTROL MODE. | | | |
| --- | --- | --- | --- |
| Mode | Output Power & Resonant Current | Input Voltages | Conducting Switches |
| 1 | $P_{out} < P_{ref}$, $i_p < 0$ | $V_b < V_C < V_a$ | $S_{A1}$, $S_{B2}$ |
| 2 | $P_{out} < P_{ref}$, $i_p < 0$ | $V_c < V_b < V_a$ | $S_{A1}$, $S_{C2}$ |
| 3 | $P_{out} < P_{ref}$, $i_p < 0$ | $V_a < V_c < V_b$ | $S_{B1}$, $S_{A2}$ |
| 4 | $P_{out} < P_{ref}$, $i_p < 0$ | $V_c < V_a < V_b$ | $S_{B1}$, $S_{C2}$ |
| 5 | $P_{out} < P_{ref}$, $i_p < 0$ | $V_b < V_a < V_c$ | $S_{C1}$, $S_{B2}$ |
| 6 | $P_{out} < P_{ref}$, $i_p < 0$ | $V_a < V_b < V_c$ | $S_{C1}$, $S_{A2}$ |
| 7 | $P_{out} > P_{ref}$, $i_p < 0$ | — | $D_F$ |
| 8 | $i_p > 0$ | — | $S_F$ |

Embodiment 110

The method of any of Embodiments 101 to 109, wherein the control modes are based on zero current switching operations or resonant zero crossing points.

Embodiment 201

A half-bridge sliding mode controller comprising:
a first comparator suitable for detecting resonant current zero-crossing points and current direction, wherein the first comparator compares a resonant current signal to a ground;
a half-cycle peak detector that detects a peak resonant current in each half cycle and having the resonant current signal as an input;
a second comparator having a reference current and an output of the half-cycle peak detector as inputs;
a D-type flip-flop that saves a state of the second comparator for the next half-cycle using an output of the first comparator $S_{sgn}$ and an output of the second comparator as inputs;
an AND gate having the output of the first comparator $S_{sgn}$ and an output of the D-type flop $S_{inj}$ as inputs, and outputting a first switching signal $S_1$; and
a NOT gate having the output of the first comparator $S_{sgn}$ as an input and outputting a second switching signal $S_2$.

Embodiment 202

A method for operating a half-bridge resonant converter comprising:
providing the half-bridge sliding mode controller of Embodiment 201, wherein the half bridge sliding mode controller operates according to the following modes:

| Mode | Type | $S_{sgn}$ | $S_{inj}$ | $S_1$ | $S_2$ |
|------|------|-----------|-----------|-------|-------|
| 1 | energy injection | 1 | 1 | 1 | 0 |
| 2 | free oscillation | 0 | X | 0 | 1 |
| 3 | free oscillation | 1 | 0 | 0 | 0 |

Embodiment 203

The method of Embodiment 202, wherein the transition to different modes occurs at zero-crossing points and allows for soft switching operations.

Embodiment 301

A full-bridge sliding mode controller comprising:
a first comparator suitable for detecting resonant current zero-crossing points and current direction, wherein the first comparator compares a resonant current signal to a ground, and wherein the first compactor outputs a first switching signal $S_1$;
a peak detector that detects a peak resonant current and having the resonant current signal as an input;
a second comparator having a reference current and an output of the peak detector as inputs;
a first D-type flip-flop having an output of the second comparator as an input;
a second D-type flip-flop having an output of the first comparator and the output of the second comparator as inputs;
a NOT gate having the output of the first comparator as an input and outputting a second switching signal $S_2$;
a first AND gate having outputs of the first D-flip flop as inputs and outputting a third switching signal $S_3$; and
a second AND gate having the output of the first comparator and an output of the second D-type flop as inputs, and outputting a fourth switching signal $S_4$.

Embodiment 302

A method for operating a full-bridge resonant converter comprising:
providing the full-bridge sliding mode controller of Embodiment 301, wherein the full-bridge sliding mode controller operates according to the following modes:

| Mode | Type | $S_{sgn}$ | $S_{inj}$ | $S_1$ | $S_2$ | $S_3$ | $S_4$ |
|------|------|-----------|-----------|-------|-------|-------|-------|
| 1 | energy injection | 1 | 1 | 1 | 0 | 0 | 1 |
| 2 | energy injection | 0 | 1 | 0 | 1 | 1 | 0 |
| 3 | free oscillation | 1 | 0 | 1 | 0 | 0 | 0 |
| 4 | free oscillation | 0 | 0 | 0 | 1 | 0 | 0. |

Embodiment 303

The method of Embodiment 202, wherein the transition to different modes occurs at zero-crossing points and allows for soft switching operations.

Embodiment 401

A method for operating a full-bridge converter comprising:
providing a full-bridge converter having a topology of FIG. 15A, or an equivalent topology; and
operating the full-bridge converter according to the following switching states,

| Mode | Type | sign($i_r$) | sign($\sigma[k]$) | $S_1$ | $S_2$ | $S_3$ | $S_4$ |
|------|------|-------------|-------------------|-------|-------|-------|-------|
| 1 | energy injection | 1 | 1 | 1 | 0 | 0 | 1 |
| 2 | energy injection | 0 | 1 | 0 | 1 | 1 | 0 |
| 3 | free oscillation | 1 | 0 | 1 | 0 | 0 | 0 |
| 4 | free oscillation | 0 | 0 | 0 | 1 | 0 | 0. |

Embodiment 402

A method for operating a half-bridge converter comprising:
providing a half-bridge converter having a topology of FIG. 15B, or an equivalent topology; and
operating the half-bridge converter according to the following switching states,

| Mode | Type | sign ($i_r$) | sign ($\sigma[k]$) | $S_1$ | $S_2$ |
|------|------|--------------|--------------------|-------|-------|
| 1 | energy injection | 1 | 1 | 1 | 0 |
| 2 | free oscillation | 0 | X | 0 | 1 |
| 3 | free oscillation | 1 | 0 | 0 | 0. |

Embodiment 501

A sliding mode controller for a full-bridge resonant inverter having a topology of FIG. 19 (the lower portion), or an equivalent topology.

Embodiment 502

A sliding mode controller for a half-bridge resonant inverter having a topology of FIG. 20 (the lower portion), or an equivalent topology.

Embodiment 601

A controller for inductive power transfer having a topology of FIG. 24 (the lower portion), or an equivalent topology.

Embodiment 701

A controller and converter combination for inductive power transfer having a topology of FIG. 24 (the entire figure), or an equivalent topology.

Embodiment 702

The controller and converter combination for inductive power transfer of Embodiment 701, wherein the controller and converter combination can operate according to one or more of the following charging levels:

| | Frequency of energy injection | |
|---|---|---|
| Charging Level | Positive half-cycles | Negative half-cycles |
| 1 | $f_r$ | $f_r$ |
| 2 | $f_r$ | $f_r/2$ |
| 3 | $f_r$ | $f_r/4$ |
| 4 | $f_r$ | $f_r/8$ |
| 5 | $f_r/2$ | $f_r/2$ |
| 6 | $f_r/2$ | $f_r/4$ |
| 7 | $f_r/2$ | $f_r/8$ |
| 8 | $f_r/4$ | $f_r/4$ |
| 9 | $f_r/4$ | $f_r/8$ |
| 10 | $f_r/8$ | $f_r/8$ |
| 11 | $f_r/8$ | 0, | wherein fr is resonance frequency of the converter.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Figure 5:
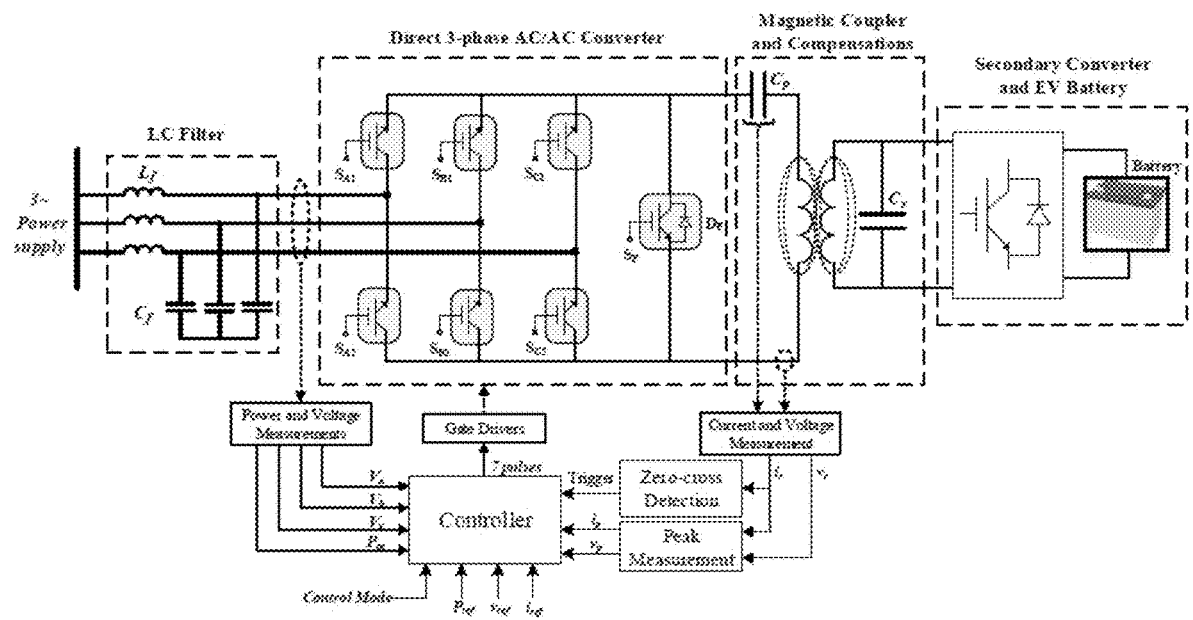
FIG. 5 shows an IPT model and its components according to an embodiment of the present invention as simulated using computer software.

Example 1—Simulation of Converter Topology and Control Modes According to an Embodiment of the Present Invention A three-phase converter according to an embodiment of the present invention was simulated using MATLAB/SIMULINK. The IPT model that was simulated is shown in FIG. 5. This model was composed of a three-phase power supply with an output LC filter, the primary three-phase ac-ac converter, the primary and secondary magnetic structures with their corresponding compensation capacitors and the secondary load, which is a battery charger of an electric vehicle. The controller of the primary converter and its components are also shown in FIG. 5. The measurements include the three-phase input voltage and the output resonant current of the LC tank. The controller is triggered in each resonant current zero-crossing and, based on the voltage and current measurements, the switching state of the of the converter was determined. The switching signals of the converter were not changed until the next current zero-crossing.

Figure 7:
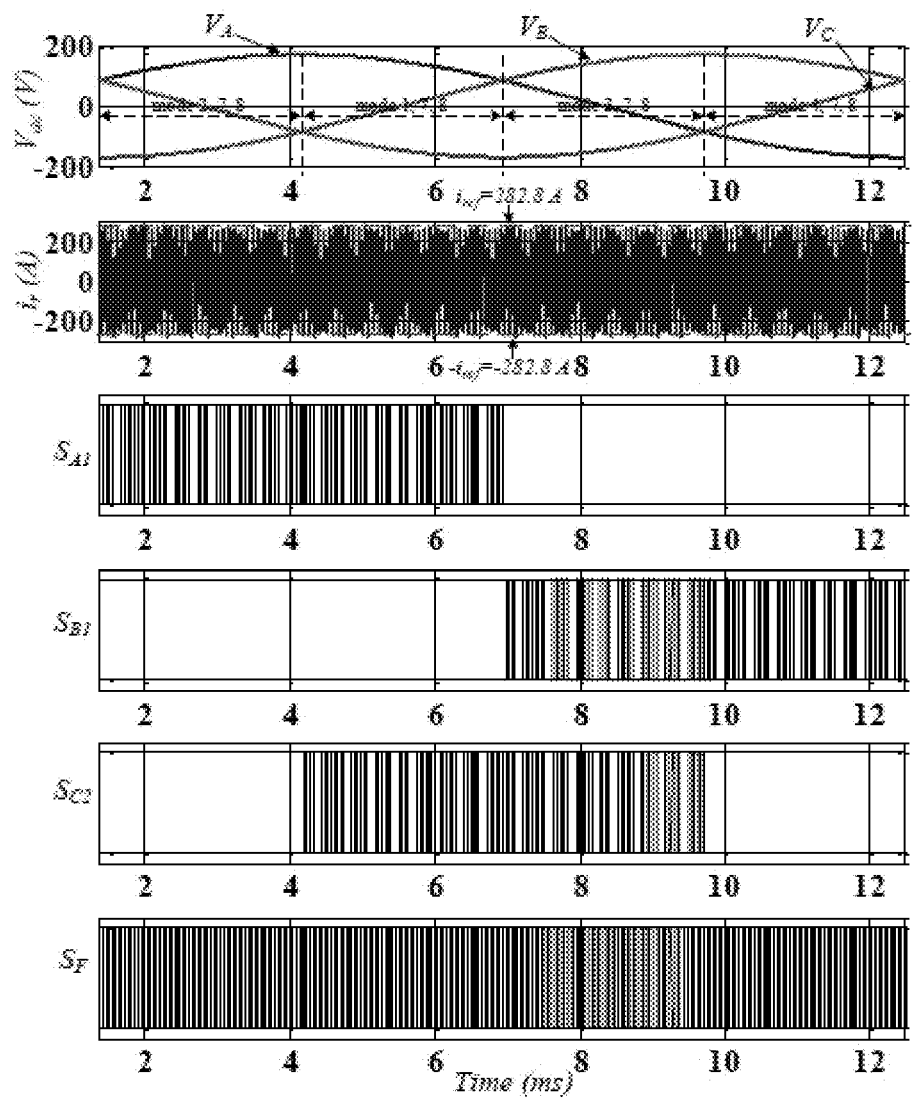
FIG. 7 shows simulation results of an IPT system according to an embodiment of the present invention with $i_{ref}$=282.8 A.
Figure 8:
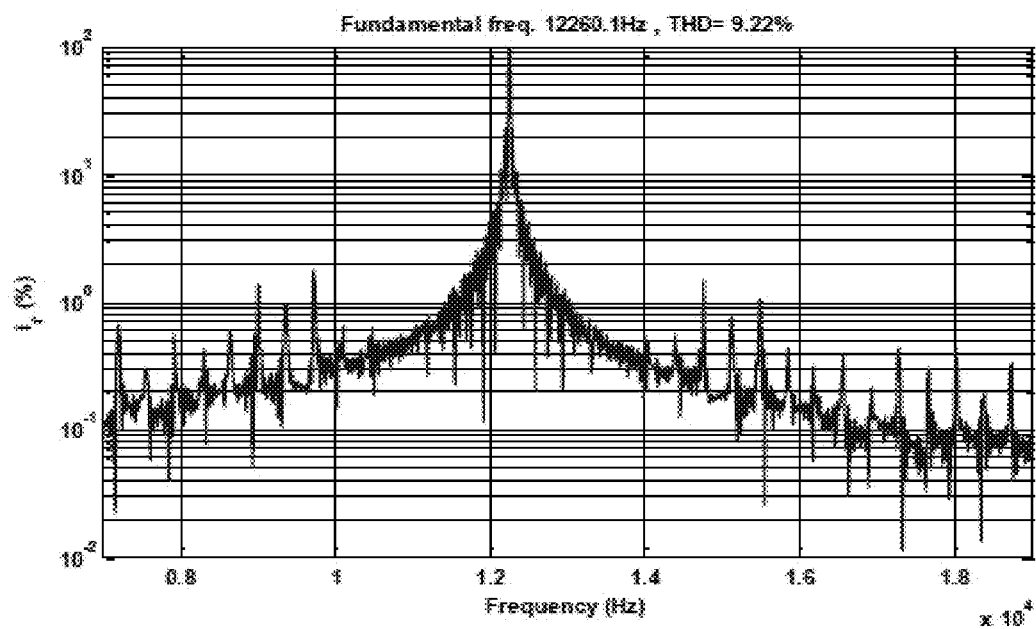
FIG. 8 shows the frequency spectrum of the resonant current, according to an embodiment of the present invention, shown in FIG. 6.

The self-inductances of the primary and secondary were each 168 µH, and each had a 1 µF compensation capacitor and the operating frequency of the converter, which is equal to the resonance frequency of the LC tank, was 12.28 kHz. The line-to-line voltage of the three-phase supply was 208 V. The current regulation control mode was enabled with a 282.8 A (200 Arms) reference current. The simulation results including the three-phase input voltages and their corresponding modes of operation, the output resonant current and corresponding switching signals of $S_{A1}$, $S_{B1}$, $S_{C2}$, $S_F$, are shown in FIG. 7. Also, the frequency spectrum of the output resonant current is shown in FIG. 8. As can be seen in FIGS. 7 and 8, the current is fully regulated around the reference current and its THD was 9.22%. The active and reactive power calculations show that the total output power is 18.4 kW and the fundamental reactive power is zero ($Q_1=0$) and, therefore, the displacement power factor is unity (DPF=1).

However, due to higher order harmonics in the three-phase input voltages and currents, the true power factor is 0.76. Using the specifications given in Table IV for the switches of the converter, the efficiency of the converter was calculated through the simulation to be 96.2%, based on equations (21)-(25).

Figure 9:
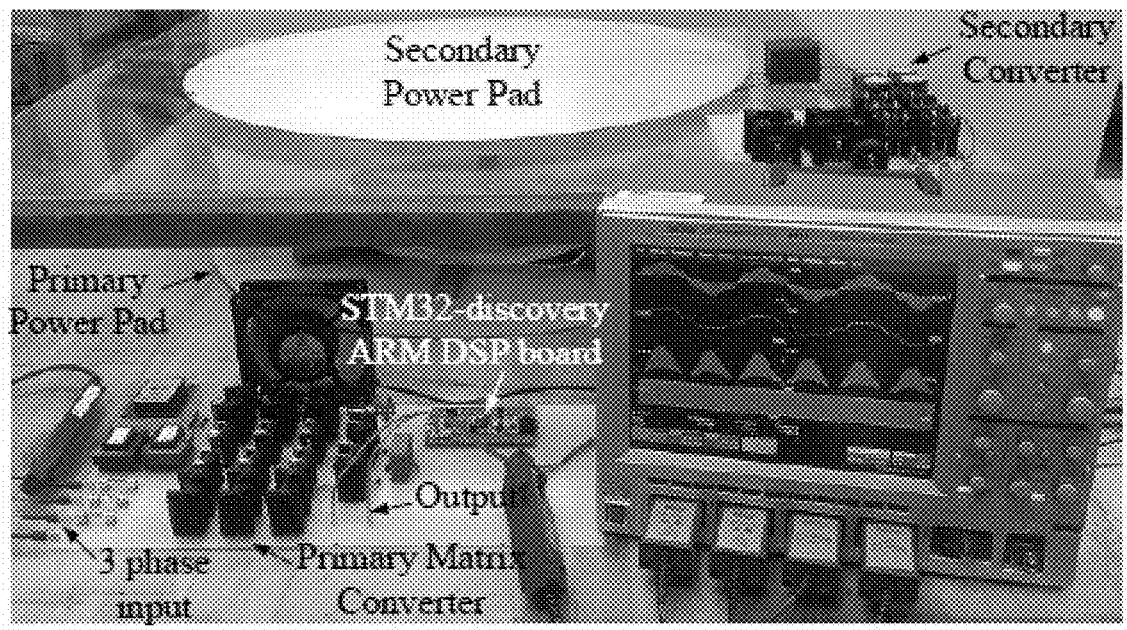
FIG. 9 is an image of a working prototype IPT system with circular power pads according to an embodiment of the present invention.

Example 2—Experimental Analysis of Converter Topology and Control Modes According to an Embodiment of the Present Invention An experimental proof of concept study was performed on an IPT system according to an embodiment of the present invention, as shown in FIG. 9. This system was composed of two circular magnetic structures with 700 mm diameters and a 200 mm air gap. The circular power pads were composed of coils, ferrite bars, and aluminum shields. A three-phase matrix converter according to an embodiment of the present invention was used as the primary converter with a series-parallel topology, as shown in FIG. 5. The self-inductance of each circular pad was 168 µH, and 1 µF compensation capacitors were used in both primary and secondary circuits. The line voltage of the three-phase power supply was 40 V. In this experimental study, a series combination of a MOSFET (IRF3205) with a diode (DSEP 30-12A) was used to make reverse the blocking switches. However, switches with built-in (or intrinsic) reverse blocking capability are available in the market (e.g., IXRH-40N120) or can be custom fabricated, either of which could be used instead. The switch $S_F$ was also an IRF3205 MOSFET, and its body diode was used as the diode $D_F$. A STM32F4-discovery board with an ARM Cortex-M4 168 MHz DSP was used as the main controller. The resonant current regulation and output power regulation control strategies were studied on the prototype IPT system. This analysis will be described in the following paragraphs.

Figure 10:
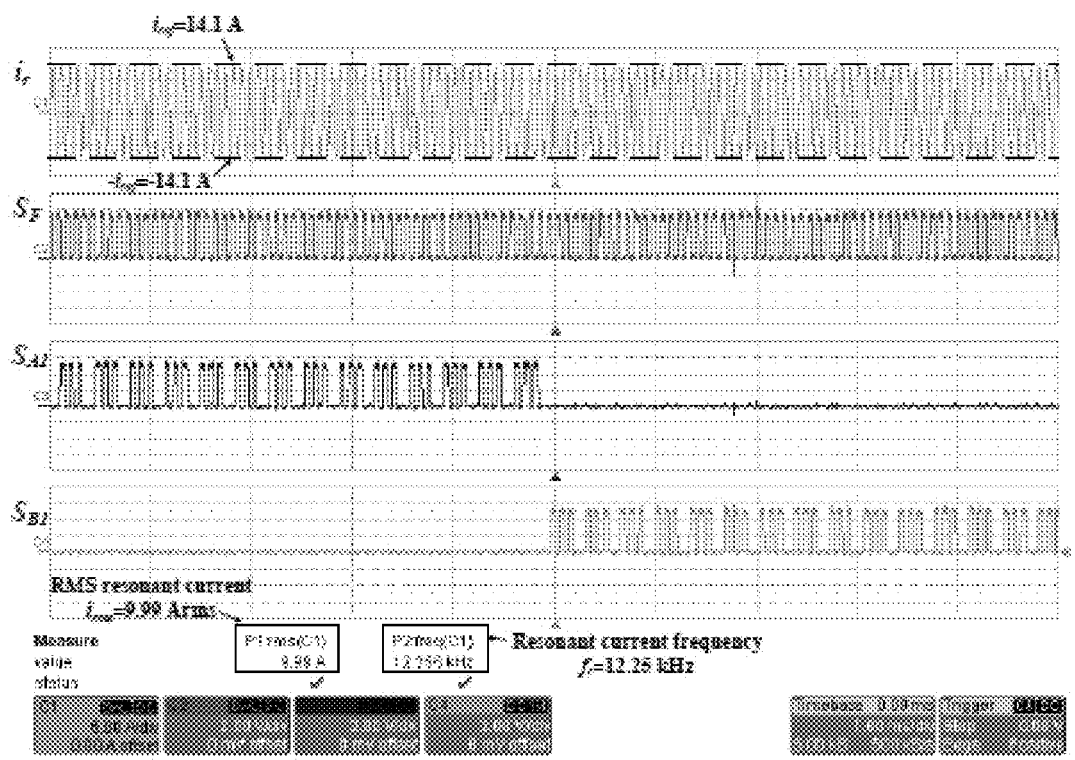
FIG. 10 shows experimental results of output resonant current and corresponding switching signals of the working prototype of FIG. 9.
Figure 11:
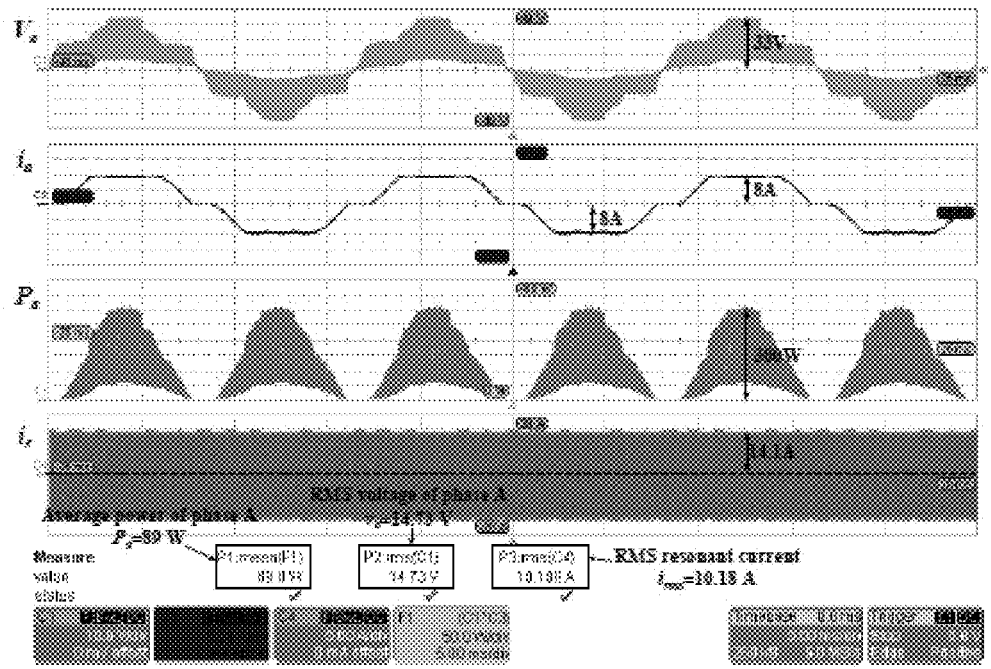
FIG. 11 shows experimental results of input voltage ($V_a$), input current ($i_a$), and power ($P_a$) for phase A and output resonant current ($i_r$) of the working prototype of FIG. 9.
Figure 12:
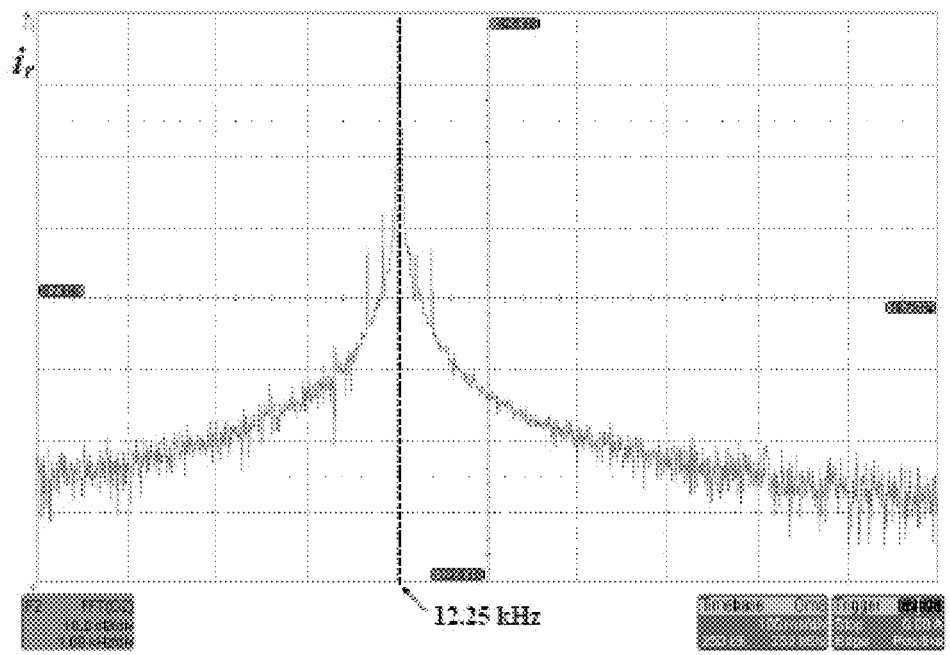
FIG. 12 is a graph of resonant current versus frequency of the working prototype of FIG. 9.

Resonant current regulation controls with a 14.1 A (10 Arms) reference current was used to regulate the resonance current. FIG. 10 shows the output resonant current and corresponding switching signals of $S_{A1}$, $S_{B1}$ and $S_F$ during the transition of the most positive phase in voltage from phase A to phase B. The operating frequency of the converter was 12.25 kHz, which has a small discrepancy compared to the theoretical resonance frequency (12.28 kHz). The waveforms of the input voltage ($V_a$), input current ($i_a$), input power ($P_{out}$) for phase A and output resonant current are shown in FIG. 11. As can be seen, the resonant current is fully regulated around the reference current. However, the input voltage has high frequency harmonics which will reduce the true power factor of the converter as a result. It will also reduce the power transfer efficiency of the converter. The frequency spectrum of the output resonant current was measured experimentally, which is shown in FIG. 12. Calculations show that the THD of the output resonant current was 14.3%. The total output power was 267 W (89 W from each phase). The input power factor measurements show that the true power factor was 0.67. However, the fundamental reactive power was zero and, therefore, the displacement power factor was unity. Also, the measured loss of the converter was 31.5 W and, consequently, the efficiency of the converter was 89.4% compared to a 92.7% theoretical efficiency calculated using (21)-(25).

Figure 13:
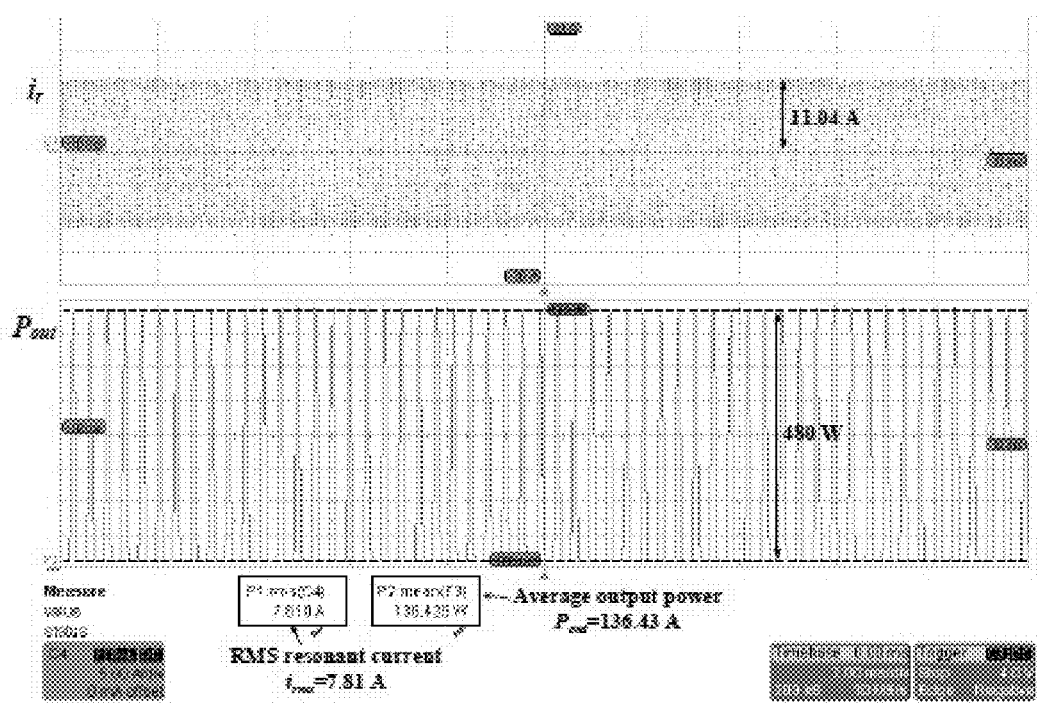
FIG. 13 shows graphs illustrating output power and resonant current (with $P_{ref}$=60 W) of the working prototype of FIG. 9.

The output power control mode with a 130 W reference power was used to regulate the output power. The output power and the output resonant current are shown in FIG. 13. Similar to the current regulation control, the operating frequency of the converter was 12.25 kHz. While the average output power ($P_{out}$) was maintained at 136.4 W, the peak instantaneous output power was 510 W and the RMS resonant current was 7.81 A. The true power factor and displacement power factor were 0.59 and 1, respectively. Measurements show that the total converter loss was 25.1 W and, as a result, the efficiency of the converter was 84.46% compared to a 87.9% theoretical efficiency calculated using (21)-(25).

The dominant factors in converters are the speed of the controller (DSP board) and the response delay time of the resonant current measurement. In IPT applications, high-frequency operation of the converter (10-85 kHz) is essential to maximize the power transfer efficiency. On the other hand, in a converter according to an embodiment of the present invention, current and voltage measurements using analog to digital conversion (ADC) with high sampling rates are required. Also, the implemented control strategy on the digital signal processor (DSP), which consists of floating-point operations and comparisons, etc, along with ADC conversions, takes tens of clock cycles of the DSP to execute. As a result, a DSP with a high clock speed is essential. The maximum frequency that can be practically achieved using the DSP board (STM32F4-discovery ARM Cortex-M4 168 MHz DSP) was about 40 kHz. However, controllers according to the present invention have the potential to be implemented based on an analog circuit, which can significantly enhance the controller speed and resolve the DSP issues.

A Hall-effect current transducer "LA 55-P" was used for the resonant current measurement, which has a response delay less than 1 µs. Considering the fact that at least 20 samples in a full-cycle of the resonant current are required for a proper performance of the converter (without losing the zero-crossing points), the maximum frequency that can practically be achieved in this embodiment was about 50 kHz, based on the response time delay of the current measurement.

In summary, the simulation analysis and experimental implementations show that converter topologies and control methods according to the present invention can fully regulate output current and output power around user-defined reference values. These factors make them well suited for dynamic IPT applications in which the system has inherent variations.

Example 3—Experimental Analysis of a Sliding Mode Controller for a Full-Bridge Converter According to an Embodiment of the Present Invention An SMC circuit according to an embodiment of the present invention was simulated in a proof of concept experiment. Specifically, an SMC circuit for a full-bridge converter as shown in FIG. 19 was simulated using MATLAB/Simulink. The simulation model was composed of a three-phase power supply, transmitter and receiver pads with their corresponding compensation capacitors, a full bridge AC/DC/AC converter that was controlled by an SMC embodiment and connected to the transmitter coil, and a 14 kW battery charger for an electric vehicle at the secondary. The self-inductances of the primary and secondary are each 172 µH, wherein each have a 0.12 µF compensation capacitor. As a result, the operating resonance frequency of the LC tank was 35 kHz. The three-phase power supply had a line-to-line voltage of 208 V with 60 Hz power frequency.

Figure 21A:
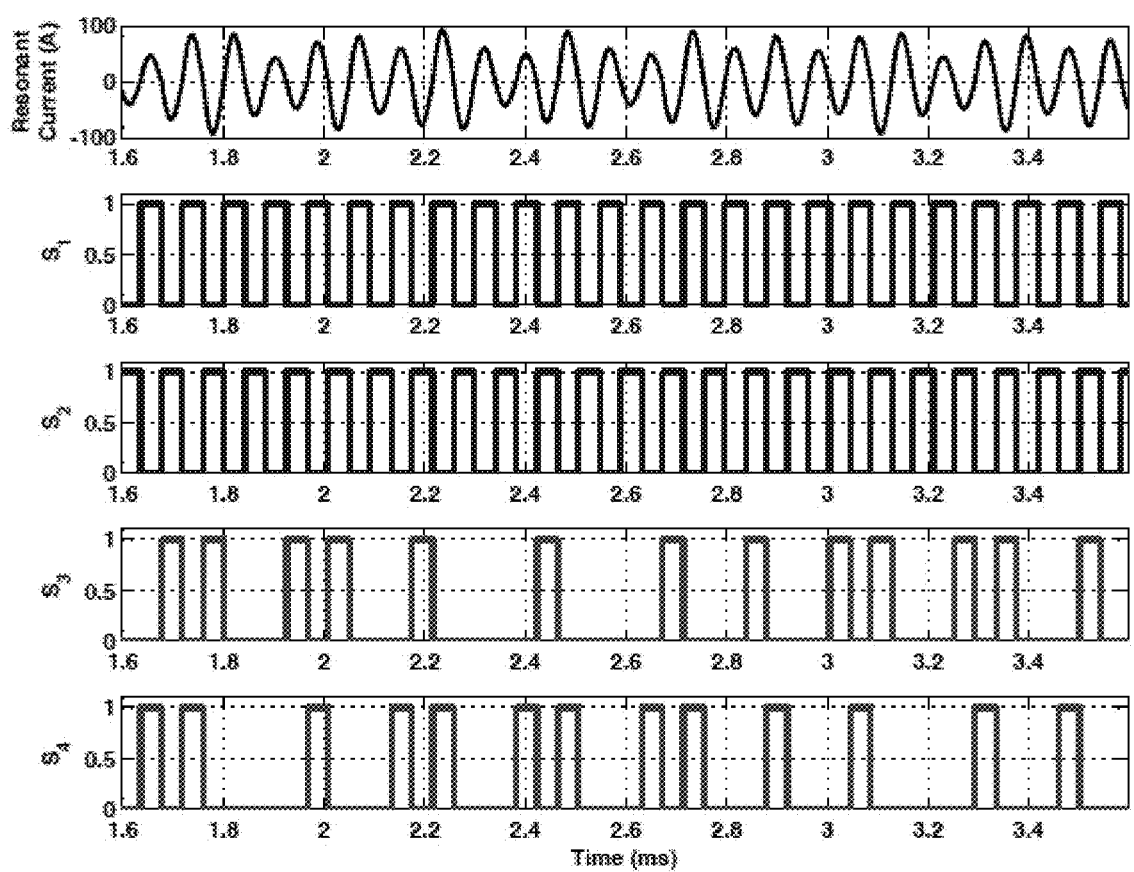
FIG. 21A shows simulation results of an IPT system with a full-bridge converter topology according to an embodiment of the present invention (iref=40 A, Pout=6.6 kW).
Figure 21B:
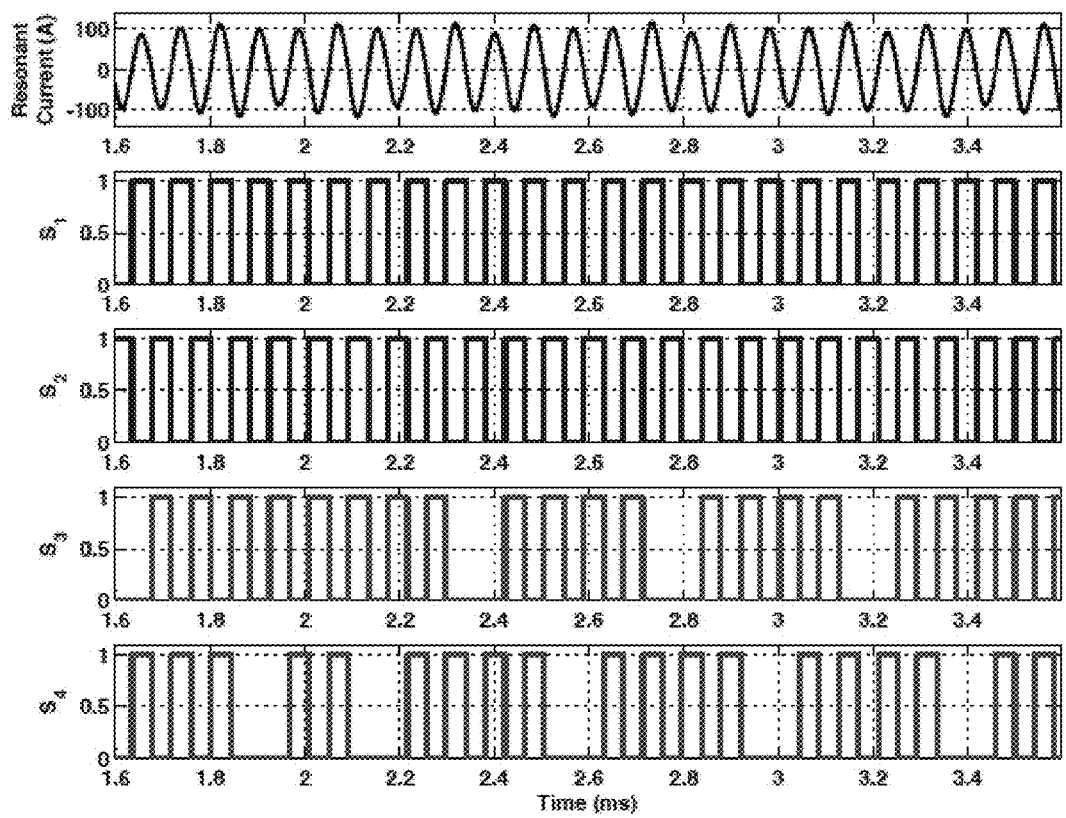
FIG. 21B shows simulation results of an IPT system with a full-bridge converter topology according to an embodiment of the present invention (iref=60 A, Pout=14 kW).

The simulations were carried out by setting the reference current of the SMC ($i_{ref}$) to 60 A and 100 A. FIGS. 21A and 21B show the resonant current and the corresponding switching signals for both simulations. As demonstrated by FIGS. 21A and 21B, the switches 1 and 2 switch constantly while switches 3 and 4 have variable switching signals. These switching signals are adjusted by the SMC to control energy injection to the IPT system and regulate the resonant current.

Figure 22:
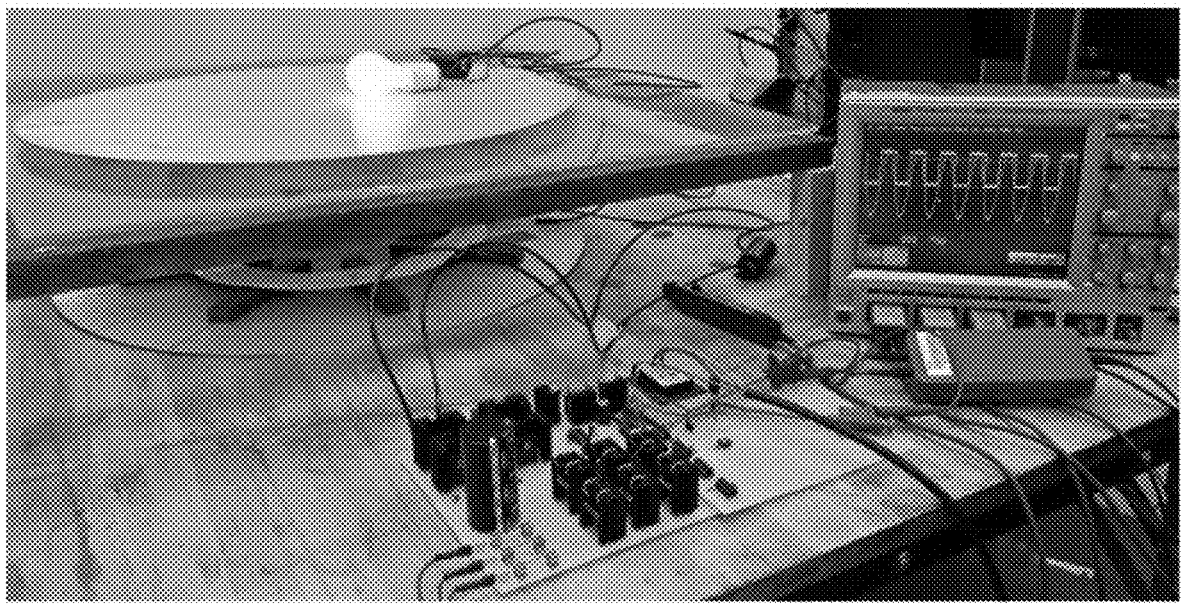
FIG. 22 shows experimental IPT system with circular pads as a transmitter and receiver, and a full-bridge AC/DC/AC converter controlled by an SMC circuit, according to an embodiment of the present invention.
Figure 23A:
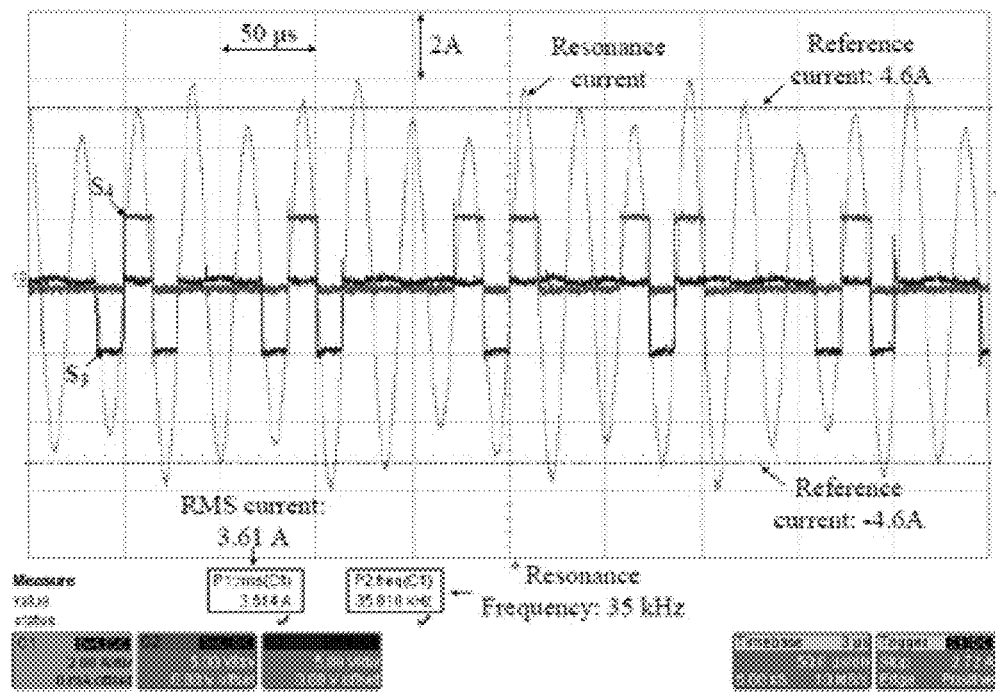
FIG. 23A shows experimental resonant current and energy injection switching signals of a full-bridge converter according to an embodiment of the present invention (VLL=10V, iref=3:6 A, Pout=35 W).
Figure 23B:
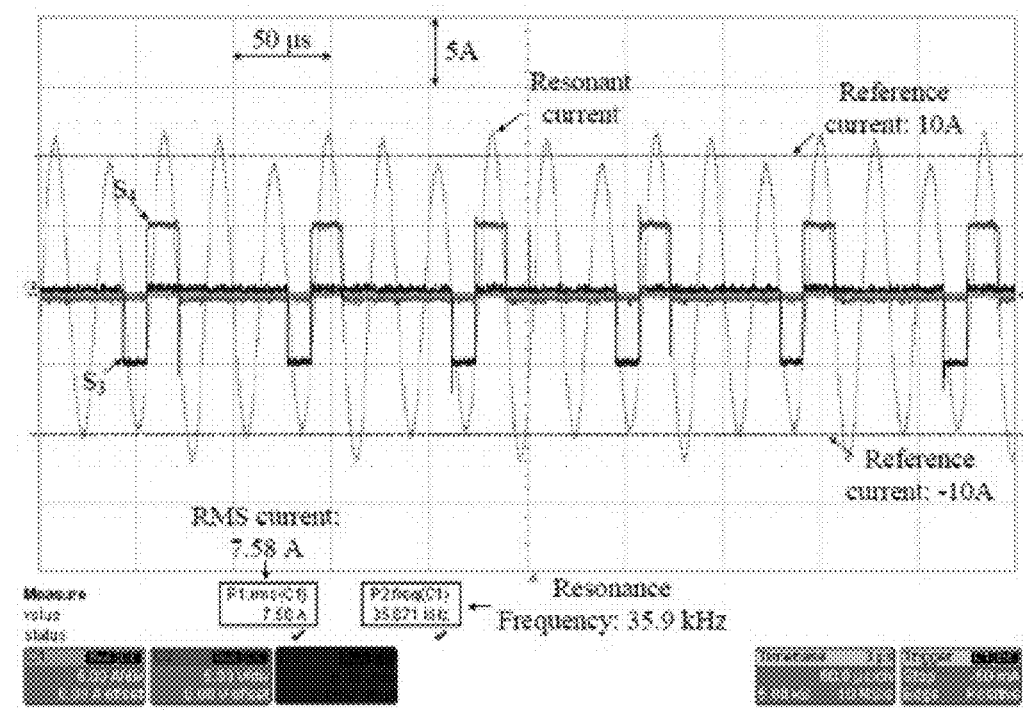
FIG. 23B shows experimental resonant current and energy injection switching signals of a full-bridge converter according to an embodiment of the present invention (VLL=20V, iref=10 A, Pout=155 W).

Example 4—Experimental Analysis of an SMC Design According to an Embodiment of the Present Invention A proof of concept experiment was conducted to verify the performance of an SMC design according to an embodiment of the present invention. A controller for full-bridge converter topology was built based on the circuit of FIG. 19, and experimental tests on an IPT system were conducted. An image of the IPT system can be seen in FIG. 22, and was comprised of two circular power pads as transmitter and receiver structures, compensation capacitors, a full bridge AC/DC/AC converter, along with the an SMC circuit according to an embodiment of the present invention. The self-inductance of the circular pads was each 172 µH, and each had a 0.12 µF compensation capacitor. As a result, the operating resonance frequency of the LC tank was 35 kHz. A variable three-phase power supply was used as the AC mains. The experimental tests were carried out in two scenarios in order to demonstrate the performance of the (a) VLL=10V and iref=3:6 A, and (b) $V_{LL}$=20V and $i_{ref}$=10 A, where $V_{LL}$ is the line-to-line voltage of the three-phase input voltage. In FIG. 23, the resonant current and energy injection switching signals ($S_3$ and $S_4$) of the full-bridge converter are shown. These results show that an SMC circuit according to an embodiment of the present invention is capable of regulating the resonance current around the reference current at different input voltage levels with soft-switching operations.

Example 5—Simulation of an IPT System According to an Embodiment of the Present Invention A simulation of a controller according to the present invention was conducted at different charging levels using MATLAB/Simulink. Furthermore, a controller according to an embodiment of the present invention, along with an AC/DC/AC converter, was implemented experimentally on a proof of concept IPT system to verify performance at different controller charging levels. The experimental test results concurred with simulated experiments, supporting the assertion that embodiments of the present invention can effectively enable self-tuning capability and soft-switching operations at different charging levels for an IPT based contactless charging system.

MATLAB/Simulink was used for simulations at different charging levels. Furthermore, a controller according to an embodiment of the present invention was built and tested experimentally to prove the concept at different charging levels.

A converter and analog control circuit, which is presented in FIG. 24, was simulated using MATLAB/Simulink. The simulation model was composed of a three-phase power supply, a rectifier, transmitter and receiver coils with corresponding compensation capacitors, an AC/DC/AC converter that is controlled by the controller and connected to the transmitter coil, and a battery charger that simulated an electric vehicle at the secondary. The self-inductances of the primary and secondary were each 172 µH, wherein each had a 0.12 µF compensation capacitor. Therefore, the operating frequency of the converter, which is equal to the resonance frequency of the LC tank, was 35 kHz. The three-phase power supply had a line-to-line voltage of 208 V with 60 Hz power frequency.

Figure 27:
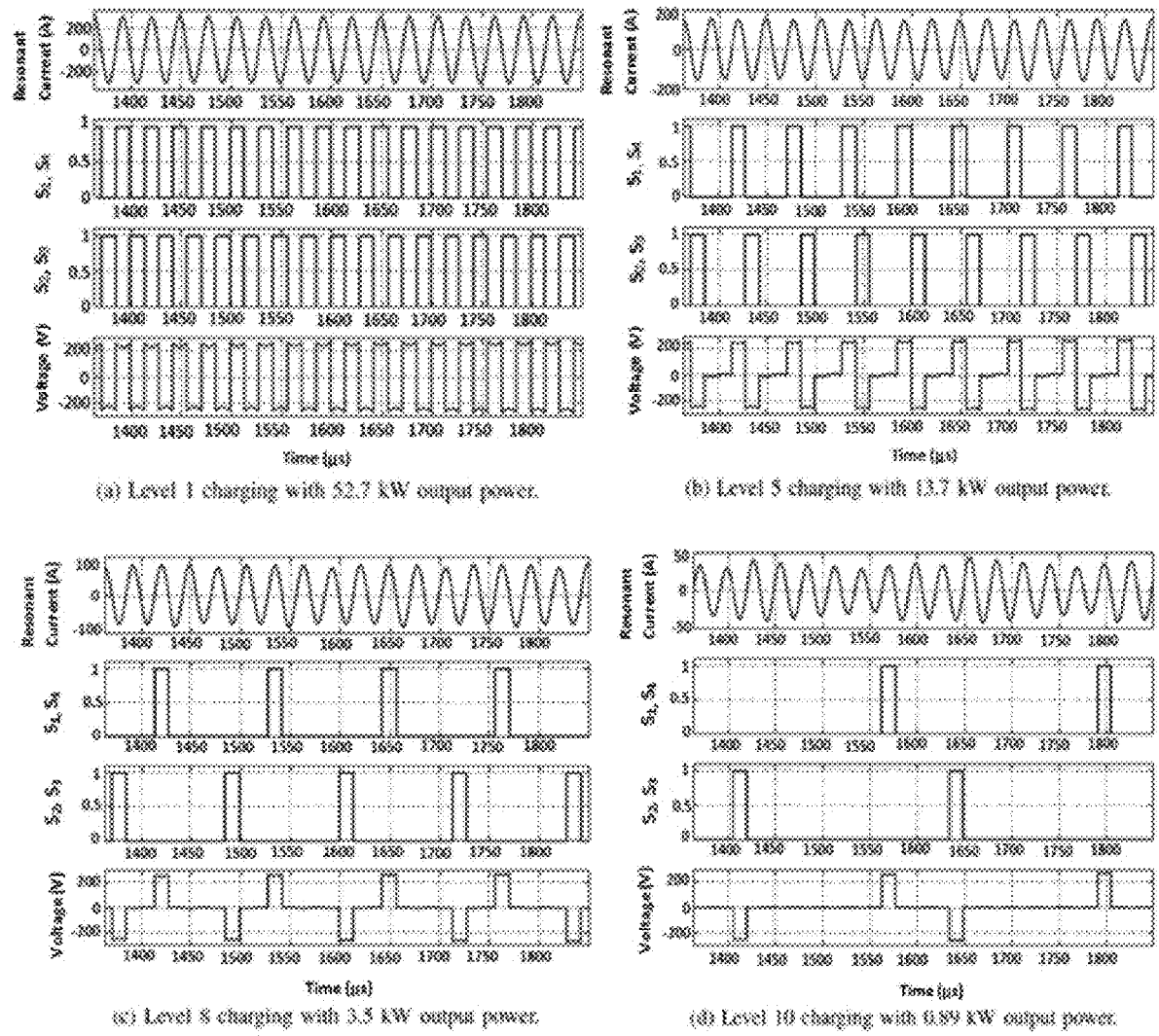
FIG. 27 shows resonant current and switching signals in different charging levels in a simulated experiment of an embodiment of the present invention.

The simulations were carried out in four charging levels (levels 1, 5, 8 and 10 according Table VIII), and the results are presented in Table IX. In addition, resonant current and voltage and corresponding switching signals are shown in FIG. 27. As can be seen, using a controller according to the present invention, different charging levels can be achieved with low current harmonic distortions (THD).

TABLE IX

The simulation results at charging, levels 1, 5, 8 and 10.

| Charging Level | RMS Resonant Current (A) | THD of Current (%) | Output Power (kW) |
| --- | --- | --- | --- |
| Level 1 | 237.10 | 0.7 | 52.74 |
| Level 5 | 120.60 | 1.7 | 13.7 |
| Level 8 | 63.63 | 2.9 | 3.52 |
| Level 10 | 33.31 | 6.7 | 0.89 |

Figure 28:
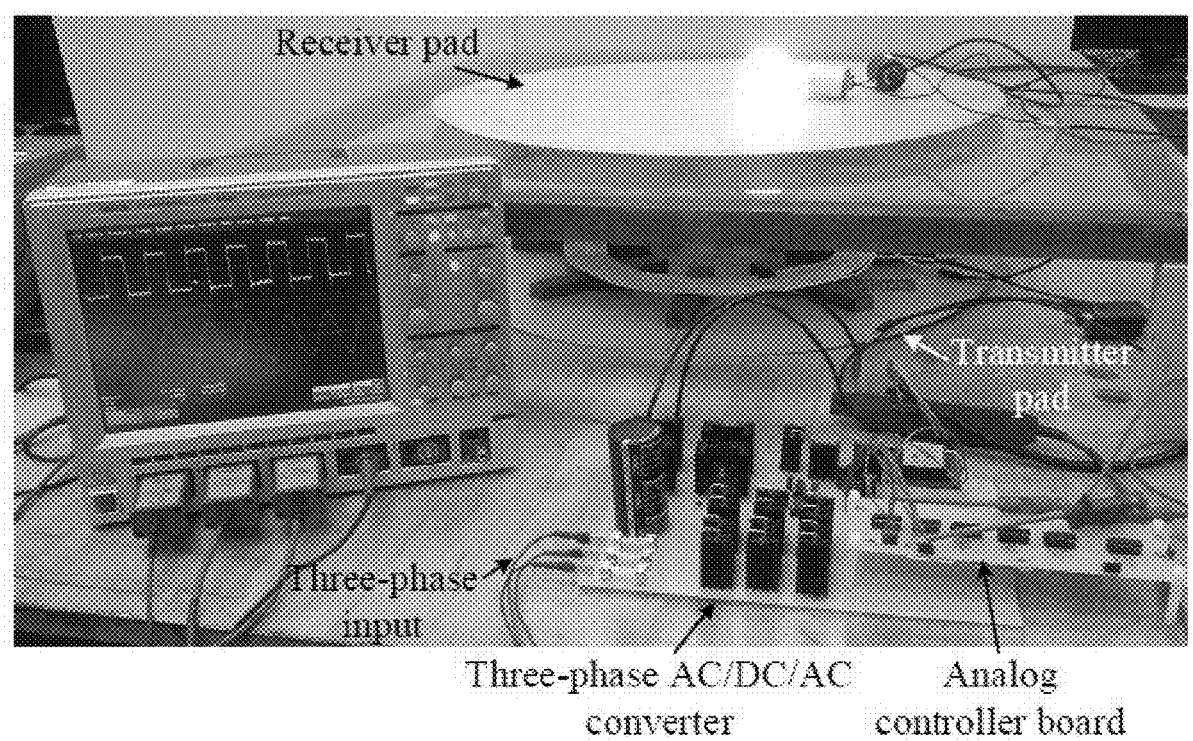
FIG. 28 shows a case study IPT setup consisting of two circular transmitters and receiver power pads, an AC/DC/AC converter as the primary converter and a controller according to an embodiment of the present invention.

Example 6—Experimental Analysis of an IPT System According to an Embodiment of the Present Invention A multi-level controller according to an embodiment of the present invention was implemented experimentally and tested in a proof of concept IPT system as shown in FIG. 28. The IPT system consisted of two circular transmitter and receiver power pads, compensation capacitors, a three-phase AC/DC/AC converter as the primary converter connected the proposed controller, and a 100 W load at the secondary. The self-inductance of the power pads was 172 µH, and each pad had a 0.12 µF compensation capacitor. Thereby, the operating frequency of the converter, which was equal to the resonance frequency of the LC tank, was 35 kHz. The three-phase input was connected to a three-phase source with a reduced line-to-line voltage of 25 V, with a 60 Hz frequency.

TABLE X

Experimental test results on the case study IPT system using the proposed controller at different charging levels.

| Charging Level | Frequency of energy injection | | Resonant current (A) | Output power (W) |
| --- | --- | --- | --- | --- |
| | Positive half-cycles | Negative half-cycles | | |
| 1 | $f_r$ | $f_r$ | 8.00 | 165.76 |
| 2 | $f_r$ | $f_r/2$ | 5.81 | 87.42 |
| 3 | $f_r$ | $f_r/4$ | 4.74 | 58.19 |
| 4 | $f_r$ | $f_r/8$ | 4.19 | 45.47 |
| 5 | $f_r/2$ | $f_r/2$ | 3.64 | 34.32 |
| 6 | $f_r/2$ | $f_r/4$ | 2.59 | 17.37 |
| 7 | $f_r/2$ | $f_r/8$ | 2.12 | 11.64 |
| 8 | $f_r/4$ | $f_r/4$ | 1.70 | 7.48 |
| 9 | $f_r/4$ | $f_r/8$ | 1.29 | 4.31 |
| 10 | $f_r/8$ | $f_r/8$ | 0.82 | 1.74 |
| 11 | $f_r/8$ | 0 | 0.38 | 0.37 |

Figure 29:
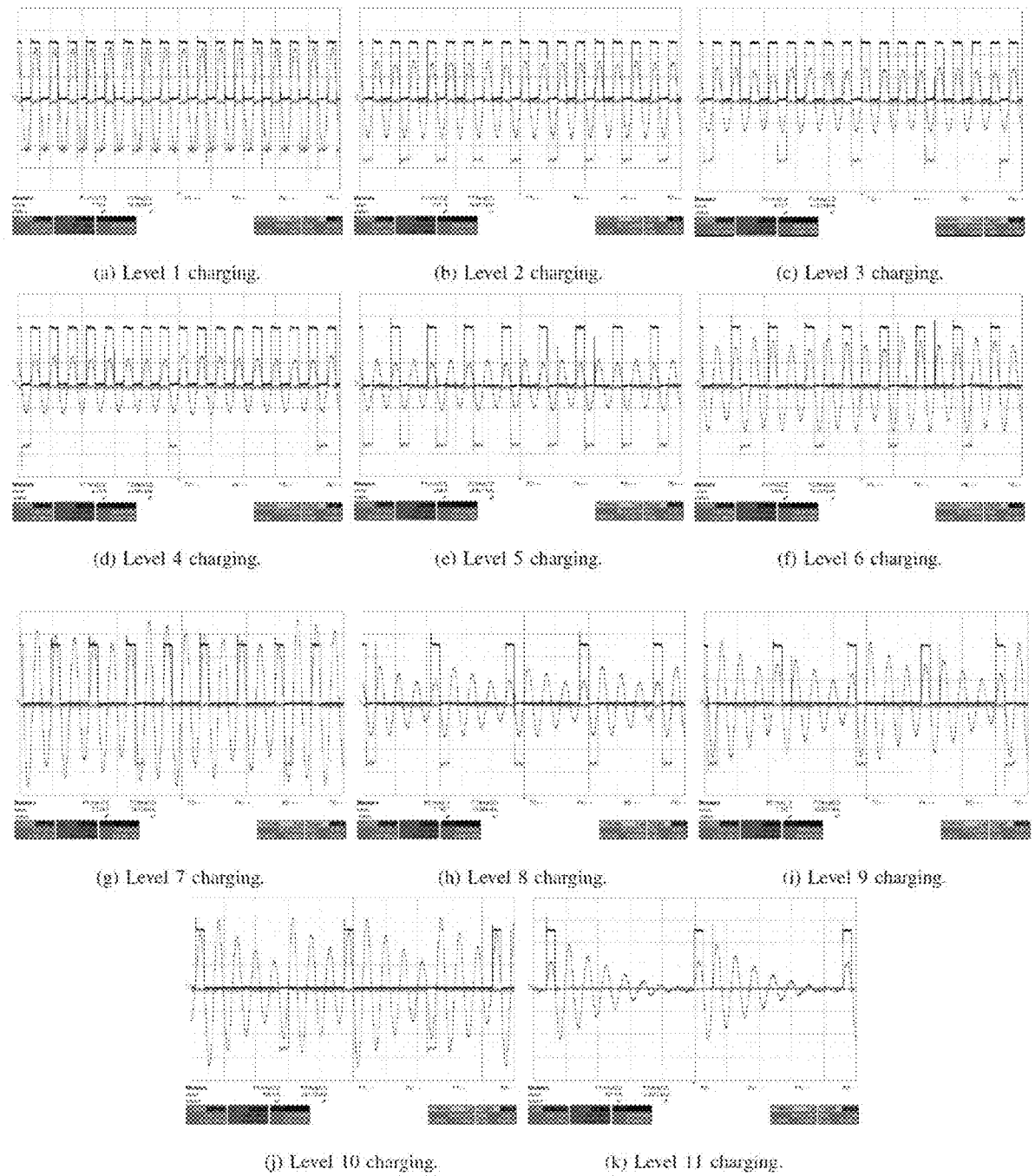
FIG. 29 shows experimental test results of resonant current and switching signals at different charging levels of an IPT system according to an embodiment of the present invention.

The controller was tested at 11 charging levels according to Table VIII and the results are presented in Table X. The resonant current and the switching signals are shown in FIG. 29. FIG. 29 demonstrates that, due to the self-tuning capability of the converter, the switching operations are all synced with the resonant current (at 35 kHz resonance frequency). Furthermore, it can be seen that the switching operations all happen at current zero-crossing points, which verifies the soft-switching functionality of the converter (ZCS). Therefore, controllers according to an embodiment of the present invention can effectively enable self-tuning capability and soft-switching operation at 11 charging levels.

REFERENCES

[1] S. J. Gerssen-Gondelach and A. P. C. Faaij, "Performance of batteries for electric vehicles on short and longer term," J. Power Sour., vol. 212, pp. 111-129, August 2012.

[2] V. Etacheri, R. Marom, R. Elazari, G. Salitra, and D. Aurbach, "Chal-lenges in the development of advanced Li-ion batteries: A review," Energy Environ. Sci., vol. 4, no. 9, pp. 3243-3262, 2011.

[3] K. A. Kurs, R. Moffatt, J. D. Joannopoulos, P. Fisher, and M. Soljacic, "Wireless power transfer via strongly coupled magnetic resonances," Science, vol. 317, no. 5834, pp. 83-86, 2007.

[4] P. Sample, D. A. Meyer, and J. R. Smith, "Analysis, experimental results, and range adaptation of magnetically coupled resonators for wireless power transfer," IEEE Trans. Ind. Electron., vol. 58, no. 2, pp. 544-554, February 2011.

[5] L. Cannon, J. F. Hoburg, D. D. Stancil, and S. C. Goldstein, "Magnetic resonant coupling as a potential means for wireless power transfer to multiple small receivers," IEEE Trans. Power Electron., vol. 24, no. 7, pp. 1819-1825, July 2009.

[6] Kurs, R. Moffatt, and M. Soljacic, "Simultaneous mid-range power transfer to multiple devices," Appl. Phys. Lett., vol. 96, no. 4, pp. 044102-1-044102-3, 2010.

[7] Sanghoon, K. Yong-Hae, S.-Y. Kang, L. Myung-Lae, L. Jong-Moo, and T. Zyung, "Circuit-model-based analysis of a wireless energy-transfer system via coupled magnetic resonances," IEEE Trans. Ind. Electron., vol. 58, no. 7, pp. 2906-2914, July 2011.

[8] Kainan and Z. Zhengming, "Analysis of the double-layer printed spiral coil for wireless power transfer," IEEE J. Emerg. Sel. Topics Power Electron., vol. 1, no. 2, pp. 114-121, July 2013.

[9] Z. Yiming, Z. Zhengming, and C. Kainan, "Frequency decrease analy-sis of resonant wireless power transfer," IEEE Trans. Power Electron., vol. 29, no. 3, pp. 1058-1063, March 2014.

[10] L. C. Kwan, W. X. Zhong, and S. Y. R. Hui, "Effects of magnetic cou-pling of nonadjacent resonators on wireless power domino-resonator systems," IEEE Trans. Power Electron., vol. 27, no. 4, pp. 1905-1916, April 2012.

[11] W. X. Zhong, L. C. Kwan, and S. Y. Hui, "Wireless power domino-resonator systems with noncoaxial axes and circular structures," IEEE Trans. Power Electron., vol. 27, no. 11, pp. 4750-4762, November 2012.

[12] Y. Nagatsuka, N. Ehara, Y. Kaneko, S. Abe, and T. Yasuda, "Compact contactless power transfer system for electric vehicles," in Proc. IPEC, June 2010, pp. 807-813.

[13] J. G. Bolger, F. A. Kirsten, and L. S. Ng, "Inductive power coupling for an electric highway system," in Proc. 28th IEEE Veh. Technol. Conf., March 1978, pp. 137-144.

[14] M. Eghtesadi, "Inductive power transfer to an electric vehicle-analytical model," in Proc. IEEE 40th Veh. Technol. Conf, May 1990, pp. 100-104.

[15] W. Green and J. T. Boys, "10 kHz inductively coupled power transfer-concept and control," in Proc. 5th Int. Conf. Power Electron. Variable-Speed Drives, October 1994, pp. 694-699.

[16] K. W. Klontz, D. M. Divan, D. W. Novotny, and R. D. Lorenz, "Contactless power delivery system for mining applications," IEEE Trans. Ind. Appl., vol. 31, no. 1, pp. 27-35, January/February 1995.

[17] J. M. Barnard, J. A. Ferreira, and J. D. Van Wyk, "Sliding transformers for linear contactless power deliv-ery," IEEE Trans. Ind. Electron., vol. 44, no. 6, pp. 774-779, December 1997.

[18] N. H. Kutkut and K. W. Klontz, "Design considerations for power con-verters supplying the SAE J-1773 electric vehicle inductive coupler," in Proc. 12th Annu. APEC and Expo., vol. 2. February 1997, pp. 841-847.

[19] G. Pedder, A. D. Brown, and J. A. Skinner, "A con-tactless electrical energy transmission system," IEEE Trans. Ind. Electron., vol. 46, no. 1, pp. 23-30, February 1999.

[20] H. Abe, H. Sakamoto, and K. Harada, "A noncontact charger using a resonant converter with parallel capacitor of the secondary coil," IEEE Trans. Ind. Electron., vol. 36, no. 2, pp. 444-451, March/April 2000.

[21] J. T. Boys, G. A. Covic, and A. W. Green, "Stability and control of inductively coupled power transfer systems," Proc. IEE Electr. Power Appl., vol. 147, no. 1, pp. 37-43, January 2000.

[22] P. Hu, J. T. Boys, and G. A. Covic, "ZVS frequency analysis of a current-fed resonant converter," in Proc. 7th IEEE Int. Power Electron. Congr., October 2000, pp. 217-221.

[23] W. Chwei-Sen, G. A. Covic, and O. H. Stielau, "Power transfer capability and bifurcation phenomena of loosely coupled inductive power transfer systems," IEEE Trans. Ind. Electron., vol. 51, no. 1, pp. 148-157, February 2004.

[24] J. T. Boys, G. A. Covic, and X. Yongxiang, "DC analysis technique for inductive power transfer pick-ups," IEEE Power Electron. Lett., vol. 1, no. 2, pp. 51-53, June 2003.

[25] J. Hirai, K. Tae-Woong, and A. Kawamura, "Study on intelligent battery charging using inductive transmission of power and infor-mation," IEEE Trans. Power Electron., vol. 15, no. 2, pp. 335-345, March 2000.

[26] S. Byeong-Mun, R. Kratz, and S. Gurol, "Contactless inductive power pickup system for Maglev applications," in Proc. Conf. Rec. Ind. Appl. Conf, 37th IAS Annu. Meeting, vol. 3. October 2002, pp. 1586-1591.

[27] W. Chwei-Sen, O. H. Stielau, and G. A. Covic, "Design considerations for a contactless electric vehicle battery charger," IEEE Trans. Ind. Electron., vol. 52, no. 5, pp. 1308-1314, October 2005.

[28] O. H. Stielau and G. A. Covic, "Design of loosely coupled inductive power transfer systems," in Proc. Int. Conf. Power Syst. Technol., vol. 1. 2000, pp. 85-90.

[29] P. Hu and S. Hussmann, "Improved power flow control for contact-less moving sensor applications," IEEE Power Electron. Lett., vol. 2, no. 4, pp. 135-138, December 2004.

[30] J. T. Boys, C. I. Chen, and G. A. Covic, "Controlling inrush currents in inductively coupled power systems," in Proc. 7th IPEC, vol. 2. December 2005, pp. 1046-1051.

[31] G. A. J. Elliot, J. T. Boys, and G. A. Covic, "A design methodology for flat pick-up ICPT systems," in Proc. 1st IEEE Conf. Ind. Electron. Appl., May 2006, pp. 1-7.

[32] M. Bradley, M. D. Feezor, H. Singh, and F. Y. Sorrell, "Power systems for autonomous underwater vehicles," IEEE J. Ocean. Eng., vol. 26, no. 4, pp. 526-538, October 2001.

[33] H. Singh et al., "Docking for an autonomous ocean sampling network," IEEE J. Ocean. Eng., vol. 26, no. 4, pp. 498-514, October 2001.

[34] K. W. Klontz et al., "Submersible contactless power delivery system," U.S. Pat. No. 5,301,096, Apr. 5, 1994.

[35] W. Kyung-Il, P. H. Seok, C. Y. Hyun, and K. K. Ho, "Contactless energy transmission system for linear servo motor," IEEE Trans. Magn., vol. 41, no. 5, pp. 1596-1599, May 2005.

[36] Esser and H. C. Skudelny, "A new approach to power supplies for robots," IEEE Trans. Ind. Appl., vol. 27, no. 5, pp. 872-875, September/October 1991.

[37] G. A. J. Elliott, G. A. Covic, D. Kacprzak, and J. T. Boys, "A new concept: Asymmetrical pick-ups for induc-tively coupled power transfer monorail systems," IEEE Trans. Magn., vol. 42, no. 10, pp. 3389-3391, October 2006.

[38] Kawamura, K. Ishioka, and J. Hirai, "Wireless trans-mission of power and information through one high-frequency resonant AC link inverter for robot manipulator applications," IEEE Trans. Ind. Appl., vol. 32, no. 3, pp. 503-508, May/June 1996.

[39] S. I. Adachi, F. Sato, S. Kikuchi, and H. Matsuki, "Consideration of contactless power station with selective excitation to moving robot," IEEE Trans. Magn., vol. 35, no. 5, pp. 3583-3585, September 1999.

[40] J. Sallan, J. L. Villa, A. Llombart, and J. F. Sanz, "Optimal design of ICPT systems applied to electric vehicle battery charge," IEEE Trans. Ind. Electron., vol. 56, no. 6, pp. 2140-2149, June 2009.

[41] J. L. Villa, J. Sallan, A. Llombart, and J. F. Sanz, "Design of a high frequency inductively coupled power transfer system for electric vehicle battery charge," Appl. Energy, vol. 86, no. 3, pp. 355-363, 2009.

[42] H. Chang-Yu, J. T. Boys, G. A. Covic, and M. Budhia, "Practical considerations for designing IPT system for EV battery charging," in Proc. IEEE VPPC, September 2009, pp. 402-407.

[43] L. H. Leo, H. Aiguo, and G. A. Covic, "Development of a discrete energy injection inverter for contactless power transfer," in Proc. 3rd IEEE ICIEA, June 2008, pp. 1757-1761.

[44] T. C. Sen, S. Yue, S. Y. Gang, N. S. Kiong, and A. P. Hu, "Determining multiple steady-state ZCS operating points of a switch-mode contact-less power transfer system," IEEE Trans. Power Electron., vol. 24, no. 2, pp. 416-425, February 2009.

[45] J. U. W. Hsu, A. P. Hu, and A. Swain, "A wireless power pickup based on directional tuning control of magnetic amplifier," IEEE Trans. Ind. Electron., vol. 56, no. 7, pp. 2771-2781, July 2009.

[46] J. Moradewicz and M. P. Kazmierkowski, "Contactless energy transfer system with FPGA-controlled resonant converter," IEEE Trans. Ind. Electron., vol. 57, no. 9, pp. 3181-3190, September 2010.

[47] M. Budhia, G. A. Covic, and J. T. Boys, "Design and optimization of circular magnetic structures for lumped inductive power transfer systems," IEEE Trans. Power Electron., vol. 26, no. 11, pp. 3096-3108, November 2011.16

[48] G. A. Covic, M. L. G. Kissin, D. Kacprzak, N. Clausen, and H. Hao, "A bipolar primary pad topology for EV stationary charging and high-way power by inductive coupling," in Proc. IEEE ECCE, September 2011, pp. 1832-1838.

[49] Zaheer, D. Kacprzak, and G. A. Covic, "A bipolar receiver pad in a lumped IPT system for electric vehicle charging applications," in Proc. IEEE ECCE, September 2012, pp. 283-290.

[50] N. Shinohara, "Wireless power transmission progress for electric vehi-cle in Japan," in Proc. IEEE RWS, January 2013, pp. 109-111.

[51] T. E. Stamati and P. Bauer, "On-road charging of electric vehicles," in Proc. IEEE ITEC, June 2013, pp. 1-8.

[52] N. Puqi, J. M. Miller, O. C. Onar, and C. P. White, "A compact wireless charging system development," in Proc. IEEE ECCE, September 2013, pp. 3629-3634.

[53] Systems Control Technology Inc., "Roadway powered electric vehicle project: Track construction and testing program phase 3D," Califor-nia PATH Program, Inst. Transportation Studies, Univ. California, Berkeley, Calif., USA, Tech. Rep. UCB-ITS-PRR-94-07, 1994.

[54] H. H. Wu, A. Gilchrist, K. D. Sealy, and D. Bronson, "A high efficiency 5 kW inductive charger for EVs using dual side control," IEEE Trans. Ind. Informat., vol. 8, no. 3, pp. 585-595, August 2012.

[55] L. Sungwoo, H. Jin, P. Changbyung, C. Nam-Sup, C. Gyu-Hyeoung, and R. Chun-Taek, "On-line electric vehicle using inductive power transfer system," in Proc. IEEE ECCE, September 2010, pp. 1598-1601.

[56] H. Jin, L. Wooyoung, C. Gyu-Hyeong, L. Byunghun, and R. Chun-Taek, "Characterization of novel inductive power transfer systems for on-line electric vehicles," in Proc. 26th Annu. IEEE APEC Expo., March 2011, pp. 1975-1979.

[57] Musavi, M. Edington, and W. Eberle, "Wireless power transfer: A survey of EV battery charging technologies," in Proc. IEEE ECCE, September 2012, pp. 1804-1810.

[58] Covic and J. T. Boys, "Modern trends in inductive power transfer for transportation applications," IEEE J. Emerg. Sel. Topics Power Electron., vol. 1, no. 1, pp. 28-41, July 2013.

[59] S. Lukic and Z. Pantic, "Cutting the cord: Static and dynamic inductive wireless charging of electric vehicles," IEEE Electrific. Mag., vol. 1, no. 1, pp. 57-64, September 2013.

[60] T.-D. Nguyen, S. Li, W. Li, and C. Mi, "Feasibility study on bipolar pads for efficient wireless power chargers," in Proc. APEC Expo., Fort Worth, Tex., USA, 2014.

[61] S. Valtchev, B. Borges, K. Brandisky, and J. B. Klaassens, "Resonant contactless energy transfer with improved efficiency," IEEE Trans. Power Electron., vol. 24, no. 3, pp. 685-699, March 2009.

[62] S. Jaegue et al., "Design and implementation of shaped magnetic-resonance-based wireless power transfer system for roadway-powered moving electric vehicles," IEEE Trans. Ind. Electron., vol. 61, no. 3, pp. 1179-1192, March 2014.

[63] K. V. Schuylenbergh and R. Puers, Inductive Powering-Basic Theory and Application to Biomedical Systems. New York, N.Y., USA: Springer-Verlag, 2009.

[64] R. Mecke and C. Rathge, "High frequency resonant inverter for contactless energy transmission over large air gap," in Proc. IEEE 35th Annu. PESC, vol. 3. June 2004, pp. 1737-1743.

[65] J. T. Boys, G. A. J. Elliott, and G. A. Covic, "An appropriate magnetic coupling coefficient for the design and comparison of ICPT pickups," IEEE Trans. Power Electron., vol. 22, no. 1, pp. 333-335, January 2007.

[66] M. Budhia, G. Covic, and J. Boys, "A new IPT magnetic coupler for electric vehicle charging systems," in Proc. 36th Annu. Conf IEEE Ind. Electron. Soc., November 2010, pp. 2487-2492.

[67] M. Budhia, G. A. Covic, J. T. Boys, and H. Chang-Yu, "Development and evaluation of single sided flux couplers for contactless electric vehicle charging," in Proc. IEEE ECCE, September 2011, pp. 614-621.

[68] M. Chigira, Y. Nagatsuka, Y. Kaneko, S. Abe, T. Yasuda, and A. Suzuki, "Small-size light-weight transformer with new core structure for contactless electric vehicle power transfer system," in Proc. IEEE ECCE, September 2011, pp. 260-266.

[69] S. Choi, J. Huh, W. Y. Lee, S. W. Lee, and C. T. Rim, "New cross-segmented power supply rails for roadway-powered electric vehicles," IEEE Trans. Power Electron., vol. 28, no. 12, pp. 5832-5841, December 2013.

[70] M. Kiani and M. Ghovanloo, "A figure-of-merit for designing high-performance inductive power transmission links," IEEE Trans. Ind. Electron., vol. 60, no. 11, pp. 5292-5305, November 2013.

[71] Jin, L. Sungwoo, P. Changbyung, C. Gyu-Hyeoung, and R. Chun-Taek, "High performance inductive power transfer system with narrow rail width for on-line electric vehicles," in Proc. IEEE ECCE, September 2010, pp. 647-651.

[72] J. Huh, S. W. Lee, W. Y. Lee, G. H. Cho, and C. T. Rim, "Narrow-width inductive power transfer system for online electrical vehicles," IEEE Trans. Power Electron., vol. 26, no. 12, pp. 3666-3679, December 2011.

[73] J. Y. Jae and K. Y. Dae, "System architecture and mathematical model of public transportation system utilizing wireless charging electric vehicles," in Proc. 15th Int. IEEE Conf. ITSC, September 2012, pp. 1055-1060.

[74] J. Y. Jae, K. Y. Dae, and J. Seungmin, "Optimal design of the wireless charging electric vehicle," in Proc. IEEE IEVC, March 2012, pp. 1-5.

[75] S. In-Soo and K. Jedok, "Electric vehicle on-road dynamic charging system with wireless power transfer technology," in Proc. IEEE IEMDC, May 2013, pp. 234-240.

[76] J. T. Boys and S. Nishino, "Primary inductance pathway," U.S. Pat. No. 5,619,078, Apr. 8, 1997.

[77] R. Nagendra, J. T. Boys, G. A. Covic, B. S. Riar, and A. Sondhi, "Design of a double coupled IPT EV highway," in Proc. 39th Annu. Conf. IEEE Ind. Electron. Soc., November 2013, pp. 4606-4611.

[78] K. Lee, Z. Pantic, and S. Lukic, "Reflexive field containment in dynamic inductive power transfer systems," IEEE Trans. Power Elec-tron., vol. 9, no. 9, pp. 4592-4602, September 2014.

[79] Khaligh and S. Dusmez, "Comprehensive topological analysis of conductive and inductive charging solutions for plug-in electric vehicles," IEEE Trans. Veh. Technol., vol. 61, no. 8, pp. 3475-3489, October 2012.

[80] W. Zhang, S.-C. Wong, C. K. Tse, and Q. Chen, "Analysis and comparison of secondary series- and parallel-compensated inductive power transfer systems operating for optimal efficiency and load-independent voltage-transfer ratio," IEEE Trans. Power Electron., vol. 29, no. 6, pp. 2979-2990, June 2014.

[81] Duan, C. Jiang, A. Taylor, and K. Bai, "Design of a zero-voltage-switching large-air-gap wireless charger with low electric stress for electric vehicles," IET Power Electron., vol. 6, no. 9, pp. 1742-1750, November 2013.

[82] Z. Pantic, B. Sanzhong, and S. Lukic, "ZCS LCC-compensated resonant inverter for inductive-power-transfer application," IEEE Trans. Ind. Electron., vol. 58, no. 8, pp. 3500-3510, August 2011.

[83] L. Villa, J. Sallan, J. F. S. Osorio, and A. Llombart, "High-misalignment tolerant compensation topology for ICPT systems," IEEE Trans. Ind. Electron., vol. 59, no. 2, pp. 945-951, February 2012.

[84] S. Dieckerhoff, M. J. Ruan, and R. W. D. Doncker, "Design of an IGBT-based LCL-resonant inverter for high-frequency induction heating," in Proc. Conf Rec. IEEE Ind. Appl. Conf. 34th IAS Annu. Meeting, vol. 3. October 1999, pp. 2039-2045.

[85] G. L. Fischer and H. Doht, "An inverter system for inductive tube welding utilizing resonance transformation," in Proc. Conf. Rec. IEEE, Ind. Appl. Soc. Annu. Meeting, vol. 2. October 1994, pp. 833-840.

[86] M. L. G. Kissin, H. Chang-Yu, G. A. Covic, and J. T. Boys, "Detection of the tuned point of a fixed-frequency LCL resonant power supply," IEEE Trans. Power Electron., vol. 24, no. 4, pp. 1140-1143, April 2009.

[87] B. Sharp and H. Wu, "Asymmetrical voltage-cancellation control for LCL resonant converters in inductive power transfer systems," in Proc. 27th Annu. IEEE APEC Expo., February 2012, pp. 661-666.

[88] N. A. Keeling, G. A. Covic, and J. T. Boys, "A unity-power-factor IPT pickup for high-power applications," IEEE Trans. Ind. Electron., vol. 57, no. 2, pp. 744-751, February 2010.

[89] N. Keeling, G. A. Covic, F. Hao, L. George, and J. T. Boys, "Variable tuning in LCL compensated contactless power transfer pickups," in Proc. IEEE ECCE, September 2009, pp. 1826-1832.

[90] Y. Huang, J. T. Boys, and G. A. Covic, "LCL pickup circulating current controller for inductive power transfer systems," IEEE Trans. Power Electron., vol. 28, no. 4, pp. 2081-2093, April 2013.

[91] H. L. Li, A. P. Hu, G. A. Covic, and T. Chunsen, "A new primary power regulation method for contactless power transfer," in Proc. IEEE ICIT, February 2009, pp. 1-5.

[92] L. Z. Ning, R. A. Chinga, T. Ryan, and L. Jenshan, "Design and test of a high-power high-efficiency loosely coupled planar wireless power transfer system," IEEE Trans. Ind. Electron., vol. 56, no. 5, pp. 1801-1812, May 2009.

[93] L. H. Leo, A. P. Hu, and G. A. Covic, "A direct AC-AC converter for inductive power-transfer systems," IEEE Trans. Power Electron., vol. 27, no. 2, pp. 661-668, February 2012.

[94] J. M. Miller, C. P. White, O. C. Onar, and P. M. Ryan, "Grid side regulation of wireless power charging of plug-in electric vehicles," in Proc. IEEE ECCE, September 2012, pp. 261-268.

[95] B. N. Xuan, D. M. Vilathgamuwa, and U. K. Madawala, "A matrix converter based inductive power transfer system," in Proc. Conf Power Energy IPEC, December 2012, pp. 509-514.

[96] Q. Wei et al., "A new type of IPT system with large lateral tolerance and its circuit analysis," in Proc. ICCVE, December 2012, pp. 311-315.

[97] S. Krishnan et al., "Frequency agile resonance-based wireless charging system for electric vehicles," in Proc. IEEE IEVC, March 2012, pp. 1-4.

[98] M. Borage, S. Tiwari, and S. Kotaiah, "Analysis and design of an LCL-T resonant converter as a constant-current power supply," IEEE Trans. Ind. Electron., vol. 52, no. 6, pp. 1547-1554, December 2005.

[99] H. H. Wu, J. T. Boys, and G. A. Covic, "An AC processing pickup for IPT systems," IEEE Trans. Power Electron., vol. 25, no. 5, pp. 1275-1284, May 2010.

[100] H. H. Wu, G. A. Covic, J. T. Boys, and D. J. Robertson, "A series-tuned inductive-power-transfer pickup with a controllable AC-voltage output," IEEE Trans. Power Electron., vol. 26, no. 1, pp. 98-109, January 2011.

[101] S. J. Orfanidis. (2013). Electromagnetic Waves and Antennas [Online].

[102] K. A. Grajski, R. Tseng, and C. Wheatley, "Loosely-coupled wireless power transfer: Physics, circuits, standards," in Proc. IEEE MTT-S Int., Microwave Workshop Series Innovative Wireless Power Transmission, Technol., Syst., Appl., May 2012, pp. 9-14.

[103] U. K. Madawala and D. J. Thrimawithana, "Current sourced bi-directional inductive power transfer system," IET Power Electron., vol. 4, no. 4, pp. 471-480, April 2011. U. K. Madawala and D. J. Thrimawithana, "A bidirectional inductive power interface for electric vehicles in V2G systems," IEEE Trans. Ind. Electron., vol. 58, no. 10, pp. 4789-4796, October 2011.

[104] J. Thrimawithana and U. K. Madawala, "A three-phase bi-directional IPT system for contactless charging of electric vehicles," in Proc. IEEE ISIE, June 2011, pp. 1957-1962.

[105] T. P. E. R. Joy, K. Thirugnanam, and P. Kumar, "Bidirectional contact-less charging system using Li-ion battery model," in Proc. 7th IEEE ICIIS, August 2012, pp. 1-6.

[106] M. J. Neath, A. K. Swain, U. K. Madawala, D. J. Thrimawithana, and D. M. Vilathgamuwa, "Controller synthesis of a bidirectional inductive power interface for electric vehicles," in Proc. 3rd IEEE ICSET, September 2012, pp. 60-65.

[107] K. Swain, M. J. Neath, U. K. Madawala, and D. J. Thrimawithana, "A dynamic multivariable state-space model for bidirectional inductive power transfer sys-

[107] ... tems," IEEE Trans. Power Electron., vol. 27, no. 11, pp. 4772-4780, November 2012.

[108] Tang, X. Dai, Z. Wang, Y. Su, and Y. Sun, "A bidirectional contactless power transfer system with dual-side power flow control," in Proc. IEEE Int. Conf. Power Syst. Technol., November 2012, pp. 1-6.

[109] D. J. Thrimawithana and U. K. Madawala, "A generalized steady-state model for bidirectional IPT systems," IEEE Trans. Power Electron., vol. 28, no. 10, pp. 4681-4689, October 2013.

[110] J. Thrimawithana, U. K. Madawala, and M. Neath, "A synchronization technique for bidirectional IPT systems," IEEE Trans. Ind. Electron., vol. 60, no. 1, pp. 301-309, January 2013.

[111] H. Xueliang, Q. Hao, H. Zhenchen, S. Yi, and L. Jun, "The interaction research of smart grid and EV based wireless charging," in Proc. IEEE VPPC, October 2013, pp. 1-5. D. van Wageningen and T. Staring, "The Qi wireless power standard," in Proc. 14th EPE/PEMC, 2010, pp. S15-25-S15-32.

[112] B. Kenney, "Dedicated short-range communications (DSRC) stan-dards in the United States," Proc. IEEE, vol. 99, no. 7, pp. 1162-1182, July 2011.

[113] S. M. Lukic, M. Saunders, Z. Pantic, S. Hung, and J. Taiber, "Use of inductive power transfer for electric vehicles," in Proc. IEEE Power Energy Soc. General Meeting, July 2010, pp. 1-6.

[114] S. Y. R. Hui and W. W. C. Ho, "A new generation of universal contactless battery charging platform for portable consumer electronic equipment," IEEE Trans. Power Electron., vol. 20, no. 3, pp. 620-627, May 2005.

[115] J. de Boeij, E. A. Lomonova, and A. J. A. Vandenput, "Optimization of contactless planar actuator with manipulator," IEEE Trans. Magn., vol. 44, no. 6, pp. 1118-1121, June 2008.

[116] P. Sergeant and A. V. D. Bossche, "Inductive coupler for contactless power transmission," IET Electric Power Applications, vol. 2, no. 1, pp. 1-7, January 2008.

[117] G. Wang, W. Liu, M. Sivaprakasam, and G. A. Kendir, "Design and analysis of an adaptive transcutaneous power telemetry for biomedical implants," IEEE Trans. Circuits Syst. I, Reg. Papers, vol. 52, no. 10, pp. 2109-2117, October 2005.

[118] P. Li and R. Bashirullah, "A wireless power interface for rechargeable battery operated medical implants," IEEE Trans. Circuits Syst. II, Exp. Briefs, vol. 54, no. 10, pp. 912-916, October 2007.

[119] O. H. Stielau and G. A. Covic, "Design of loosely coupled inductive power transfer systems," in Power System Technology, 2000. Proceed-ings. PowerCon 2000. International Conference on, vol. 1, 2000, pp. 85-90 vol. 1.

[120] R. Lai, F. Wang, R. Burgos, Y. Pei, D. Boroyevich, B. Wang, T. A. Lipo, V. D. Immanuel, and K. J. Karimi, "A systematic topology evaluation methodology for high-density three-phase pwm ac-ac converters," IEEE Trans. Power Electron., vol. 23, no. 6, pp. 2665-2680, November 2008.

[121] B.-G. Gu and K. Nam, "A dc-link capacitor minimization method through direct capacitor current control," IEEE Trans. Ind. Appl., vol. 42, no. 2, pp. 573-581, March 2006.

[122] L. Li and D. Tang, "Cascade three-level ac/ac direct converter," IEEE Trans. Ind. Electron., vol. 59, no. 1, pp. 27-34, January 2012.

[123] L. Malesani, L. Rossetto, P. Tenti, and P. Tomasin, "Ac/dc/ac pwm converter with reduced energy storage in the dc link," IEEE Trans. Ind. Appl., vol. 31, no. 2, pp. 287-292, March 1995.

[124] P. W. Wheeler, J. Rodriguez, J. C. Clare, L. Empringham, and A. We-instein, "Matrix converters: a technology review," IEEE Trans. Ind. Electron., vol. 49, no. 2, pp. 276-288, April 2002.

[125] J. W. Kolar, T. Friedli, J. Rodriguez, and P. W. Wheeler, "Review of three-phase pwm ac-ac converter topologies," IEEE Trans. Ind. Electron., vol. 58, no. 11, pp. 4988-5006, November 2011.

[126] J. Rodriguez, M. Rivera, J. W. Kolar, and P. W. Wheeler, "A review of control and modulation methods for matrix converters," IEEE Trans. Ind. Electron., vol. 59, no. 1, pp. 58-70, January 2012.

[127] H. Keyhani and H. A. Toliyat, "A soft-switched three-phase ac-ac converter with a high-frequency ac link," IEEE Trans. Ind. Appl., vol. 50, no. 4, pp. 2637-2647, July 2014.

[128] H. L. Li, A. P. Hu, and G. A. Covic, "A direct ac-ac converter for inductive power-transfer systems," IEEE Trans. Power Electron., vol. 27, no. 2, pp. 661-668, February 2012.

[129] U. K. Madawala and D. J. Thrimawithana, "Current sourced bi-directional inductive power transfer system," IET Power Electronics, vol. 4, no. 4, pp. 471-480, April 2011.

[130] C.-S. Wang, G. A. Covic, and O. H. Stielau, "Investigating an lcl load resonant inverter for inductive power transfer applications," IEEE Trans. Power Electron., vol. 19, no. 4, pp. 995-1002, July 2004.

[131] C. Y. Huang, J. T. Boys, and G. A. Covic, "Lcl pickup circulating current controller for inductive power transfer systems," IEEE Trans. Power Electron., vol. 28, no. 4, pp. 2081-2093, April 2013.

[132] S. Aldhaher, P. C. K. Luk, A. Bati, and J. F. Whidborne, "Wireless power transfer using class e inverter with saturable dc-feed inductor," IEEE Trans. Ind. Appl., vol. 50, no. 4, pp. 2710-2718, July 2014.

[133] Z. Pantic, S. Bai, and S. M. Lukic, "Zcs lcc -compensated resonant inverter for inductive-power-transfer application," IEEE Trans. Ind. Electron., vol. 58, no. 8, pp. 3500-3510, August 2011.

[134] J. I. Rodriguez and S. B. Leeb, "A multilevel inverter topology for inductively coupled power transfer," IEEE Trans. Power Electron., vol. 21, no. 6, pp. 1607-1617, November 2006.

[135] N. A. Keeling, G. A. Covic, and J. T. Boys, "A unity-power-factor ipt pickup for high-power applications," IEEE Trans. Ind. Electron., vol. 57, no. 2, pp. 744-751, February 2010.

[136] M. G. Egan, D. L. O'Sullivan, J. G. Hayes, M. J. Willers, and C. P. Henze, "Power-factor-corrected single-stage inductive charger for e batteries," IEEE Trans. Ind. Electron., vol. 54, no. 2, pp. 1217-1226, April 2007.

[137] M. Budhia, G. Covic, and J. Boys, "Design and optimization of circular magnetic structures for lumped inductive power transfer systems," Power Electronics, IEEE Transactions on, vol. 26, no. 11, pp. 3096-3108, November 2011.

[138] F. F. A. van der Pijl, M. Castilla, and P. Bauer, "Adaptive sliding-mode control for a multiple-user inductive power transfer system without need for communication," IEEE Transactions on Industrial Electronics, vol. 60, no. 1, pp. 271-279, January 2013.

[139] F. F. A. V. der Pijl, P. Bauer, J. A. Ferreira, and H. Polinder, "Quantum control for an experimental contactless energy transfer system for multiple users," in Power Electronics Specialists Conference, 2007. PESC 2007. IEEE, June 2007, pp. 343-349.

[140] H. L. Li, A. P. Hu, and G. A. Covic, "A direct ac-ac converter for inductive power transfer systems," IEEE Transactions on Power Electronics, vol. 27, no. 2, pp. 661-668, February 2012.

[143] P. Sergeant and A. V. D. Bossche, "Inductive coupler for contactless power transmission," *IET Electric Power Applications*, vol. 2, no. 1, pp. 1-7, January 2008.

[144] J. de Boeij, E. A. Lomonova, and A. J. A. Vandenput, "Optimization of contactless planar actuator with manipulator," *IEEE Trans. Magn.*, vol. 44, no. 6, pp. 1118-1121, June 2008.

[145] P. Li and R. Bashirullah, "A wireless power interface for rechargeable battery operated medical implants," *IEEE Trans. Circuits Syst. II, Exp. Briefs*, vol. 54, no. 10, pp. 912-916, October 2007.

[146] G. Wang, W. Liu, M. Sivaprakasam, and G. A. Kendir, "Design and analysis of an adaptive transcutaneous power telemetry for biomedical implants," *IEEE Trans. Circuits Syst. I, Reg. Papers*, vol. 52, no. 10, pp. 2109-2117, October 2005.

[147] G. A. Covic and J. T. Boys, "Modern trends in inductive power transfer for transportation applications," *IEEE Journal of Emerging and Selected Topics in Power Electronics*, vol. 1, no. 1, pp. 28-41, March 2013.

[148] M. Moghaddami, A. Anzalchi, and A. I. Sarwat, "Finite element based design optimization of magnetic structures for roadway inductive power transfer systems," in *2016 IEEE Transportation Electrification Conference and Expo (ITEC)*, June 2016, pp. 1-6.

[149] C.-S. Wang, O. H. Stielau, and G. A. Covic, "Design considerations for a contactless electric vehicle battery charger," *IEEE Trans. Ind. Electron.*, vol. 52, no. 5, pp. 1308-1314, October 2005.

[150] J. Sallan, J. L. Villa, A. Llombart, and J. F. Sanz, "Optimal design of icpt systems applied to electric vehicle battery charge," *IEEE Trans. Ind. Electron.*, vol. 56, no. 6, pp. 2140-2149, June 2009.

[151] S. Y. R. Hui and W. W. C. Ho, "A new generation of universal contactless battery charging platform for portable consumer electronic equipment," *IEEE Trans. Power Electron.*, vol. 20, no. 3, pp. 620-627, May 2005.

[152] O. H. Stielau and G. A. Covic, "Design of loosely coupled inductive power transfer systems," in Power System Technology, 2000. *Proceed-ings. PowerCon 2000.* International Conference on, vol. 1, 2000, pp. 85-90 vol. 1.

[153] U. K. Madawala, M. Neath, and D. J. Thrimawithana, "A power-frequency controller for bidirectional inductive power transfer systems," *IEEE Trans. Ind. Electron.*, vol. 60, no. 1, pp. 310-317, January 2013.

[154] Z. U. Zahid, Z. M. Dalala, C. Zheng, R. Chen, W. E. Faraci, J. S. J. Lai, G. Lisi, and D. Anderson, "Modeling and control of series-series compensated inductive power transfer system," *IEEE Journal of Emerging and Selected Topics in Power Electronics*, vol. 3, no. 1, pp. 111-123, March 2015.

[155] A. Berger, M. Agostinelli, S. Vesti, J. A. Oliver, J. A. Cobos, and M. Huemer, "A wireless charging system applying phase-shift and amplitude control to maximize efficiency and extractable power," *IEEE Trans. Power Electron.*, vol. 30, no. 11, pp. 6338-6348, November 2015.

[156] J. T. Matysik, "The current and voltage phase shift regulation in resonant converters with integration control," *IEEE Trans. Ind. Electron.*, vol. 54, no. 2, pp. 1240-1242, April 2007.

[157] Z. H. Wang, Y. P. Li, Y. Sun, C. S. Tang, and X. Lv, "Load detection model of voltage-fed inductive power transfer system," *IEEE Trans. Power Electron.*, vol. 28, no. 11, pp. 5233-5243, November 2013.

[158] J. M. Miller and A. Daga, "Elements of wireless power transfer essential to high power charging of heavy duty vehicles," *IEEE Transactions on Transportation Electrification*, vol. 1, no. 1, pp. 26-39, June 2015.

[160] F. F. A. van der Pijl, M. Castilla, and P. Bauer, "Adaptive sliding-mode control for a multiple-user inductive power transfer system without need for communication," *IEEE Trans. Ind. Electron.*, vol. 60, no. 1, pp. 271-279, January 2013.

[161] L. G. G. de Vicuna, M. Castilla, J. Miret, J. Matas, and J. M. Guerrero, "Sliding-mode control for a single-phase ac/ac quantum resonant con-verter," *IEEE Trans. Ind. Electron.*, vol. 56, no. 9, pp. 3496-3504, September 2009.

[162] M. Castilla, L. G. de Vicuna, J. M. Guerrero, J. Matas, and J. Miret, "Sliding-mode control of quantum series-parallel resonant converters via input-output linearization," *IEEE Trans. Ind. Electron.*, vol. 52, no. 2, pp. 566-575, April 2005.

[163] X. Chen, T. Fukuda, and K. D. Young, "Adaptive quasi-sliding-mode tracking control for discrete uncertain input-output systems," *IEEE Trans. Ind. Electron.*, vol. 48, no. 1, pp. 216-224, February 2001.

[164] A. Namadmalan, "Self-oscillating tuning loops for series resonant in-ductive power transfer systems," *IEEE Trans. Power Electron.*, vol. 31, no. 10, pp. 7320-7327, October 2016.

[165] A. Namadmalan and J. S. Moghani, "Tunable self-oscillating switching technique for current source induction heating systems," *IEEE Trans. Ind. Electron.*, vol. 61, no. 5, pp. 2556-2563, May 2014.

[166] Z. Zhang, K. T. Chau, C. Qiu, and C. Liu, "Energy encryption for wireless power transfer," *IEEE Trans. Power Electron.*, vol. 30, no. 9, pp. 5237-5246, September 2015.

[167] M. Moghaddami, A. Anzalchi, and A. I. Sarwat, "Single-stage three-phase ac-ac matrix converter for inductive power transfer systems," *IEEE Transactions on Industrial Electronics*, vol. 63, no. 10, pp. 6613-6622, October 2016.

[168] H. L. Li, A. P. Hu, and G. A. Covic, "A direct ac-ac converter for inductive power-transfer systems," *IEEE Trans. Power Electron.*, vol. 27, no. 2, pp. 661-668, February 2012.

[169] J. Schneider, "Sae j2954 overview and path forward," 2013.

[170] G. Monsees, *Discrete-time sliding mode control*. TU Delft, Delft University of Technology, 2002.

[171] J. Sallan, J. L. Villa, A. Llombart, and J. F. Sanz, "Optimal design of icpt systems applied to electric vehicle battery charge," *IEEE Trans. Ind. Electron.*, vol. 56, no. 6, pp. 2140-2149, June 2009.

[172] J. de Boeij, E. A. Lomonova, and A. J. A. Vandenput, "Optimization of contactless planar actuator with manipulator," *IEEE Trans. Magn.*, vol. 44, no. 6, pp. 1118-1121, June 2008.

[173] S. Y. R. Hui and W. W. C. Ho, "A new generation of universal contactless battery charging platform for portable consumer electronic equipment," *IEEE Trans. Power Electron.*, vol. 20, no. 3, pp. 620-627, May 2005.

[174] O. H. Stielau and G. A. Covic, "Design of loosely coupled inductive power transfer systems," in Power System Technology, 2000. Proceedings. PowerCon 2000. International Conference on, vol. 1, 2000, pp. 85-90 vol. 1.
[175] J. M. Miller and A. Daga, "Elements of wireless power transfer essential to high power charging of heavy duty vehicles," IEEE Transactions on Transportation Electrification, vol. 1, no. 1, pp. 26-39, June 2015.
[176] G. A. Covic and J. T. Boys, "Modern trends in inductive power transfer for transportation applications," IEEE Journal of Emerging and Selected Topics in Power Electronics, vol. 1, no. 1, pp. 28-41, March 2013.
[177] W. Zhang, S. C. Wong, C. K. Tse, and Q. Chen, "An optimized track length in roadway inductive power transfer systems," IEEE Journal of Emerging and Selected Topics in Power Electronics, vol. 2, no. 3, pp. 598-608, September 2014.
[178] M. Moghaddami, A. Anzalchi, and A. I. Sarwat, "Finite element based design optimization of magnetic structures for roadway inductive power transfer systems," in 2016 IEEE Transportation Electrification Conference and Expo (ITEC), June 2016, pp. 1-6.
[179] M. Budhia, G. Covic, and J. Boys, "Design and optimization of circular magnetic structures for lumped inductive power transfer systems," Power Electronics, IEEE Transactions on, vol. 26, no. 11, pp. 3096-3108, November 2011.
[180] M. Moghaddami, A. Anzalchi, and A. Sarwat, "Single-stage three-phase ac-ac matrix converter for inductive power transfer systems," IEEE Transactions on Industrial Electronics, vol. PP, no. 99, pp. 1-1, 2016.
[181] H. L. Li, A. P. Hu, and G. A. Covic, "A direct ac-ac converter for inductive power-transfer systems," IEEE Trans. Power Electron., vol. 27, no. 2, pp. 661-668, February 2012.
[182] A. Namadmalan, "Bidirectional current-fed resonant inverter for contactless energy transfer systems," IEEE Transactions on Industrial Electronics, vol. 62, no. 1, pp. 238-245, January 2015.
[183] U. K. Madawala and D. J. Thrimawithana, "Current sourced bi-directional inductive power transfer system," IET Power Electronics, vol. 4, no. 4, pp. 471-480, April 2011.
[184] S. Aldhaher, P. C. K. Luk, A. Bati, and J. F. Whidborne, "Wireless power transfer using class e inverter with saturable dc-feed inductor," IEEE Trans. Ind. Appl., vol. 50, no. 4, pp. 2710-2718, July 2014.
[185] H. L. Li, A. P. Hu, and G. A. Covic, "Primary current generation for a contactless power transfer system using free oscillation and energy injection control," Journal of Power Electronics, vol. 11, no. 3, pp. 256-263, 2011.
[186] H. Abe, H. Sakamoto, and K. Harada, "A noncontact charger using a resonant converter with parallel capacitor of the secondary coil," IEEE Transactions on Industry Applications, vol. 36, no. 2, pp. 444-451, March 2000.
[187] J. Schneider, "Wireless power transfer for light-duty plug-in/electric vehicles and alignment methodology," SAE International J2954 Taskforce, 2016.

What is claimed is:

1. A three-phase ac-ac matrix converter for inductive power transfer (IPT) systems comprising:
a first line, a second line, a third line, and a fourth line, all of which are connected in parallel;
a first phase input connected to the first line, a second phase input connected to the second line, and a third phase input connected to the third line;
a first switch and a second switch connected in series on the first line and on opposite sides of a first phase input connection;
a third switch and a fourth switch connected in series on the second line and on opposite sides of a second phase input connection;
a fifth switch and a sixth switch connected in series on the third line and on opposite sides of a third phase input connection;
a seventh switch on the fourth line; and
a diode connected in parallel with the seventh switch and on the fourth line,
the seventh switch being directly connected to the first switch, the second switch, the third switch, the fourth switch, the fifth switch, and the sixth switch,
the first switch, the second switch, the third switch, the fourth switch, the fifth switch, and the sixth switch all being unidirectional, reverse blocking switches, each including an IGBT or a MOSFET in series with a respective diode, and the seventh switch being a bidirectional switch, and
the three-phase ac-ac matrix converter being configured to operate in a current regulation control mode according to rules in the following table:

SWITCHING STATES IN DIFFERENT MODES OF
OPERATION IN CURRENT REGULATION CONTROL MODE.

| Mode | Resonant Current | Input Voltages | Conducting Switches |
| --- | --- | --- | --- |
| 1 | $i_p < 0, |i_p| < i_{ref}$ | $V_b < V_c < V_a$ | $S_{A1}, S_{B2}$ |
| 2 | $i_p < 0, |i_p| < i_{ref}$ | $V_c < V_b < V_a$ | $S_{A1}, S_{C2}$ |
| 3 | $i_p < 0, |i_p| < i_{ref}$ | $V_a < V_c < V_b$ | $S_{B1}, S_{A2}$ |
| 4 | $i_p < 0, |i_p| < i_{ref}$ | $V_c < V_a < V_b$ | $S_{B1}, S_{C2}$ |
| 5 | $i_p < 0, |i_p| < i_{ref}$ | $V_b < V_a < V_c$ | $S_{C1}, S_{B2}$ |
| 6 | $i_p < 0, |i_p| < i_{ref}$ | $V_a < V_b < V_c$ | $S_{C1}, S_{A2}$ |
| 7 | $i_p < 0, |i_p| > i_{ref}$ | — | $D_F$ |
| 8 | $i_p > 0$ | — | $S_F$ | where:
$S_{A1}$ is the first switch;
$S_{A2}$ is the second switch;
$S_{B1}$ is the third switch;
$S_{B2}$ is the fourth switch;
$S_{C1}$ is the fifth switch;
$S_{C2}$ is the sixth switch;
$S_F$ is the seventh switch;
$V_a$ is a first phase input voltage of the first phase input;
$V_b$ is a second phase input voltage of the second phase input;
$V_c$ is a third phase input voltage of the third phase input;
$D_F$ is the diode connected in parallel with the seventh switch;
$i_{ref}$ is a reference current provided to the three-phase ac-ac matrix converter; and
$i_p$ is a peak output resonance current of the three-phase ac-ac matrix converter.

2. A three-phase ac-ac matrix converter for inductive power transfer (IPT) systems comprising:
a first line, a second line, a third line, and a fourth line, all of which are connected in parallel;
a first phase input connected to the first line, a second phase input connected to the second line, and a third phase input connected to the third line;
a first switch and a second switch connected in series on the first line and on opposite sides of a first phase input connection;

a third switch and a fourth switch connected in series on the second line and on opposite sides of a second phase input connection;
a fifth switch and a sixth switch connected in series on the third line and on opposite sides of a third phase input connection;
a seventh switch on the fourth line; and
a diode connected in parallel with the seventh switch and on the fourth line,
the seventh switch being directly connected to the first switch, the second switch, the third switch, the fourth switch, the fifth switch, and the sixth switch,
the first switch, the second switch, the third switch, the fourth switch, the fifth switch, and the sixth switch all being unidirectional reverse blocking switches, each including an IGBT or a MOSFET in series with a respective diode, and the seventh switch being a bidirectional switch, and
the three-phase ac-ac matrix converter being configured to operate in a voltage regulation control mode according to the rules in following table:

SWITCHING STATES IN DIFFERENT MODES OF OPERATION IN VOLTAGE REGULATION CONTROL MODE.

| Mode | Resonant Voltage & Current | Input Voltages | Conducting Switches |
|---|---|---|---|
| 1 | $v_p < 0$, $|v_p| < v_{ref}$ | $V_b < V_c < V_a$ | $S_{A1}$, $S_{B2}$ |
| 2 | $v_p < 0$, $|v_p| < v_{ref}$ | $V_c < V_b < V_a$ | $S_{A1}$, $S_{C2}$ |
| 3 | $v_p < 0$, $|v_p| < v_{ref}$ | $V_a < V_c < V_b$ | $S_{B1}$, $S_{A2}$ |
| 4 | $v_p < 0$, $|v_p| < v_{ref}$ | $V_c < V_a < V_b$ | $S_{B1}$, $S_{C2}$ |
| 5 | $v_p < 0$, $|v_p| < v_{ref}$ | $V_b < V_a < V_c$ | $S_{C1}$, $S_{B2}$ |
| 6 | $v_p < 0$, $|v_p| < v_{ref}$ | $V_a < V_b < V_c$ | $S_{C1}$, $S_{A2}$ |
| 7 | $v_p < 0$, $|v_p| > v_{ref}$ | — | $D_F$ |
| 8 | $i_p > 0$ | — | $S_F$, | where:
$S_{A1}$ is the first switch;
$S_{A2}$ is the second switch;
$S_{B1}$ is the third switch;
$S_{B2}$ is the fourth switch;
$S_{C1}$ is the fifth switch;
$S_{C2}$ is the sixth switch;
$S_F$ is the seventh switch;
$V_a$ is a first phase input voltage of the first phase input;
$V_b$ is a second phase input voltage of the second phase input;
$V_c$ is a third phase input voltage of the third phase input;
$D_F$ is the diode connected in parallel with the seventh switch;
$v_{ref}$ is a reference voltage provided to the three-phase ac-ac matrix converter;
$i_p$ is a peak output resonance current of the three-phase ac-ac matrix converter; and
$v_p$ is a peak output resonance voltage of the three-phase ac-ac matrix converter.

3. A three-phase ac-ac matrix converter for inductive power transfer (IPT) systems comprising:
a first line, a second line, a third line, and a fourth line, all of which are connected in parallel;
a first phase input connected to the first line, a second phase input connected to the second line, and a third phase input connected to the third line;
a first switch and a second switch connected in series on the first line and on opposite sides of a first phase input connection;
a third switch and a fourth switch connected in series on the second line and on opposite sides of a second phase input connection;
a fifth switch and a sixth switch connected in series on the third line and on opposite sides of a third phase input connection;
a seventh switch on the fourth line; and
a diode connected in parallel with the seventh switch and on the fourth line,
the seventh switch being directly connected to the first switch, the second switch, the third switch, the fourth switch, the fifth switch, and the sixth switch,
the first switch, the second switch, the third switch, the fourth switch, the fifth switch, and the sixth switch all being unidirectional, reverse blocking switches, each including an IGBT or a MOSFET in series with a respective diode, and the seventh switch being a bidirectional switch, and
the three-phase ac-ac matrix converter being configured to operate in a power regulation control mode according to rules in the following table:

SWITCHING STATES IN DIFFERENT MODES OF OPERATION IN POWER REGULATION CONTROL MODE.

| Mode | Output Power & Resonant Current | Input Voltages | Conducting Switches |
|---|---|---|---|
| 1 | $P_{out} < P_{ref}$, $i_p < 0$ | $V_b < V_c < V_a$ | $S_{A1}$, $S_{B2}$ |
| 2 | $P_{out} < P_{ref}$, $i_p < 0$ | $V_c < V_b < V_a$ | $S_{A1}$, $S_{C2}$ |
| 3 | $P_{out} < P_{ref}$, $i_p < 0$ | $V_a < V_c < V_b$ | $S_{B1}$, $S_{A2}$ |
| 4 | $P_{out} < P_{ref}$, $i_p < 0$ | $V_c < V_a < V_b$ | $S_{B1}$, $S_{C2}$ |
| 5 | $P_{out} < P_{ref}$, $i_p < 0$ | $V_b < V_a < V_c$ | $S_{C1}$, $S_{B2}$ |
| 6 | $P_{out} < P_{ref}$, $i_p < 0$ | $V_a < V_b < V_c$ | $S_{C1}$, $S_{A2}$ |
| 7 | $P_{out} > P_{ref}$, $i_p < 0$ | — | $D_F$ |
| 8 | $i_p > 0$ | — | $S_F$, | where:
$S_{A1}$ is the first switch;
$S_{A2}$ is the second switch;
$S_{B1}$ is the third switch;
$S_{B2}$ is the fourth switch;
$S_{C1}$ is the fifth switch;
$S_{C2}$ is the sixth switch;
$S_F$ is the seventh switch;
$V_a$ is a first phase input voltage of the first phase input;
$V_b$ is a second phase input voltage of the second phase input;
$V_c$ is a third phase input voltage of the third phase input;
$D_F$ is the diode connected in parallel with the seventh switch;
$P_{ref}$ is a reference power provided to the three-phase ac-ac matrix converter;
$i_p$ is a peak output resonance current of the three-phase ac-ac matrix converter; and
$P_{out}$ is an output power of the three-phase ac-ac matrix converter.

* * * * *